(12) United States Patent
Yamazaki et al.

(10) Patent No.: US 6,928,805 B2
(45) Date of Patent: *Aug. 16, 2005

(54) HYDROCARBON ADSORBENT STATE MONITORING DEVICE

(75) Inventors: Hideharu Yamazaki, Wako (JP); Masahiro Sato, Wako (JP); Kei Machida, Wako (JP); Tetsuo Endo, Wako (JP); Masaki Ueno, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/490,392

(22) PCT Filed: Oct. 21, 2002

(86) PCT No.: PCT/JP02/10876

§ 371 (c)(1),
(2), (4) Date: Apr. 6, 2004

(87) PCT Pub. No.: WO03/036053

PCT Pub. Date: May 1, 2003

(65) Prior Publication Data

US 2004/0237508 A1 Dec. 2, 2004

(30) Foreign Application Priority Data

Oct. 19, 2001 (JP) ........................ 2001-321730
Dec. 28, 2001 (JP) ........................ 2001-400902

(51) Int. Cl.[7] .............................................. F01N 3/00
(52) U.S. Cl. ............................ 60/277; 60/276; 60/286; 60/287; 60/297; 60/300
(58) Field of Search .................... 60/276, 277, 284, 60/286, 287, 288, 289, 292, 295, 297, 278, 300, 303

(56) References Cited

U.S. PATENT DOCUMENTS

| | | | | | |
|---|---|---|---|---|---|
| 5,595,060 A | * | 1/1997 | Togai et al. | ................... | 60/274 |
| 6,357,227 B1 | * | 3/2002 | Neufert | ........................ | 60/309 |
| 6,422,006 B2 | * | 7/2002 | Ohmori et al. | ............... | 60/297 |
| 6,477,830 B2 | * | 11/2002 | Takakura et al. | ............. | 60/277 |
| 6,581,370 B2 | * | 6/2003 | Sato et al. | ..................... | 60/277 |
| 6,769,417 B1 | * | 8/2004 | Ueno et al. | ................. | 123/519 |

FOREIGN PATENT DOCUMENTS

| | | | | |
|---|---|---|---|---|
| EP | 1132589 A1 | 9/2001 | | |
| JP | 61-294350 | 12/1986 | | |
| JP | 5-256124 | 10/1993 | | |
| JP | 405256124 A | * 10/1993 | ................... | 60/295 |
| JP | 2001-33412 | 2/2001 | | |

OTHER PUBLICATIONS

European Search Report dated Nov. 22, 2004.

* cited by examiner

*Primary Examiner*—Binh Q. Tran
(74) *Attorney, Agent, or Firm*—Armstrong, Kratz, Quintos, Hanson, & Brooks, LLP.

(57) ABSTRACT

A characteristic change of a humidity sensor 19 is detected based on the transitional characteristics of output data of the humidity sensor 19 with respect to integrated moisture quantity data representative of an integrated amount of moisture that is supplied to an HG adsorbent 7 by an exhaust gas after an engine 1 has started to operate. A parameter for grasping a state of the HC adsorbent 7 is corrected. The state, such as a deteriorated state or the like, of a hydrocarbon adsorbent (HC adsorbent) is properly monitored while compensating for the effect of the characteristic change of the humidity sensor and the effect of variations of the characteristics of individual units of the humidity sensor.

32 Claims, 20 Drawing Sheets

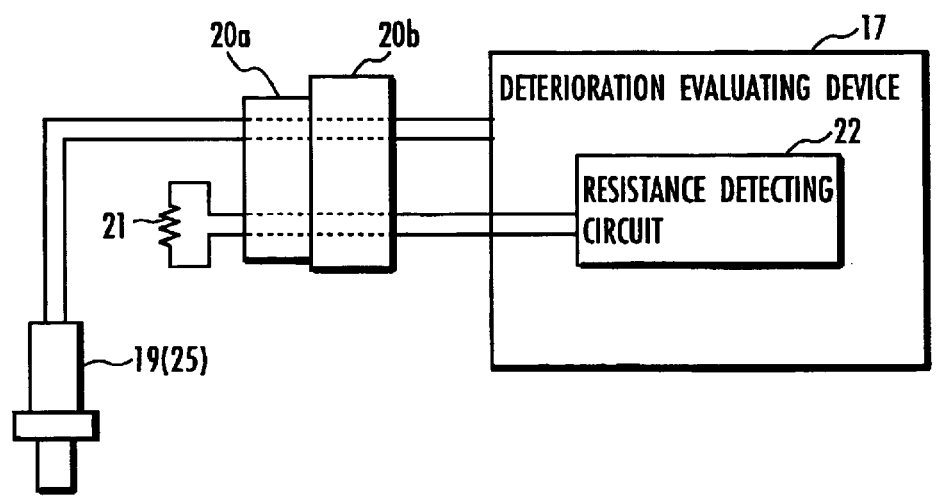

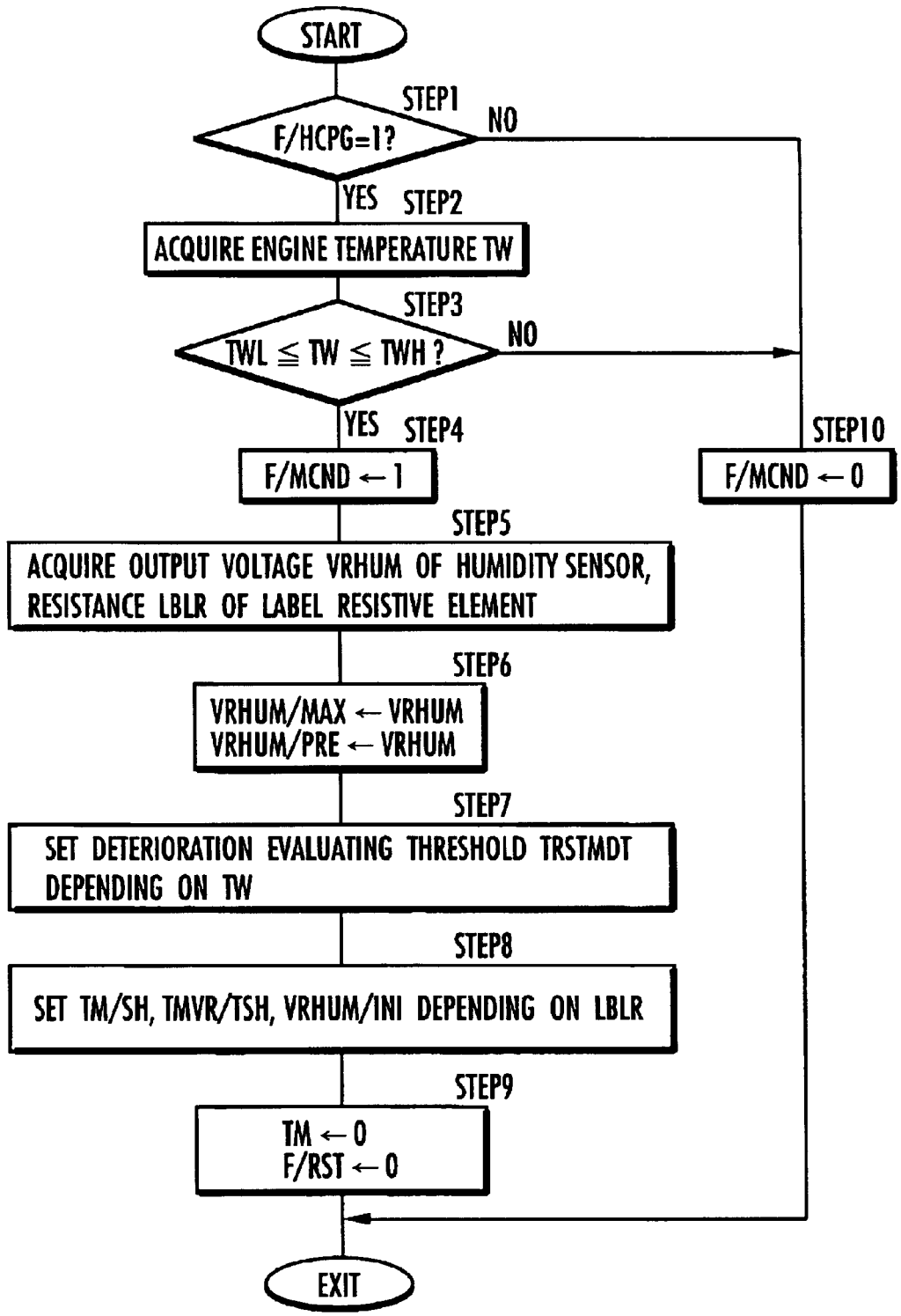

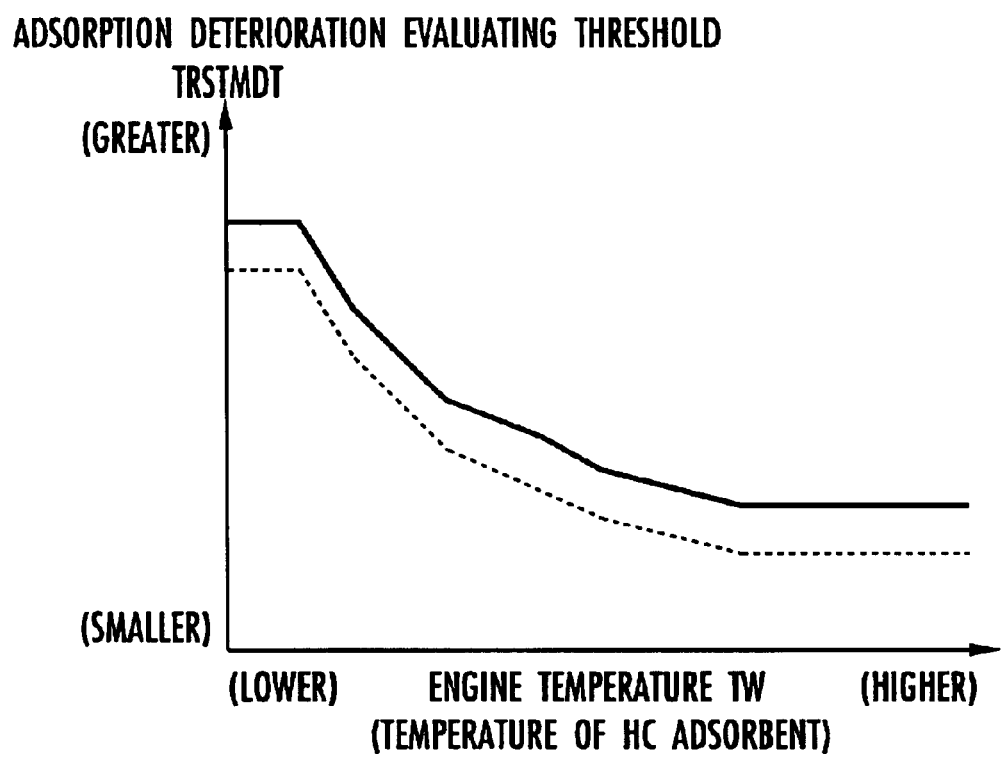

US 6,928,805 B2

HYDROCARBON ADSORBENT STATE MONITORING DEVICE

TECHNICAL FIELD

The present invention relates to an apparatus for monitoring the state of a hydrocarbon adsorbent disposed in the exhaust passage of an internal combustion engine.

BACKGROUND ART

Some known systems for purifying exhaust gases emitted from internal combustion engines have an exhaust gas purifier disposed in the exhaust passage, which may comprise a hydrocarbon adsorbent such as zeolite or a hydrocarbon adsorbing catalyst comprising a composite combination of a hydrocarbon adsorbent and a three-way catalyst, for adsorbing hydrocarbons (HC) in the exhaust gas while the catalytic converter such as a three-way catalyst or the like is not functioning sufficiently, i.e., while the catalytic converter is not sufficiently activated as when the internal combustion engine starts to operate at a low temperature. The hydrocarbon adsorbent has a function to adsorb hydrocarbons in the exhaust gas at relatively low temperatures below 100° C., for example, and operates to release the adsorbed hydrocarbons when heated to a certain temperature in the range from 100 to 250° C., for example.

The applicant of the present application has proposed the following technique of monitoring a state, e.g., a deteriorated state, of a hydrocarbon adsorbent of the type described above: The inventors of the present invention have found that the hydrocarbon adsorbent is capable of adsorbing not only hydrocarbons contained in exhaust gases, but also moisture contained in exhaust gases. The ability of the hydrocarbon adsorbent to adsorb moisture, i.e., the maximum amount of moisture that can be adsorbed by the hydrocarbon adsorbent, is highly correlated to the ability of the hydrocarbon adsorbent to adsorb hydrocarbons, i.e., the maximum amount of hydrocarbons that can be adsorbed by the hydrocarbon adsorbent. As the hydrocarbon adsorbent progressively deteriorates, both the ability to adsorb moisture and the ability to adsorb hydrocarbons are progressively lowered in the same manner. Therefore, when the ability of the hydrocarbon adsorbent to adsorb moisture is evaluated, the ability of the hydrocarbon adsorbent to adsorb hydrocarbons can also be evaluated based on the evaluated ability to adsorb moisture. According to the technique proposed by the applicant, a humidity sensor is disposed downstream of the hydrocarbon adsorbent. Using output data of the humidity sensor, the ability of the hydrocarbon adsorbent to adsorb moisture and hence the ability of the hydrocarbon adsorbent to adsorb hydrocarbons are grasped, thus monitoring the deteriorated state of the hydrocarbon adsorbent.

For adequately evaluating the deteriorated state of the hydrocarbon adsorbent using output data from the humidity sensor in various many environments that the internal combustion engine is subject to while in operation, the humidity sensor that is exposed to high-temperature exhaust gases is required to be highly durable over a long period of time, and also required to have minimum changes in the aging characteristics thereof and to suffer minimum characteristic variations among individual units of humidity sensors.

However, it is generally difficult for humidity sensors to fully satisfy all the above requirements. It would need a large expenditure of money and labor to develop humidity sensors that fully satisfy all the above requirements, and such humidity sensors would be highly expensive to manufacture.

The present invention has been made in view of the above background. It is an object of the present invention to provide a hydrocarbon adsorbent state monitoring apparatus for adequately monitoring the deteriorated state or the like of a hydrocarbon adsorbent by compensating for effects of changes in the characteristics of humidity sensors that are used and also compensating for effects of characteristic variations among individual units of the humidity sensors.

DISCLOSURE OF THE INVENTION

To achieve the above object, there is provided in accordance with the present invention an apparatus for monitoring a state of a hydrocarbon adsorbent disposed in an exhaust passage of an internal combustion engine for adsorbing hydrocarbons in an exhaust gas emitted from the internal combustion engine, using output data of a humidity sensor disposed near the hydrocarbon adsorbent, characterized by characteristic change detecting means for detecting a characteristic change of the humidity sensor based on output data of the humidity sensor under a predetermined condition, and characteristic change compensating means for correcting a parameter to grasp the state of the hydrocarbon adsorbent using the output data of the humidity sensor, based on the characteristic change detected by the characteristic change detecting means (first invention).

According to the above invention, the parameter to grasp the state of the hydrocarbon adsorbent is corrected based on the characteristic change of the humidity sensor which is detected based on the output data of the humidity sensor under a certain condition (e.g., a condition with respect to a timing to acquire the output data of the humidity sensor, an operating state of the internal combustion engine, or the like). It is thus possible to obtain a parameter where the effect of the characteristic change of the humidity sensor has been compensated for. Using such a parameter, the state of the hydrocarbon adsorbent (a deteriorated state of the hydrocarbon adsorbent, a state in which moisture is adsorbed by the hydrocarbon adsorbent, or the like) can appropriately be grasped while compensating for the effect of the characteristic change of the humidity sensor. As the effect of the characteristic change of the humidity sensor can be compensated for, the requirements for the steadiness of the characteristics of the humidity sensor are lessened, and the humidity sensor is allowed to have certain characteristic changes. Therefore, the costs needed to develop and manufacture the humidity sensor can be reduced.

According to the present invention, the parameter may be a parameter representative of the state of the hydrocarbon adsorbent to be grasped, a parameter such as a threshold to be compared with such a parameter, or an intermediate parameter for use in a process for determining such parameters. The characteristic change of the humidity sensor that is detected by the characteristic change detecting means may, for example, be a characteristic change of the humidity sensor with respect to desired reference characteristics, such as characteristics of a brand-new humidity sensor.

According to the present invention (first invention), the apparatus has integrated moisture quantity data generating means for sequentially generating data of an integrated amount of moisture supplied to the hydrocarbon adsorbent by the exhaust gas emitted from the internal combustion engine after the internal combustion engine has started to operate, wherein the characteristic change detecting means detects the characteristic change of the humidity sensor based on a change due to the characteristic change of the humidity sensor, of changes of transitional characteristics of the output data of the humidity sensor with respect to the data generated by the integrated moisture quantity data generating means after the internal combustion engine has started to operate (second invention).

Alternatively, the characteristic change detecting means may detect the characteristic change of the humidity sensor based on a change due to the characteristic change of the humidity sensor, of changes of transitional characteristics of the output data of the humidity sensor with respect to a period of time that has elapsed after the internal combustion engine has started to operate (third invention).

Specifically, as described in detail later on, the inventors have found that the output data of the humidity sensor near the hydrocarbon adsorbent exhibits a characteristic transition with respect to the data (the data generated by the integrated moisture quantity data generating means) of the integrated amount of moisture supplied to the hydrocarbon adsorbent by the exhaust gas emitted from the internal combustion engine after the internal combustion engine has started to operate or a period of time that has elapsed after the internal combustion engine has started to operate. The transitional characteristics change depending on the characteristic change of the humidity sensor. The transitional characteristics include a portion which changes due to not only the characteristic change of the humidity sensor, but also the effect of the state in which the hydrocarbon adsorbent adsorbs moisture, and also include a portion which changes due to only the characteristic change of the humidity sensor. Based on a change due to the characteristic change of the humidity sensor, of changes of the transitional characteristics, therefore, the characteristic change of the humidity sensor can appropriately be detected. Since the transitional characteristics are also subject to the effect of the state in which the hydrocarbon adsorbent adsorbs moisture, it is also possible to grasp the state in which the hydrocarbon adsorbent adsorbs moisture based on the transitional characteristics while grasping the characteristic change of the humidity sensor.

The data representative of the integrated amount of moisture may be data of the integrated amount of moisture itself, but may basically be data substantially proportional to the integrated amount of moisture. For example, the integrated value of an amount of fuel or an amount of intake air supplied to the internal combustion engine after the internal combustion engine has started to operate may be used as the data representative of the integrated amount of moisture. If the operating state of the internal combustion engine after the internal combustion engine has started to operate is a substantially constant operating state, e.g., an idling state, then the period of time that has elapsed after the internal combustion engine has started to operate may be used as the data representative of the integrated amount of moisture.

According to the present invention (second invention) wherein the characteristic change of the humidity sensor is detected based on a change of the transitional characteristics of the output data of the humidity sensor with respect to the data representative of the integrated amount of moisture after the internal combustion engine has started to operate, more specifically, the characteristic change detecting means may detect the characteristic change of the humidity sensor based on a change from a predetermined reference value of characteristic change detecting output data which comprises the output data of the humidity sensor at the time when the data generated by the integrated moisture quantity data generating means has reached a predetermined value after the internal combustion engine has started to operate (fourth invention). Similarly, according to the present invention (third invention) wherein the characteristic change of the humidity sensor is detected based on a change of the transitional characteristics of the output data of the humidity sensor with respect to the period of time that has elapsed after the internal combustion engine has started to operate, more specifically, the characteristic change detecting means detects the characteristic change of the humidity sensor based on a change from a predetermined reference value of characteristic change detecting output data which comprises the output data of the humidity sensor at the time when the period of time that has elapsed after the internal combustion engine has started to operate has reached a predetermined value (fifth invention).

Specifically, as described in detail later on, the inventors have found that if the humidity sensor is disposed downstream of the hydrocarbon adsorbent, the humidity at the location of the humidity sensor immediately after the internal combustion engine has started to operate is of a substantially constant low humidity level due to the adsorption of moisture in the exhaust gas by the hydrocarbon adsorbent. When the integrated amount of moisture or the elapsed period of time increases until the adsorption of moisture by the hydrocarbon adsorbent is saturated, the humidity at the location of the humidity sensor increases monotonously from a low humidity level to a high humidity level until finally it reaches the humidity inherent in the exhaust gas (the humidity of the exhaust gas when the hydrocarbon adsorbent or the like does not adsorb moisture). The output data of the humidity sensor at the time when the humidity at the location of the humidity sensor reaches the humidity inherent in the exhaust gas is of a substantially constant value. When the humidity sensor suffers a characteristic change due to its deterioration, a timing at which the output data of the humidity sensor becomes substantially constant or the substantially constant level changes depending on the characteristic change.

If the humidity sensor is disposed upstream of the hydrocarbon adsorbent, then since the region near the hydrocarbon adsorbent is dry immediately after the internal combustion engine has started to operate, the humidity at the location of the humidity sensor is of a low humidity level for a relatively short period of time, and then changes quickly to a high humidity level and reaches the humidity inherent in the exhaust gas. The output data of the humidity sensor at the time when the humidity at the location of the humidity sensor reaches the humidity inherent in the exhaust gas is of a substantially constant value, as with the above case. When the humidity sensor suffers a characteristic change due to its deterioration, a timing at which the output data of the humidity sensor becomes substantially constant or the substantially constant level changes depending on the characteristic change.

According to the present invention, the output data of the humidity sensor at the time when the data generated by the integrated moisture quantity data generating means (the data representative of the integrated amount of moisture) has reached a predetermined value or the time when the period of time that has elapsed after the internal combustion engine has started to operate has reached a predetermined value is used as the characteristic change detecting output data. The predetermined value may be determined such that the humidity at the location of the humidity sensor reaches the inherent humidity of the exhaust gas or a humidity close thereto when the data representative of the integrated amount of moisture or the elapsed period of time has reached the predetermined value. According to the present invention, the characteristic change of the humidity sensor is detected based on a change from the reference value of the characteristic change detecting output data. Thus, the characteristic change of the humidity sensor can appropriately be detected.

According to the present invention (second invention or fourth invention) wherein the characteristic change of the humidity sensor is detected based on a change of the transitional characteristics of the output data of the humidity sensor with respect to the data representative of the integrated amount of moisture after the internal combustion engine has started to operate, if the state of the hydrocarbon adsorbent to be monitored comprises a deteriorated state of the hydrocarbon adsorbent, then the humidity sensor is disposed downstream of the hydrocarbon adsorbent. A changing timing at which a humidity represented by the output data of the humidity sensor changes to a tendency to increase monotonously from a low humidity level to a high humidity level after the internal combustion engine has started to operate is detected, and the data generated by the integrated moisture quantity data generating means at the detected changing timing is used as the parameter for grasping the deteriorated state of the hydrocarbon adsorbent (sixth invention).

Similarly, according to the present invention (third invention or fifth invention) wherein the characteristic change of the humidity sensor is detected based on a change of the transitional characteristics of the output data of the humidity sensor with respect to the period of time that has elapsed after the internal combustion engine has started to operate, if the state of the hydrocarbon adsorbent to be monitored comprises a deteriorated state of the hydrocarbon adsorbent, the humidity sensor is disposed downstream of the hydrocarbon adsorbent. The apparatus further comprises integrated moisture quantity data generating means for sequentially generating data of an integrated amount of moisture supplied to the hydrocarbon adsorbent by the exhaust gas emitted from the internal combustion engine after the internal combustion engine has started to operate, and changing timing detecting means for detecting a changing timing at which a humidity represented by the output data of the humidity sensor changes to a tendency to increase monotonously from a low humidity level to a high humidity level after the internal combustion engine has started to operate. The data generated by the integrated moisture quantity data generating means at the changing timing detected by the changing timing detecting means is used as the parameter for grasping the deteriorated state of the hydrocarbon adsorbent (seventh invention).

Specifically, as described above, if the humidity sensor is disposed downstream of the hydrocarbon adsorbent, then the humidity at the location of the humidity sensor immediately after the internal combustion engine has started to operate is of a substantially constant low humidity level due to the adsorption of moisture in the exhaust gas by the hydrocarbon adsorbent. When the adsorption of moisture by the hydrocarbon adsorbent is saturated, the humidity at the location of the humidity sensor changes to a tendency to increase monotonously from a low humidity level to a high humidity level. Therefore, a changing timing at which the humidity represented by the output of the humidity sensor changes to a tendency to increase monotonously from a low humidity level to a high humidity level signifies a timing at which the adsorption of moisture by the hydrocarbon adsorbent is saturated (at this timing, the adsorption of moisture by the hydrocarbon adsorbent is saturated, the timing may also be referred to as "absorption saturation timing"). The data generated by the integrated moisture quantity data generating means at the absorption saturation timing (data of the integrated amount of moisture) corresponds to a maximum amount of moisture and hydrocarbons that can be adsorbed by the hydrocarbon adsorbent, and represents a deteriorated state of the hydrocarbon adsorbent. In this case, the absorption saturation timing (changing timing) at which the humidity represented by the output of the humidity sensor changes to a tendency to increase monotonously from a low humidity level to a high humidity level is generally affected by not only the deteriorated state of the hydrocarbon adsorbent, but also the effect of the characteristic change of the humidity sensor. The effect of the characteristic change of the humidity sensor can be compensated for by correcting the data generated by the integrated moisture quantity data generating means at the absorption saturation timing depending on the characteristic change of the humidity sensor detected by the characteristic change detecting means. Therefore, by using the data generated by the integrated moisture quantity data generating means at the absorption saturation timing as the parameter for grasping the deteriorated state of the hydrocarbon adsorbent, the deteriorated state of the hydrocarbon adsorbent can appropriately be grasped while compensating for the effect of the characteristic change of the humidity sensor.

According to either one of the first through fifth inventions, if the state of the hydrocarbon adsorbent to be monitored comprises a deteriorated state of the hydrocarbon adsorbent, then the output data of the humidity sensor before a humidity represented by the output data of the humidity sensor is converged to a humidity outside of the exhaust passage after the internal combustion engine has stopped operating may be used as the parameter for grasping the deteriorated state of the hydrocarbon adsorbent (eighth invention).

Specifically, as described in detail later on, the inventors have found that the humidity near the hydrocarbon adsorbent and hence the output data of the humidity sensor after the internal combustion engine has stopped operating exhibit the tendency of a characteristic transition with respect to the deteriorated state of the hydrocarbon adsorbent. For example, when the temperature of the hydrocarbon adsorbent drops after the internal combustion engine has stopped operating, the hydrocarbon adsorbent adsorbs moisture in the exhaust gas around (near) the hydrocarbon adsorbent. When the adsorption of moisture is saturated, the humidity near the hydrocarbon adsorbent and hence the output data of the humidity sensor are kept at a substantially constant level for a relatively long period of time (the humidity suffers very small time-dependent changes). The amount of moisture that can be adsorbed by the hydrocarbon adsorbent is smaller as the hydrocarbon adsorbent is more deteriorated, so that the above constant level depends on the deteriorated state of the hydrocarbon adsorbent. When a sufficiently long period of time elapses after the internal combustion engine has stopped operating, since a gas exchange between the interior of the exhaust pipe including the region around the hydrocarbon adsorbent and the external atmosphere progresses, the humidity near the hydrocarbon adsorbent is finally converged to the humidity outside of the exhaust passage.

As described above, because the humidity near the hydrocarbon adsorbent exhibits a characteristic transition with respect to the deteriorated state of the hydrocarbon adsorbent after the internal combustion engine has stopped operating, the output data of the humidity sensor after the internal combustion engine has stopped operating and before the humidity near the hydrocarbon adsorbent is finally converged to the humidity outside of the exhaust passage can be used as the parameter to grasp the deteriorated state of the hydrocarbon adsorbent. Simultaneously, by correcting the parameter depending on the characteristic change of the humidity sensor, the deteriorated state of the hydrocarbon adsorbent can appropriately be grasped while compensating for the effect of the characteristic change of the humidity sensor.

According to the present invention (eighth invention) wherein the output data of the humidity sensor after the internal combustion engine has stopped operating is used as the parameter, it is preferable to use the output data of the humidity sensor in a period of time in which the humidity represented by the output of the humidity sensor is maintained at a substantially constant level after the internal combustion engine has stopped operating, as the parameter to grasp the deteriorated state of the hydrocarbon adsorbent. Specifically, as described above, the output data (output data having a substantially constant level) of the humidity sensor in the state wherein the humidity near the hydrocarbon adsorbent is kept substantially constant after the internal combustion engine has stopped operating depends on the deteriorated state of the hydrocarbon adsorbent. In the state wherein the humidity is kept constant, since the output data of the humidity sensor is also stable, the output data of the humidity sensor is highly reliable as depending on the deteriorated state of the hydrocarbon adsorbent. Therefore, the deteriorated state of the hydrocarbon adsorbent can be grasped accurately. Furthermore, inasmuch as the humidity sensor may be of a type capable of detecting a substantially constant humidity, it is not required to be highly responsive, but may comprise a relatively inexpensive sensor.

According to the present invention (eighth invention or ninth invention) wherein the output data of the humidity sensor after the internal combustion engine has stopped operating is used as the parameter, the deteriorated state of the hydrocarbon adsorbent is preferably grasped based oh the parameter after the internal combustion engine has stopped operating under a predetermined condition (tenth invention). With this arrangement, an exhaust gas state (the humidity state of the exhaust gas or the like) in the exhaust passage after the internal combustion engine has stopped operating can be maintained in an optimum state for evaluating the deteriorated state of the hydrocarbon adsorbent. Therefore, the reliability is increased in grasping the deteriorated state of the hydrocarbon adsorbent using the output data of the humidity sensor after the internal combustion engine has stopped operating as the parameter.

More specifically, the predetermined condition referred to above includes a condition relative to an air-fuel ratio before the internal combustion engine stops operating. The deteriorated state of the hydrocarbon adsorbent should preferably be grasped based on the parameter if the air-fuel ratio immediately before the internal combustion engine stops operating is continuously maintained at a level near the stoichiometric air-fuel ratio for a predetermined period of time or longer.

Specifically, if the internal combustion engine stops operating is operated with its air-fuel ratio (the air-fuel ratio of an air-fuel mixture to be combusted by the internal combustion engine) maintained at a level near the stoichiometric air-fuel ratio, the exhaust gas emitted from the internal combustion engine contains relatively much moisture and the concentration of moisture in the exhaust gas is substantially constant. Therefore, if the air-fuel ratio immediately before the internal combustion engine stops operating is continuously maintained at a level near the stoichiometric air-fuel ratio for a predetermined period of time or longer, then an exhaust gas containing sufficient moisture at a substantially constant concentration is present in the vicinity of the hydrocarbon adsorbent immediately after the combustion engine stops operating. Consequently, the hydrocarbon adsorbent smoothly adsorbs moisture and is saturated, and the transition of the moisture in the vicinity of the hydrocarbon adsorbent distinctly depends on the deteriorated state of the hydrocarbon adsorbent.

If the above predetermined condition includes a condition relative to a warmed-up state of the internal combustion engine before it stops operating, and the engine temperature immediately before the internal combustion engine stops operating is equal to or higher than a predetermined temperature, then the deteriorated state of the hydrocarbon adsorbent should preferably be evaluated based on the output of the humidity sensor. With this arrangement, when the internal combustion engine stops operating while it has sufficiently been warmed up, i.e., while the combustion of the air-fuel mixture in the internal combustion engine has been stabilized, and the hydrocarbon adsorbent has sufficiently been heated to release the moisture adsorbed thereby, the deteriorated state of the hydrocarbon adsorbent is grasped based on the output data (the parameter) of the humidity sensor after the internal combustion engine has stopped operating. Therefore, variations in the humidity of the exhaust gas at the hydrocarbon adsorbent immediately after the internal combustion engine has stopped operating are reduced, and after the temperature of the hydrocarbon adsorbent has dropped to a certain extent, the hydrocarbon adsorbent can smoothly adsorb a maximum amount of moisture depending on the deteriorated state of the hydrocarbon adsorbent. As a result, the transition of the output of the humidity sensor after the internal combustion engine has stopped operating becomes more reliable as corresponding to the deteriorated state of the hydrocarbon adsorbent, and the accuracy of the deteriorated state of the hydrocarbon adsorbent as grasped using the parameter is increased.

According to the present invention (first through tenth inventions), the characteristic change compensating means should preferably correct the parameter when the characteristic change of the humidity sensor which is detected by the characteristic change detecting means exceeds a predetermined quantity (eleventh invention). With this arrangement, when the parameter does not need to be corrected as when a characteristic change of the humidity sensor is detected due to a temporary disturbance, the parameter is prevented from being corrected.

In either one of the first through eleventh inventions, the deteriorated state of the hydrocarbon adsorbent should preferably be prohibited from being grasped based on the parameter when the characteristic change of the humidity sensor which is detected by the characteristic change detecting means exceeds a predetermined upper limit quantity (twelfth invention). Specifically, if the humidity sensor suffers an excessive characteristic change, the humidity sensor may possibly be excessively deteriorated or may possibly suffer a failure. In such a situation, it is difficult to obtain the parameter capable of appropriately grasping the state of the hydrocarbon adsorbent. In this case, therefore, the state of the hydrocarbon adsorbent is prohibited from being grasped based on the parameter, and hence is prevented from being grasped in error.

According to the present invention (first through twelfth inventions), the humidity sensor preferably has characteristic data holding means for holding, in advance, data of characteristics of an individual unit of the humidity sensor, and the characteristic change detecting means preferably detects the characteristic change of the humidity sensor based on the output data of the humidity sensor and the data held by the characteristic data holding means (thirteenth invention).

With the above arrangement, since the characteristic change of the humidity sensor is detected using the data held by the characteristic data holding means associated with an individual unit of the humidity sensor, i.e., the data of the characteristics of an individual unit of the humidity sensor, it is possible to compensate for not only the effect of the characteristic change of the humidity sensor, but also the effect of characteristic variations of individual units of the humidity sensor in grasping the state of the hydrocarbon adsorbent in grasping the deteriorated state of the hydrocarbon adsorbent. As a result, the requirements for the uniformity of the characteristics of individual units of the humidity sensor are lessened, and the costs needed to develop and manufacture the humidity sensor can be reduced.

If the characteristic change of the humidity sensor is detected based on the transitional characteristics of the output data of the humidity sensor with respect to the integrated amount of moisture after the internal combustion engine has started to operate (fourth invention), then the humidity sensor preferably has characteristic data holding means for holding, in advance, data specifying the predetermined value relative to the data generated by the integrated moisture quantity data generating means, as the data of the characteristics of the individual unit of the humidity sensor. The characteristic change detecting means preferably acquires the characteristic change detecting output data of the humidity sensor using the predetermined value which is specified by the data held by the characteristic data holding means (fourteenth invention).

With the above arrangement, the predetermined value (the predetermined value relative to the data representing the integrated amount of moisture) specifying the timing at which the characteristic change detecting output data of the humidity sensor is acquired is adjusted so as to match the characteristics of the individual unit of the humidity sensor. As a consequence, the effect of characteristic variations of individual units of the humidity sensor can appropriately be compensated for.

If the characteristic change of the humidity sensor is detected based on the transitional characteristics of the output data of the humidity sensor with respect to the integrated amount of moisture after the internal combustion engine has started to operate or if the characteristic change of the humidity sensor is detected based on the transitional characteristics with respect to the elapsed period of time (fourth or fifth invention), then the humidity sensor preferably has characteristic data holding means for holding, in advance, data specifying the reference value relative to the characteristic change detecting output data as the data of the characteristics of the individual unit of the humidity sensor, and the characteristic change detecting means preferably acquires the characteristic change detecting output data of the humidity sensor using the reference value which is specified by the data held by the characteristic data holding means (fifteenth invention).

With the above arrangement, the reference value serving as a reference for detecting the characteristic change of the humidity sensor is adjusted so as to match the characteristics of the individual unit of the humidity sensor. As a consequence, the characteristic change of the humidity sensor can be detected while appropriately compensating for the effect of characteristic variations of individual units of the humidity sensor.

According to the present invention (thirteenth through fifteenth inventions) wherein the effect of characteristic variations of individual units of the humidity sensor is compensated for, the characteristic data holding means preferably comprises a resistive element having a resistance depending on the value of the data of the characteristics of the individual unit of the humidity sensor (sixteenth invention).

With the above arrangement, the characteristic data holding means can be of an inexpensive and simple structure. Since the resistance of the resistive element can be detected relatively easily, the data of the characteristics of the individual unit of the humidity sensor can easily be recognized. The characteristic data holding means should preferably be associated with a connector by which the humidity sensor is connected to an electronic circuit unit or the like which processes the output data of the humidity sensor, for example.

The humidity sensor used for monitoring the state of the hydrocarbon adsorbent is not limited to a single humidity sensor, but may comprise a plurality of humidity sensors. If such a plurality of humidity sensors are employed, then the effects of characteristic changes of the respective humidity sensors should preferably be compensated for.

Consequently, according to another aspect of the present invention, there is also provided an apparatus for monitoring a state of a hydrocarbon adsorbent disposed in an exhaust passage of an internal combustion engine for adsorbing hydrocarbons in an exhaust gas emitted from the internal combustion engine, using output data of a plurality of humidity sensors disposed at different locations near the hydrocarbon adsorbent, characterized by characteristic change detecting means for detecting characteristic changes of the humidity sensors based on output data of the respective humidity sensors under a predetermined condition, and characteristic change compensating means for correcting a parameter to grasp the state of the hydrocarbon adsorbent using the output data of the humidity sensors, based on the characteristic changes of the humidity sensors detected by the characteristic change detecting means (seventeenth invention).

According to the above invention (seventeenth invention), the parameter to grasp the state of the hydrocarbon adsorbent is corrected based on the characteristic changes of the humidity sensors which are detected based on the output data of the humidity sensors under a certain condition (e.g., a condition with respect to a timing to acquire the output data of the humidity sensor, an operating state of the internal combustion engine, or the like). It is thus possible to obtain a parameter where the effect of the characteristic changes of the humidity sensors has been compensated for. Using such a parameter, the state of the hydrocarbon adsorbent (a deteriorated state of the hydrocarbon adsorbent, a state in which moisture is adsorbed by the hydrocarbon adsorbent, or the like) can appropriately be grasped while compensating for the effect of the characteristic changes of the humidity sensors. As the effect of the characteristic changes of the humidity sensors can be compensated for, the requirements for the steadiness of the characteristics of the humidity sensors are lessened, and the humidity sensors are allowed to have certain characteristic changes. Therefore, the costs needed to develop and manufacture the humidity sensors can be reduced.

According to the present invention (seventeenth invention), as with the first invention, the parameter may be a parameter representative of the state of the hydrocarbon adsorbent to be grasped, a parameter such as a threshold to be compared with such a parameter, or an intermediate parameter for use in a process for determining such parameters. The characteristic changes of the humidity sensors that are detected by the characteristic change detecting means may, for example, be characteristic changes of the humidity sensors with respect to desired reference characteristics, such as characteristics of brand-new humidity sensors.

According to the present invention (seventeenth invention), if the apparatus has integrated moisture quantity data generating means for sequentially generating data of an integrated amount of moisture supplied to the hydrocarbon adsorbent by the exhaust gas emitted from the internal combustion engine after the internal combustion engine has started to operate, then the characteristic change detecting means detects the characteristic changes of the humidity sensors based on a change due to the characteristic changes of the humidity sensors, of changes of transitional characteristics of the output data of the humidity sensors with respect to the data generated by the integrated moisture quantity data generating means after the internal combustion engine has started to operate (eighteenth invention).

Alternatively, the characteristic change detecting means may detect the characteristic change of the humidity sensor based on a change due to the characteristic changes of the humidity sensors, of changes of transitional characteristics of the output data of the humidity sensors with respect to a period of time that has elapsed after the internal combustion engine has started to operate (nineteenth invention).

Specifically, as described above with respect to the second or third invention, the output data of the humidity sensors near the hydrocarbon adsorbent exhibits a characteristic transition with respect to the data (the data generated by the integrated moisture quantity data generating means) of the integrated amount of moisture or a period of time that has elapsed after the internal combustion engine has started to operate. The transitional characteristics of the output data of the humidity sensors change depending on the characteristic changes of the humidity sensors. The transitional characteristics relative to the humidity sensors include a portion which changes due to only the characteristic changes of the humidity sensors. Based on a change due to the characteristic changes of the humidity sensors, of changes of the transitional characteristics relative to the humidity sensors, therefore, the characteristic changes of the humidity sensors corresponding to the transitional characteristics can appropriately be detected. Since the transitional characteristics relative to the humidity sensors are also subject to the effect of the state in which the hydrocarbon adsorbent adsorbs moisture, it is also possible to grasp the state in which the hydrocarbon adsorbent adsorbs moisture while grasping the characteristic changes of the humidity sensors, based on the transitional characteristics.

The data representative of the integrated amount of moisture in the eighteenth invention may be data substantially proportional to the integrated amount of moisture (including the integrated amount of moisture itself). For example, the integrated value of an amount of fuel or an amount of intake air supplied to the internal combustion engine after the internal combustion engine has started to operate may be used as the data representative of the integrated amount of moisture. If the operating state of the internal combustion engine after the internal combustion engine has started to operate is a substantially constant operating state, e.g., an idling state, then the period of time that has elapsed after the internal combustion engine has started to operate may be used as the data representative of the integrated amount of moisture.

According to the present invention (eighteenth invention) wherein the characteristic changes of the humidity sensors are detected based on a change of the transitional characteristics of the output data of the humidity sensors with respect to the data representative of the integrated amount of moisture after the internal combustion engine has started to operate, more specifically, the characteristic change detecting means detects the characteristic changes of the humidity sensors based on a change from a predetermined reference value of characteristic change detecting output data corresponding to the respective humidity sensors which comprise the output data of the humidity sensors at the time when the data generated by the integrated moisture quantity data generating means has reached predetermined values for the respective humidity sensors after the internal combustion engine has started to operate (twentieth invention).

Similarly, according to the present invention (nineteenth invention) wherein the characteristic changes of the humidity sensors are detected based on changes of transitional characteristics of the output data of the humidity sensors with respect to the period of time that has elapsed after the internal combustion engine has started to operate (nineteenth invention), more specifically, the characteristic change detecting means detects the characteristic changes of the humidity sensors based on a change from predetermined reference values of characteristic change detecting output data of the humidity sensors which comprises the output data of the humidity sensors at the time when the period of time that has elapsed after the internal combustion engine has started to operate has reached predetermined values for the respective humidity sensors (twenty-first invention).

Specifically, as described above with respect to the fourth or fifth invention, the humidity near the hydrocarbon adsorbent associated with the humidity sensors changes from a low humidity level to a high humidity level after the internal combustion engine has started to operate, until it finally reaches a substantially constant high humidity level (the humidity of the exhaust gas when the hydrocarbon adsorbent or the like does not adsorb moisture). The output data of the humidity sensors at the time when the humidity at the locations of the humidity sensors reaches the humidity inherent in the exhaust gas is of a substantially constant value. When the humidity sensors suffer a characteristic change due to their deterioration, a timing at which the output data of the humidity sensors becomes substantially constant or the substantially constant level changes depending on the characteristic changes.

According to the present invention (twentieth invention or twenty-first invention), the output data of the humidity sensors at the time when the data generated by the integrated moisture quantity data generating means (the data representative of the integrated amount of moisture) has reached predetermined values for the respective humidity sensors or the time when the period of time that has elapsed after the internal combustion engine has started to operate has reached predetermined values for the respective humidity sensors is used as the characteristic change detecting output data. The predetermined values for the respective humidity sensors may be determined such that the humidities at the locations of the humidity sensors corresponding to the predetermined values reach the inherent humidity of the exhaust gas (a substantially constant high humidity level) or a humidity close thereto when the data representative of the integrated amount of moisture or the elapsed period of time has reached the predetermined values. According to the present invention, the characteristic changes of the humidity sensors are detected based on a change from the reference value of the characteristic change detecting output data of the respective humidity sensors. Thus, the characteristic changes of the humidity sensors can appropriately be detected.

According to the present invention (eighteenth invention or twentieth invention) wherein the characteristic changes of the humidity sensors are detected based on a change of the transitional characteristics of the output data of the humidity sensors with respect to the data representative of the integrated amount of moisture after the internal combustion engine has started to operate, more specifically, if the state of the hydrocarbon adsorbent to be monitored comprises a deteriorated state of the hydrocarbon adsorbent, then the humidity sensors comprise a downstream humidity sensor disposed downstream of the hydrocarbon adsorbent and an upstream humidity sensor disposed upstream of the hydrocarbon adsorbent. The apparatus further comprises upstream changing timing detecting means for detecting a changing timing at which a humidity represented by the output data of the upstream humidity sensor changes to a tendency to increase monotonously from a low humidity level to a high humidity level after the internal combustion engine has started to operate, and downstream changing timing detecting means for detecting a changing timing at which a humidity represented by the output data of the downstream humidity sensor changes to a tendency to increase monotonously from a low humidity level to a high humidity level after the internal combustion engine has started to operate, wherein the difference between the data generated by the integrated moisture quantity data generating means at the changing timing detected by the upstream changing timing detecting means and the data generated by the integrated moisture quantity data generating means at the changing timing detected by the downstream changing timing detecting means is used as the parameter for grasping the deteriorated state of the hydrocarbon adsorbent (twenty-second invention).

Similarly, according to the present invention (nineteenth invention or twenty-first invention) wherein the characteristic changes of the humidity sensors are detected based on a change of the transitional characteristics of the output data of the humidity sensors with respect to the period of time that has elapsed after the internal combustion engine has started to operate, if the state of the hydrocarbon adsorbent to be monitored comprises a deteriorated state of the hydrocarbon adsorbent, then the humidity sensors comprise a downstream humidity sensor disposed downstream of the hydrocarbon adsorbent and an upstream humidity sensor disposed upstream of the hydrocarbon adsorbent. The apparatus further comprises upstream changing timing detecting means for detecting a changing timing at which a humidity represented by the output data of the upstream humidity sensor changes to a tendency to increase monotonously from a low humidity level to a high humidity level after the internal combustion engine has started to operate, downstream changing timing detecting means for detecting a changing timing at which a humidity represented by the output data of the downstream humidity sensor changes to a tendency to increase monotonously from a low humidity level to a high humidity level after the internal combustion engine has started to operate, and integrated moisture quantity data generating means for generating data of an integrated amount of moisture supplied to the hydrocarbon adsorbent by the exhaust gas emitted from the internal combustion engine from the changing timing detected by the upstream changing timing detecting means to the changing timing detected by the downstream changing timing detecting means, wherein the data generated by the integrated moisture quantity data generating means is used as the parameter for grasping the deteriorated state of the hydrocarbon adsorbent (twenty-third invention).

Specifically, the humidity at the location of the downstream humidity sensor disposed downstream of the hydrocarbon adsorbent changes to a tendency to increase from a low humidity level to a high humidity level when the adsorption of moisture in the exhaust gas by the hydrocarbon adsorbent is saturated after the internal combustion engine has started to operate. The changing timing (hereinafter referred to as "downstream changing timing") signifies a timing at which the adsorption of moisture in the exhaust gas by the hydrocarbon adsorbent is saturated (absorption saturation timing). The humidity at the location of the upstream humidity sensor disposed upstream of the hydrocarbon adsorbent changes to a tendency to increase from a low humidity level to a high humidity level when the highly humid exhaust gas generated by the internal combustion engine after the internal combustion engine has started to operate reaches a region near the inlet of the hydrocarbon adsorbent. The changing timing (hereinafter referred to as "upstream changing timing") signifies a timing at which the hydrocarbon adsorbent starts to essentially adsorb moisture in the exhaust gas (absorption start timing).

According to the twenty-second invention, therefore, the difference between the data generated by the integrated moisture quantity data generating means at the downstream changing timing (the data representative of an integrated amount of moisture after the internal combustion engine has started to operate until the downstream changing timing) and the data generated by the integrated moisture quantity data generating means at the upstream changing timing (the data representative of an integrated amount of moisture after the internal combustion engine has started to operate until the upstream changing timing) corresponds to a total amount of moisture that is actually adsorbed by the hydrocarbon adsorbent (a maximum amount of moisture that can be adsorbed by the hydrocarbon adsorbent) and hence represents a deteriorated state of the hydrocarbon adsorbent. Basically, therefore, the above difference can be used as a parameter (basic parameter) for grasping the deteriorated state of the hydrocarbon adsorbent.

Similarly, according to the twenty-third invention, the data generated by the integrated moisture quantity data generating means, i.e., the data representative of an integrated amount of moisture from the upstream changing timing to the downstream changing timing, corresponds to a total amount of moisture that is actually adsorbed by the hydrocarbon adsorbent (a maximum amount of moisture that can be adsorbed by the hydrocarbon adsorbent) and hence represents a deteriorated state of the hydrocarbon adsorbent. Consequently, the data generated by the integrated moisture quantity data generating means can be used as a parameter (basic parameter) for evaluating the deteriorated state of the hydrocarbon adsorbent.

The upstream changing timing and the downstream changing timing are generally affected by the effect of the characteristic changes of the upstream humidity sensor and the downstream humidity sensor. However, the effect of the characteristic changes of the humidity sensors can be compensated for by correcting the basic parameter for grasping the deteriorated state of the hydrocarbon adsorbent depending on the characteristic changes of the humidity sensors. Therefore, the deteriorated state of the hydrocarbon adsorbent can appropriately be grasped using the corrected parameter while compensating for the effect of the characteristic changes of the humidity sensors.

As described in detail later on, the upstream changing timing (adsorption start timing) detected based on the output data of the upstream humidity sensor may suffer variations due to the arrangement of the exhaust system of the internal combustion engine and the adsorption of moisture by a catalytic converter that is disposed upstream of the hydrocarbon adsorbent though the characteristics of the upstream humidity sensor remain constant. According to the twenty-second invention and the twenty-third invention, however, the upstream changing timing is detected by the upstream humidity sensor, the parameter for grasping the deteriorated state of the hydrocarbon adsorbent is obtained from the detected timing as a start point, and the parameter is corrected depending on the characteristic change of the upstream humidity sensor. Therefore, the effect of variations of the upstream changing timing can be compensated for.

According to the other aspect of the present invention (seventeenth invention through twenty-third invention), the characteristic change compensating means should preferably correct the parameter when either one of the characteristic changes of the humidity sensors which are detected by the characteristic change detecting means exceeds a predetermined quantity (twenty-fourth invention). With this arrangement, when the parameter does not need to be corrected as when characteristic changes of the humidity sensors are detected due to a temporary disturbance, the parameter is prevented from being corrected.

In either one of the seventeenth through twenty-fourth inventions, the characteristic change compensating means preferably compares the characteristic changes of the respective humidity sensors detected by the characteristic change detecting means with a predetermined upper limit quantity, and prohibits the deteriorated state of the hydrocarbon adsorbent from being grasped based on the parameter when the characteristic change of at least one of the humidity sensors exceeds the upper limit quantity (twenty-fifth invention). Specifically, if either one of the humidity sensors suffers an excessive characteristic change, the humidity sensor may possibly be excessively deteriorated or may possibly suffer a failure. In such a situation, it is difficult to obtain the parameter capable of appropriately grasping the state of the hydrocarbon adsorbent. In this case, therefore, the state of the hydrocarbon adsorbent is prohibited from being grasped based on the parameter, and hence is prevented from being grasped in error.

According to the other aspect of the present invention (seventeenth through twenty-fifth inventions), the humidity sensors preferably have respective characteristic data holding means for holding, in advance, data of characteristics of individual units of the humidity sensors, and the characteristic change detecting means preferably detects the characteristic changes of the humidity sensors based on the output data of the humidity sensors and the data held by the characteristic data holding means (twenty-sixth invention).

With the above arrangement, since the characteristic changes of the humidity sensors are detected using the data held by the characteristic data holding means associated with individual units of the humidity sensors, i.e., the data of the characteristics of individual units of the humidity sensors, it is possible to compensate for not only the effect of the characteristic changes of the humidity sensors, but also the effect of characteristic variations of individual units of the humidity sensors in grasping the state of the hydrocarbon adsorbent. As a result, the requirements for the uniformity of the characteristics of individual units of the humidity sensors are lessened, and the costs needed to develop and manufacture the humidity sensors can be reduced.

If the characteristic changes of the humidity sensors are detected based on the transitional characteristics of the output data of the humidity sensors with respect to the integrated amount of moisture after the internal combustion engine has started to operate or if the characteristic changes of the humidity sensors are detected based on the transitional characteristics with respect to the period of time that has elapsed (twentieth invention or twenty-first invention), then the humidity sensors preferably have characteristic data holding means for holding, in advance, data specifying the reference values relative to the characteristic change detecting output data of the humidity sensors as the data of the characteristics of the individual units of the humidity sensors, and the characteristic change detecting means preferably acquires the characteristic change detecting output data of the humidity sensors using the reference values of the respective humidity sensors which are specified by the data held by the characteristic data holding means (twenty-seventh invention).

With the above arrangement, the reference value serving as a reference for detecting the characteristic changes of the humidity sensors is adjusted so as to match the characteristics of the individual units of the humidity sensors. As a consequence, the characteristic changes of the humidity sensors can be detected while appropriately compensating for the effect of characteristic variations of the individual units of the humidity sensors.

According to the present invention (twenty-sixth or twenty-seventh invention) wherein the effect of characteristic variations of individual units of the humidity sensors is compensated for, the characteristic data holding means preferably comprises resistive elements having resistances depending on the value of the data of the characteristics of the individual units of the humidity sensors (twenty-eighth invention).

With the above arrangement, the characteristic data holding means can be of an inexpensive and simple structure. Since the resistances of the resistive elements can be detected relatively easily, the data of the characteristics of the individual units of the humidity sensors can easily be recognized. The characteristic data holding means should preferably be associated with connectors by which the humidity sensors are connected to an electronic circuit unit or the like which processes the output data of the humidity sensors, for example.

BRIEF DESCRIPTION OF THE DRAWINGS

FIG. 2 is a diagram showing output characteristics of a humidity sensor used in the apparatus shown in FIG. 1;

FIG. 3 is a block diagram showing an arrangement of a portion of the apparatus shown in FIG. 1;

FIG. 4 is a flowchart of an operation sequence of the apparatus according to the first embodiment of the present invention;

FIG. 5 is a graph illustrative of a processing sequence of the flowchart of FIG. 4;

BEST MODE FOR CARRYING OUT THE INVENTION

Figure 1:
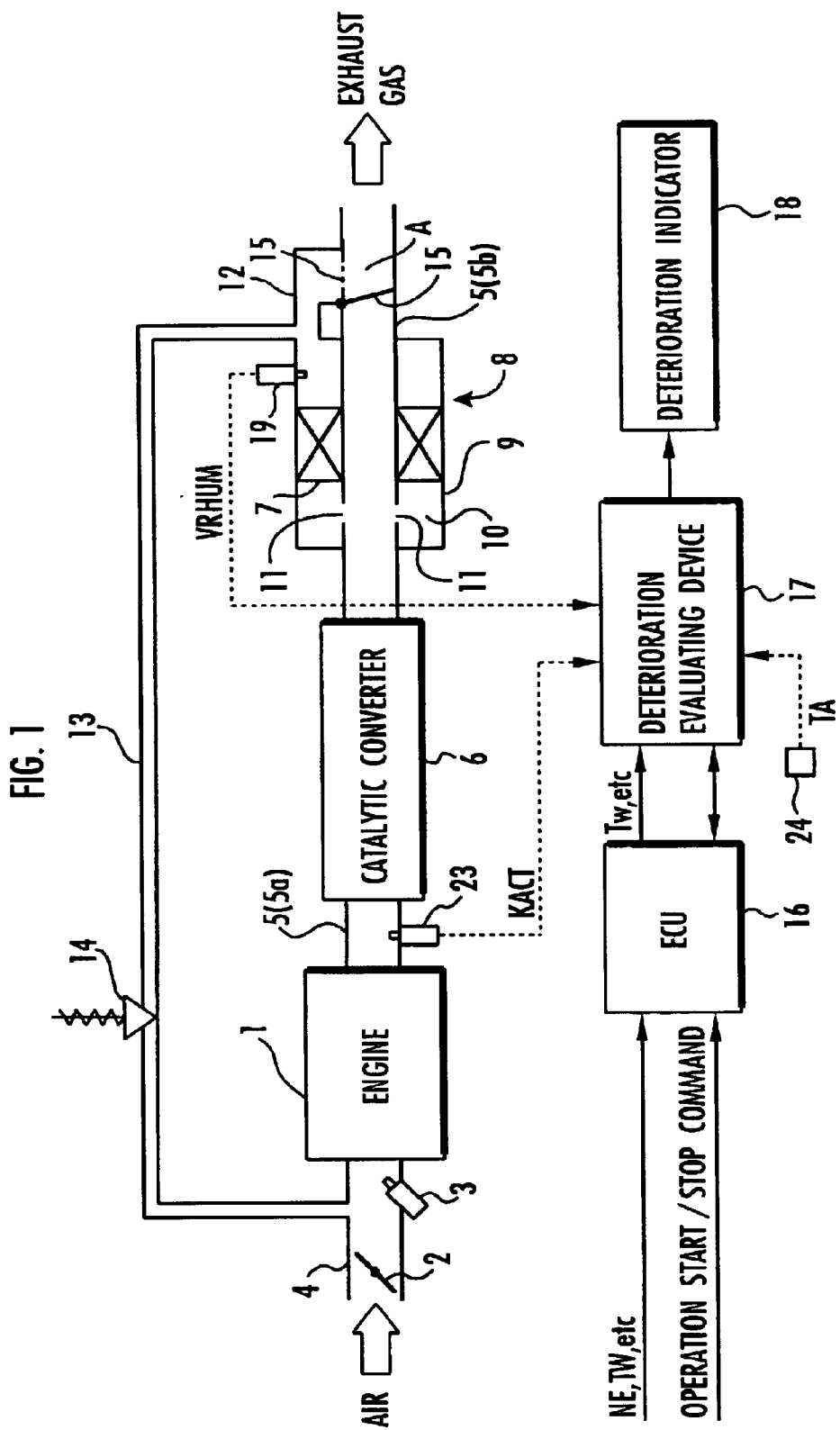
FIG. 1 is a block diagram of an overall system arrangement of an apparatus according to first and second embodiments of the present invention.

A first embodiment of the present invention will be described below with reference to FIGS. 1 through 8. FIG. 1 is a block diagram of an overall system arrangement of an apparatus according to the present embodiment. In FIG. 1, an engine (an internal combustion engine) 1 mounted on an automobile or a hybrid vehicle, for example, draws a mixture of fuel and air from an intake pipe 4 having a throttle valve 2 and a fuel injector 3 as in a usual engine, and combusts the mixture and generates an exhaust gas, which is discharged into an exhaust pipe (exhaust passage) 5. A catalytic converter 6 and an exhaust gas purifier 8 which incorporates a hydrocarbon adsorbent 7 (hereinafter referred to as "HC adsorbent 7") are successively arranged downstream and mounted on the exhaust pipe 5 for purifying the exhaust gas emitted from the engine 1. A portion of the exhaust pipe 5 which extends upstream of the catalytic converter 6 and a portion of the exhaust pipe 5 which extends downstream of the catalytic converter 6 are referred to as an upstream exhaust pipe 5a and a downstream exhaust pipe 5b, respectively. The downstream exhaust pipe 5b has a downstream end that is open into the atmosphere. If necessary, a catalytic converter separate from the catalytic converter 6 and a muffler (silencer) or the like may be connected to the downstream exhaust pipe 5b downstream of the exhaust gas purifier 8.

The catalytic converter 6 incorporates a three-way catalyst (not shown) therein. The catalytic converter 6 purifies, by way of oxidizing and reducing reactions, gas components including nitrogen oxide (NOx), hydrocarbons (HC), carbon monoxide (CO), etc. contained in the exhaust gas emitted from the engine 1 and supplied from the upstream exhaust pipe 5a into the catalytic converter 6.

The exhaust gas purifier 8 has a substantially cylindrical housing 9 mounted on the downstream exhaust pipe 5b in covering relation to the outer circumferential surface thereof. The downstream exhaust pipe 5b extends centrally through the housing 9. A tubular space 10 defined between the inner circumferential surface of the housing 9 and the outer circumferential surface of the downstream exhaust pipe 5b serves as a bypass exhaust passage 10 for branching the exhaust gas from the downstream exhaust pipe 5b. The HC adsorbent 7 is mounted in the bypass exhaust passage 10. The HC adsorbent 12 is made of a zeolite-based material and serves to adsorb HC contained in the exhaust gas which is emitted from the engine 1 in an initial phase of operation of the internal combustion engine 1.

The bypass exhaust passage 10 of the exhaust gas purifier 8 which has the HC adsorbent 7 communicates with the interior of the downstream exhaust pipe 5b through a plurality of vent holes 11 that are defined in the downstream exhaust pipe 5b within the housing 9 upstream of the HC adsorbent 7. The bypass exhaust passage 10 also communicates with and is joined to the downstream exhaust pipe 5b through a joint pipe 12 that extends from the housing 9 downstream of the HC adsorbent 7. Furthermore, the bypass exhaust passage 10 is connected to the intake pipe 4 downstream of the throttle valve 2 by an EGR (Exhaust Gas Recirculation) passage 13 that extends from the housing 9 downstream of the HC adsorbent 7.

The EGR passage 13 serves to return the exhaust gas to the intake pipe 4 under given conditions during operation of the engine 1 in order to combust an unburned gas in the exhaust gas. An on/off valve (solenoid-operated valve) 14 is mounted in the EGR passage 13 for selectively opening and closing the EGR passage 13.

The downstream exhaust pipe 5b and the joint pipe 12 are joined to each other at a junction A where there is disposed a directional control valve 15 for venting one, at a time, of the portion of the downstream exhaust pipe 5b which extends upstream of the junction A and the bypass exhaust passage 10 to the atmosphere. The directional control valve 15 can be angularly moved between a solid-line position and an imaginary-line position in FIG. 1 by an actuator (not shown). When the directional control valve 15 is actuated into the solid-line position, it shields the portion of the downstream exhaust pipe 5b which extends upstream of the junction A from the atmosphere, and simultaneously vents the bypass exhaust passage 10 to the atmosphere. Conversely, when the directional control valve 15 is actuated into the imaginary-line position, it vents the downstream exhaust pipe 5b to the atmosphere and shields the bypass exhaust passage 10 to the atmosphere.

The apparatus also has, in addition to the above mechanical structures, the following components for controlling operation of the engine 1 and monitoring a state of the HC adsorbent 7. Specifically, the apparatus according to the present embodiment has a controller 16 (hereinafter referred to as "ECU 16") for controlling operation of the engine 1 (including operation of the on/off valve 14 in the EGR passage 13 and the directional control valve 15), a deterioration evaluating device 17 for executing a processing sequence to evaluate a deteriorated state of the HC adsorbent 7 as a state of the HC adsorbent 7, a deterioration indicator 18 for indicating the deteriorated state as evaluated, and a humidity sensor 19 mounted on the housing 9 downstream of the HC adsorbent 7 for detecting the humidity of the exhaust gas downstream of the HC adsorbent 7. The ECU 16 and the deterioration evaluating device 17 are implemented by a microcomputer or the like. The deterioration indicator 18 comprises a lamp, a buzzer, or a display unit for displaying characters, a graphic image, etc. Those parts that are indicated by the reference numerals 23, 24 in FIG. 1 are sensors used in a second embodiment to be described later on, and may be omitted in the present embodiment.

The humidity sensor 19 has a humidity sensing element (not shown) made of a porous material of alumina, titania, or the like, whose electric resistance varies depending on the humidity (relative humidity) of the exhaust gas to which the humidity sensor 19 is exposed. When the humidity sensor 19 is energized by the deterioration evaluating device 17, the humidity sensor 19 produces an output voltage VRHUM, which is proportional to the electric resistance of the humidity sensing element, depending on the humidity (relative humidity) of the exhaust gas, as shown in FIG. 2. The output voltage VRHUM of the humidity sensor 19 decreases substantially linearly as the humidity increases. Therefore, the output voltage VRHUM of the humidity sensor 19 has a negative humidity coefficient, i.e., it decreases as the humidity (relative humidity) of the exhaust gas increases. The reference characters VFHUM in parentheses on the vertical axis in FIG. 2 refer to an output voltage used in a third embodiment of the present invention which will be described later on.

As shown in FIG. 3, the humidity sensor 19 is connected to the deterioration evaluating device 17 by two connectors 20a, 20b. The connector 20a closer to the humidity sensor 19 has a resistive element 21 serving as a characteristic data holding means. The resistive element 21 has a resistance depending on the characteristics actually measured for each individual unit of the humidity sensor 19. The resistive element 21 (hereinafter referred to as "label resistive element 21") is electrically connected, together with the humidity sensor 19, to the deterioration evaluating device 17 when the connector 20a closer to the humidity sensor 19 is connected to the connector 20b closer to the deterioration evaluating device 17. The deterioration evaluating device 17 has a resistance detecting circuit 22 for detecting the resistance of the label resistive element 21, i.e., generating a voltage having a level depending on the resistance of the label resistive element 21. The deterioration evaluating device 17 recognizes the characteristics of the humidity sensor 19 that is used based on the resistance of the label resistive element 21 which is detected by the resistance detecting circuit 22, and sets a parameter, to be described in detail later on, related to the evaluation of a deteriorated state of the HC adsorbent 7. The reference numerals 25 in parentheses shown in FIG. 3 refer to a humidity sensor in the third embodiment of the present invention which will be described later on.

The ECU 16 is supplied with detected data of the rotational speed NE of the engine 1, the engine temperature TW thereof (specifically, the temperature of the coolant of the engine 1), etc. from non-illustrated sensors, and also with an operation start command signal and an operation stop command signal for the engine 1 from a non-illustrated operation switch. The ECU 16 then controls operation of the engine 1 based on the detected data and the command signals that are supplied thereto, according to a predetermined control program. Specifically, the ECU 16 controls the opening of the throttle valve 2 with an actuator (not shown), controls the amount of fuel injected by the fuel injector 3, controls an igniter (not shown), controls the starting of the engine 1 with a starter motor (not shown), controls the on/off valve 14 mounted in the EGR passage 13, and controls operation of the directional control valve 15.

The deterioration evaluating device 17 is supplied with the output voltage (a signal indicative of a detected relative humidity) from the humidity sensor 19, detected data of the resistance of the label resistive element 21 which represents the characteristics of the humidity sensor 19, and data of the engine temperature TW of the engine 1 from the ECU 16. The deterioration evaluating device 21 evaluates (grasps) a deteriorated state of the HC adsorbent 7 of the exhaust gas purifier 8 based on the supplied data according to a predetermined program, as described later on. The deterioration evaluating device 17 evaluates a deteriorated state of the HC adsorbent 7 as either a state where it has been deteriorated to the extent that it needs to be replaced (such a deteriorated state will hereinafter be referred to as "deterioration-in-progress state") or a state where it has not been deteriorated to the deterioration-in-progress state (such a state will hereinafter be referred to as "non-deteriorated state"). When the deterioration evaluating device 17 judges that the deteriorated state of the HC adsorbent 12 is the deterioration-in-progress state, the deterioration evaluating device 17 controls the deterioration indicator 18 to indicate the deteriorated state as thus evaluated.

The deterioration evaluating device 17 is capable of exchanging various data with the ECU 16, and is capable of giving the ECU 16 data related to a process of evaluating a deteriorated state of the HC adsorbent 7, e.g., data indicative of whether the adsorption of moisture by the HC adsorbent 7 has been saturated or not. The deterioration evaluating device 17 functions as a characteristic change detecting means, a characteristic change compensating means, and an integrated moisture quantity data generating means.

Operation of the apparatus according to the present embodiment, particularly for evaluating the deteriorated state of the HC adsorbent 7, will be described in detail below.

When the operation switch (not shown) is turned on to start operation of the engine 1, the ECU 16 and the deterioration evaluating device 17 are activated. The ECU 16 operates the directional control valve 15 to move to the solid-line position in FIG. 1 with the non-illustrated motor. The downstream exhaust pipe 5b is shielded at the junction A, and the bypass exhaust passage 10 of the exhaust gas purifier 8 is vented to the atmosphere. The ECU 16 then starts the engine 1 with the starter motor (not shown) to rotate the crankshaft (not shown) of the engine 1. The ECU 16 controls the fuel injector 3 to supply the fuel to the engine 1, and controls the igniter (not shown) to start operating the engine 1.

When the engine 1 starts operating, it emits an exhaust gas that is discharged through the upstream exhaust pipe 5a, the catalytic converter 6, the upstream portion of the downstream exhaust pipe 5b (extending from the catalytic converter 6 to the vent holes 11), the bypass exhaust passage 10, the HC adsorbent 7, the joint pipe 12, and the downstream portion of the downstream exhaust pipe 5b (extending downstream of the directional control valve 15) into the atmosphere. At this time, while the exhaust gas is passing through the HC adsorbent 7 in the bypass exhaust passage 10, hydrocarbons (HCs) in the exhaust gas are adsorbed by the HC adsorbent 7. Therefore, even while the catalytic converter 6 is not sufficiently activated as when the engine 1 starts to operate at a low temperature, the HCs are prevented from being discharged into the atmosphere. At the same time, the HC adsorbent 7 adsorbs moisture in the exhaust gas as well as the HCs in the exhaust gas.

When the catalytic converter 6 is sufficiently activated by being heated by the exhaust gas, the directional control valve 15 is moved to the imaginary-line position in FIG. 1, venting the downstream exhaust pipe 5b to the atmosphere and shielding the bypass exhaust passage 10 of the exhaust gas purifier 8 from the atmosphere. The ECU 16 opens the on/off valve 14 in the EGR passage 13 under predetermined operating conditions of the engine 1. At this time, HCs that are released from the HC adsorbent 7 after the HC adsorbent 7 is heated by the exhaust gas flow through the EGR passage 13 into the intake pipe 4, and then combusted in the engine 1.

After the deterioration evaluating device 17 is activated, it performs a processing sequence shown in FIG. 4. The process shown in FIG. 4 is performed only when the engine 1 starts operating.

The deterioration evaluating device 17 determines the value of a flag F/HCPG in STEP1. The flag F/HCPG is "1" if the release of HCs adsorbed by the HC adsorbent 7 in a preceding operation of the engine 1 is completed, and "0" if not completed. The flag F/HCPG is set by the ECU 16 while the engine 1 is in operation. When the temperature of the HC adsorbent 7 is equal to or higher than a temperature at which HCs adsorbed by the HC adsorbent 7 are released, the ECU 16 determines an integrated value of the amount of gas that has flowed through the EGR passage 13 when the on/off valve 14 in the EGR passage 13 is open.

If the determined integrated value becomes equal to or higher than a predetermined value, then the ECU 16 judges that the release of HCs adsorbed by the HC adsorbent 7 is completed (at this time, the release of moisture adsorbed by the HC adsorbent 7 is also completed). The ECU 16 thus sets the flag F/HCPG to "1". If the determined integrated value is lower than the predetermined value, then the ECU 16 sets the flag F/HCPG to "0". The flag F/HCPG is stored in a nonvolatile memory such as an EEPROM or the like (not shown) when the engine 1 is shut off, so that the flag F/HCPG will not be lost when the engine 1 is not operating.

If F/HCPG=0 in STEP1, then since the release of HC and moisture from the HC adsorbent 12 is not completed in the preceding operation of the engine 1, i.e., the HC adsorbent 7 has already adsorbed moisture in the present operation of the engine 1, the deterioration evaluating device 17 sets a flag F/MCND to "0" in STEP10, and puts the operation sequence shown in FIG. 4 to an end. If the flag F/MCND is set to "0", then it means that the apparatus is in a state not suitable for evaluating the deteriorated state of the HC adsorbent 7 or the present process of evaluating the deteriorated state of the HC adsorbent 7 has already been finished. If the flag F/MCND is set to "1", then it means that the apparatus is in a state to evaluate a deteriorated state of the HC adsorbent 7.

If F/HCPG=1 in STEP1, then the deterioration evaluating device 17 acquires from the ECU 16 detected data representative of the present engine temperature TW (hereinafter referred to as "initial engine temperature TW") of the engine 1 as data representative of the temperature of the HC adsorbent 7 at the start of operation of the engine 1 in STEP2. If the apparatus has a temperature sensor for detecting the temperature of the HC adsorbent 7 or a nearby region, then the above data may be detected from the temperature sensor.

Thereafter, the deterioration evaluating device 17 determines whether the engine temperature TW is in a predetermined range (TWL≦TW≦THW) or not in STEP3. If the engine temperature TW is not in the predetermined range, then the deterioration evaluating device 17 judges that the apparatus is not in a state capable of adequately evaluating the deteriorated state of the HC adsorbent 7, and sets the flag F/MCND to "0" in STEP4 and then puts the operation sequence shown in FIG. 4 to an end. This is because the deteriorated state of the HC adsorbent 7 cannot adequately be evaluated if the temperature of the HC adsorbent 7 is excessively low (e.g., 0° C. or lower) or if the temperature of the HC adsorbent 7 is excessively high (e.g., 50° C. or higher).

In addition to determining the conditions in STEP1 and STEP3, the deterioration evaluating device 17 may determine whether soaking prior to the start of the present operation of the engine 1 has been completed or not. Specifically, the deterioration evaluating device 17 may determine whether the temperature of the engine 1 and its exhaust system (the exhaust gas purifier 8, etc.) has dropped to a temperature (steady temperature) which is about the same as the atmospheric temperature after the preceding operation of the engine 1 stopped. The completion of soaking may be determined based on whether the period of time that has elapsed after the engine 1 has stopped operating is a predetermined period of time (e.g., four hours) or more, or whether the engine temperature TW of the engine 1 has substantially converged to the atmospheric temperature. If it is judged that soaking is not completed, then the deterioration evaluating device 17 may judge that the apparatus is not in a state capable of adequately evaluating the deteriorated state of the HC adsorbent 7, and may set the flag F/MCND to "0". This is because when soaking is not completed, the humidity (relative humidity) in the vicinity of the HC adsorbent 7 and the ability of the HC adsorbent 7 to adsorb moisture tend to be unstable due to the remaining heat of the engine 1 and the HC adsorbent 7.

In the present embodiment, if the initial engine temperature TW is in the above predetermined range in STEP3, then the deterioration evaluating device 17 sets the value of the flag F/MCND to "1" in order to carry out the process of evaluating the deteriorated state of the HC adsorbent 7 in STEP4. If it is determined whether soaking has been completed or not, then the deterioration evaluating device 17 sets the value of the flag F/MCND to "1" if soaking has been completed and, in addition, the conditions of STEP1, STEP3 have been satisfied.

Thereafter, the deterioration evaluating device 17 acquires present data of the output voltage VRHUM of the humidity sensor 19 (detected data of the relative humidity) from the humidity sensor 19, and also acquires data of the resistance LBLR of the label resistive element 21 through the resistance detecting circuit 22 in STEP5.

The deterioration evaluating device 17 then stores the present value of the output voltage VRHUM of the humidity sensor 19 acquired in STEP5 as the initial value of a parameter VRHUM/MAX (hereinafter referred to as "maximum output parameter VRHUM/MAX") representative of the latest value of a maximum value of the output voltage VRHUM of the humidity sensor 19 and the initial value of a parameter VRHUM/PRE (hereinafter referred to as "preceding output parameter VRHUM/PRE") representative of a preceding value of the output voltage VRHUM (a preceding value in each cycle time of the processing sequence shown in FIG. 6 of the deterioration evaluating device 17) in STEP6. Since the output voltage VRHUM of the humidity sensor 19 according to the present embodiment has a negative humidity coefficient, i.e., it decreases as the relative humidity increases, as described above, the maximum value of the output voltage VRHUM of the humidity sensor 19 corresponds to the minimum value of the relative humidity (the relative humidity grasped from the output voltage VRHUM based on the characteristics shown in FIG. 2) that is detected by the humidity sensor 19.

Then, the deterioration evaluating device 17 determines a deterioration evaluating threshold TRSTMDT with which to determine whether the HC adsorbent 7 is in the deterioration-in-progress state or the non-deteriorated state from the detected data of the initial engine temperature TW acquired in STEP2 according to a predetermined data table as indicated by the solid-line curve in FIG. 5 in STEP7. The deterioration evaluating threshold TRSTMDT corresponds to the maximum amount of moisture that can be adsorbed by the HC adsorbent 7. As the initial humidity of the HC adsorbent 7 is lower, the maximum amount of moisture that can be adsorbed by the HC adsorbent 7, and hence the maximum amount of HCs that can be adsorbed by the HC adsorbent 7, are greater. The data table as indicated by the solid-line curve in FIG. 5 is determined by way of experimentation or the like such that the deterioration evaluating threshold TRSTMDT is greater as the initial engine temperature TW of the engine 1 is lower. According to the present embodiment, the period of time that has elapsed after the start of the operation of the engine 1 is used to grasp the total amount of moisture that has been adsorbed by the HC adsorbent 7 after the start of the operation of the engine 1. Therefore, the deterioration evaluating threshold TRST-MDT is a threshold relative to the period of time that has elapsed after the start of the operation of the engine 1. A graph as indicated by the broken-line curve in FIG. 5 is related to the third embodiment which will be described later on.

Then, the deterioration evaluating device 17 sets the values of parameters TM/SH, TMV/TSH, and VRHUM/INI for compensating for the effect of variations of the characteristics of individual units of the humidity sensor 19 in the process, to described later on, for evaluating the deteriorated state of the HC adsorbent 7, from the detected data of the resistance LBLR of the label resistive element 21 which has been acquired in STEP5, in STEP8. These parameters TM/SH, TMV/TSH, and VRHUM/INI, whose meanings will be described later on, are determined from the detected data of the resistance LBLR of the label resistive element 21 based on predetermined data tables corresponding respectively thereto.

Then, the deterioration evaluating device 17 initializes, to "0", the value of a timer TM (count-up timer) which measures a period of time that has elapsed from the start of the operation of the engine 1, and also initializes a flag F/RST, to be described later on, to "0" in STEP9. Thereafter, the processing sequence shown in FIG. 4 is ended.

Figure 6:
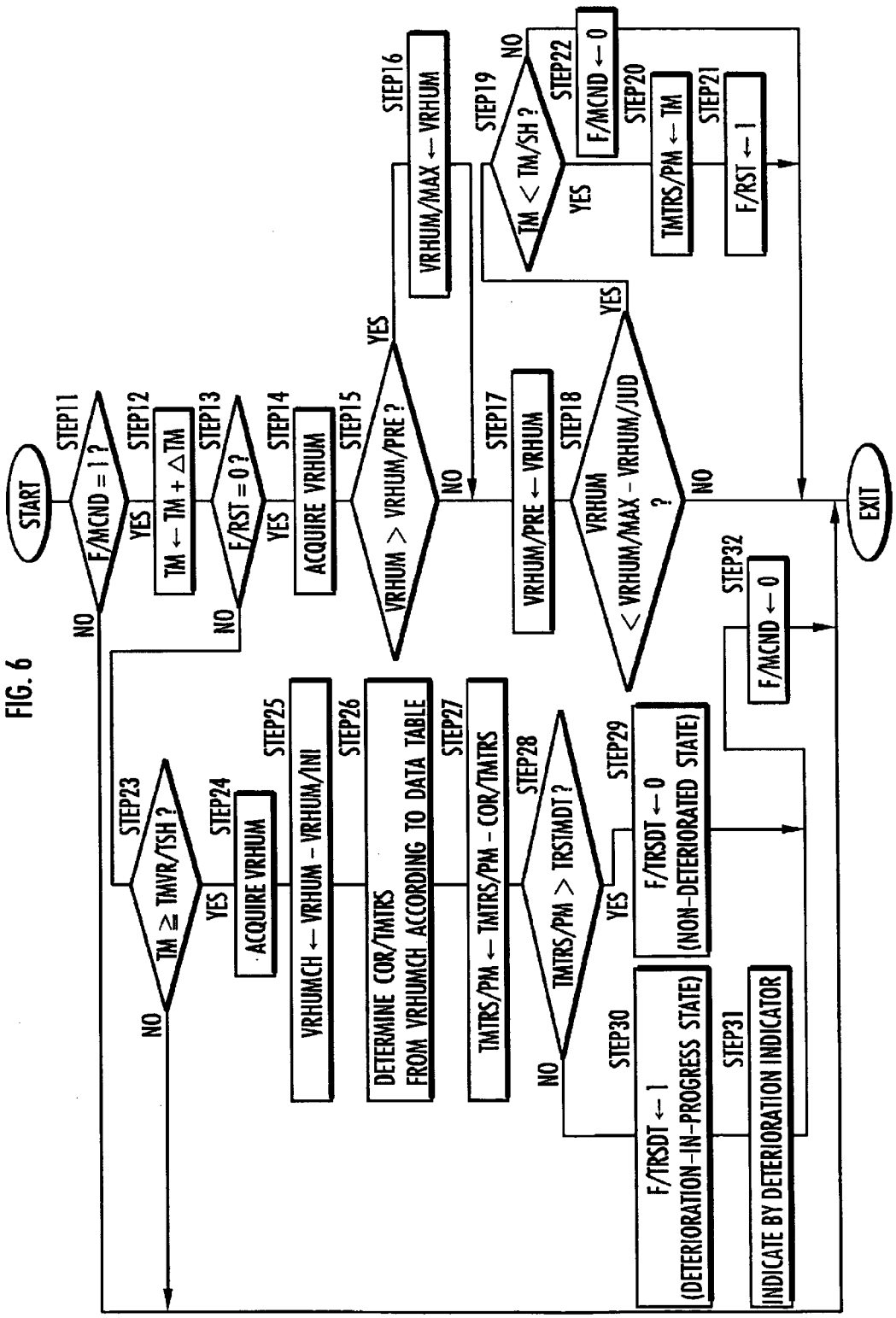
FIG. 6 is a flowchart of an operation sequence of the apparatus according to the first embodiment.

After having carried out the processing sequence shown in FIG. 4 when the engine 1 starts to operate, the deterioration evaluating device 17 carries out a processing sequence shown in FIG. 6 in a given cycle time to evaluate the deteriorated state of the HC adsorbent 7. According to the present embodiment, the processing sequence shown in FIG. 6 is performed while the engine 1 is idling immediately after the engine 1 has started to operate.

Prior to specifically describing the processing sequence shown in FIG. 6, a basic concept of the time-dependent transition of the output voltage VRHUM of the humidity sensor 19 after the engine 1 has started to operate and a process of evaluating the deteriorated state of the HC adsorbent 7 according to the present embodiment will first be described below.

When the engine 1 starts operating, it emits an exhaust gas that is supplied through the exhaust system downstream of the engine 1 to the HC adsorbent 7. At this time, since the exhaust system downstream of the engine 1 and the HC adsorbent 7 have their temperatures equal to or lower than the dew point of moisture in the exhaust gas, the relative humidity of the exhaust gas upstream of the HC adsorbent 7 is a substantially constant relatively high humidity (about 100%). When the exhaust gas is supplied to the HC adsorbent 7, moisture as well as HCs in the exhaust gas are adsorbed by the HC adsorbent 7. Therefore, the relative humidity of the exhaust gas at the location of the humidity sensor 19 downstream of the HC adsorbent 7 is relatively low, and the output voltage VRHUM of the humidity sensor 19 is a voltage having a relatively high level.

Figure 7:
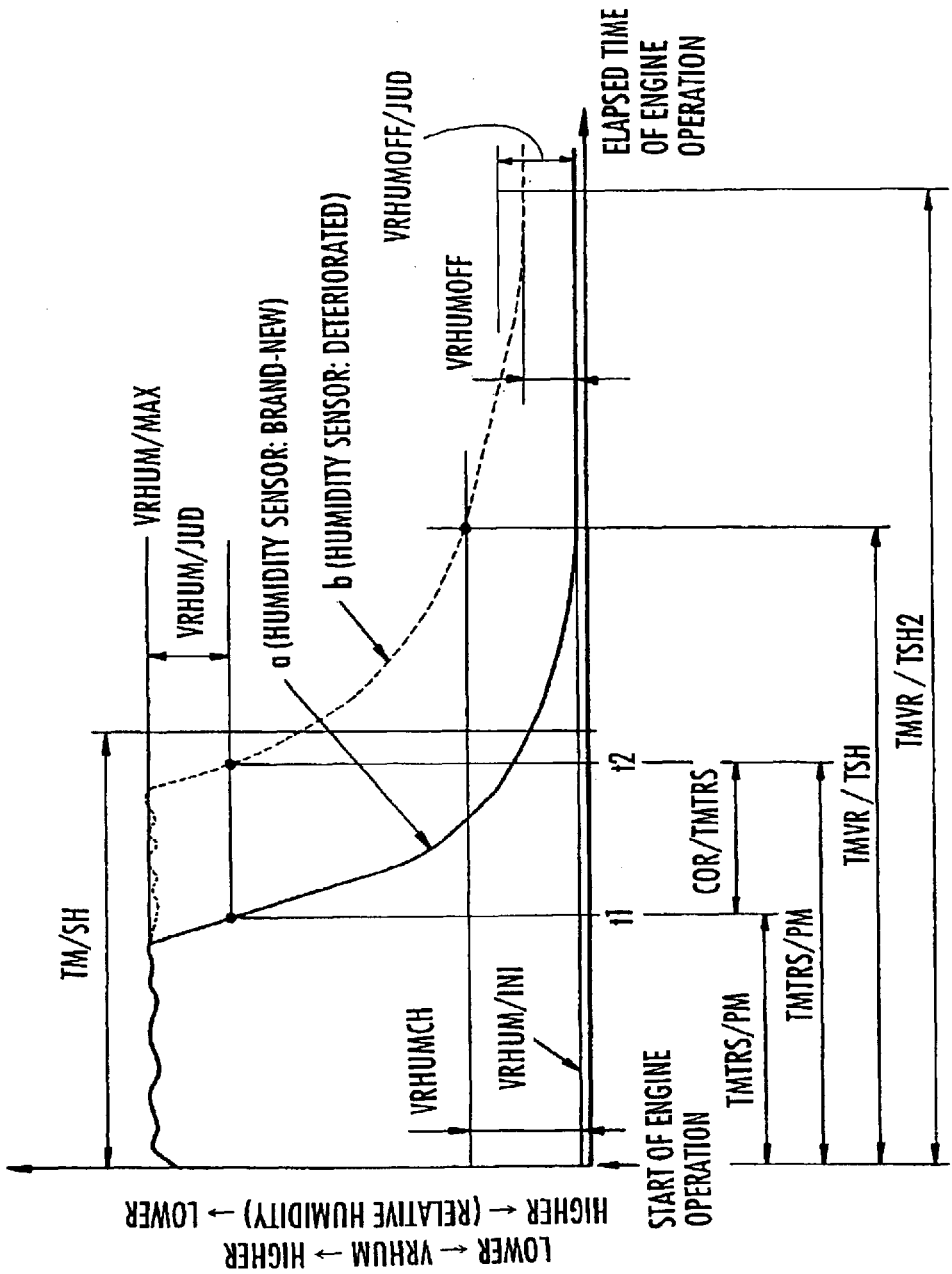
FIGS. 7 and 8 are graphs illustrative of a processing sequence of the flowchart of FIG. 6.

At this time, though the output voltage VRHUM of the humidity sensor 19 downstream of the HC adsorbent 7 slightly varies due to the effect of disturbances, it has a generally high constant level as indicated by the solid-line curve a, for example, in FIG. 7 immediately after the engine 1 has started to operate (the relative humidity of the exhaust gas at the location of the humidity sensor 19 is of a generally constant low level).

As the adsorption of moisture by the HC adsorbent 7 progresses until it becomes saturated (the adsorption of HCs by the HC adsorbent 7 also becomes saturated), the HC adsorbent 7 no longer adsorbs moisture. Thus, the relative humidity downstream of the HC adsorbent 7 increases monotonously toward a high relative humidity level inherent in the exhaust gas, i.e., the relative humidity of the exhaust gas upstream of the HC adsorbent 7. Thus, the relative humidity changes to a tendency to increase monotonously from a low humidity level toward a high humidity level. Therefore, the output voltage VRHUM of the humidity sensor 19 changes to a tendency to decrease monotonously from a high voltage level toward a low voltage level which corresponds to the relative humidity (substantially constant) inherent in the exhaust gas.

The integrated amount of moisture that is supplied to the HC adsorbent 7 after the engine 1 has started to operate up to the timing (changing timing) at which the output voltage VRHUM of the humidity sensor 16 changes from a high voltage level to the tendency to decrease monotonously, i.e., until the adsorption of moisture by the HC adsorbent 7, depends on the period of time that has elapsed from the start of operation of the engine 1 (hereinafter referred to as "engine operation elapsed time") while the engine 1 is idling, for example. As the HC adsorbent 7 is more deteriorated, the amounts of moisture and HCs that can be adsorbed by the HC adsorbent 7 are reduced. Therefore, the timing (changing timing) at which the output voltage VRHUM of the humidity sensor 16 changes to the tendency to decrease monotonously after the engine 1 has started to operate becomes earlier as the HC adsorbent 7 is more deteriorated.

According to the present embodiment, basically, the changing timing (time t1 in FIG. 7) at which the output voltage VRHUM of the humidity sensor 19 changes from the high voltage level to the tendency to decrease monotonously after the engine 1 has started to operate is detected, and an engine operation elapsed time TMTRS/PM at that changing timing is obtained as a basic parameter representative of the deteriorated state of the HC adsorbent 7. The basic parameter is then compared with a predetermined threshold to evaluate the deteriorated state of the HC adsorbent 7. In the present embodiment, the engine operation elapsed time serves as data representative of the integrated amount of moisture that is supplied by the exhaust gas to the HC adsorbent 7 after the engine 1 has started to operate.

The above transition of the output voltage VRHUM of the humidity sensor 19 is also affected by characteristic changes of the humidity sensor 19 due to aging thereof. The solid-line curve a in FIG. 7 represents the characteristics of the humidity sensor 19 when it is brand-new. When the humidity sensor 19 suffers characteristic changes due to deterioration thereof, the output voltage VRHUM of the humidity sensor 19 exhibits transitional characteristics as indicated by the broken-line curve b, for example, in FIG. 7 after the engine 1 has started to operate. Specifically, when the humidity sensor 19 suffers characteristic changes due to deterioration thereof, the changing timing (time t2 in FIG. 7) at which the output voltage VRHUM of the humidity sensor 19 changes to the tendency to decrease monotonously due to the saturation of the adsorption of moisture by the HC adsorbent 7 is later than if the humidity sensor 19 is normal (if the humidity sensor 19 is brand-new). Even when the relative humidity of the exhaust gas at the location of the humidity sensor 19 finally becomes its inherent relative humidity (substantially 100%) due to the saturation of the HC adsorbent 7, the output voltage VRHUM of the humidity sensor 19 is of a level higher than if the humidity sensor 19 is normal. Thus, the output voltage VRHUM of the humidity sensor 19 undergoes an offset. Though the changing timing at which the output voltage VRHUM of the humidity sensor 19 changes to the tendency to decrease monotonously is affected by the deteriorated state of the humidity sensor 19, the output voltage VRHUM of the humidity sensor 19 at the time the relative humidity of the exhaust gas at the location of the humidity sensor 19 becomes its inherent relative humidity (substantially 100%) basically changes only due to the characteristic changes of the humidity sensor 19.

The transitional characteristics of the output voltage VRHUM of the humidity sensor 19 also suffer slight variations due to variations of the response characteristics of different individual units of the humidity sensor 19 even if they are deteriorated to the same extent. For example, the period of time (time TMVR/TSH in FIG. 7) required for the output voltage VRHUM of the humidity sensor 19 to reach a low level voltage or a voltage close thereto which corresponds to the inherent relative humidity of the exhaust gas after the HC adsorbent 7 is saturated, suffers slight variations among different individual units of the humidity sensor 19 due to variations of the response characteristics of those different individual units of the humidity sensor 19 even if they are brand-new. Furthermore, the output voltage VRHUM (VRHUM/INI in FIG. 7) of the humidity sensor 19 when the relative humidity of the exhaust gas at the location of the humidity sensor 19 is a substantially constant inherent relative humidity also suffers slight variations among different individual units of the humidity sensor 19 due to variations of the circuit characteristics of those different individual units of the humidity sensor 19 even if they are brand-new.

In the process of evaluating the deteriorated state of the HC adsorbent 7 according to the present embodiment, the above characteristic changes of the humidity sensor 19 and variations of the characteristics of different individual units of the humidity sensor 19 are compensated for.

Based on the concept described above, the processing sequence according to the flowchart shown in FIG. 6 will be described below. The deterioration evaluating device 17 carries out an operation sequence shown in FIG. 6 in a given cycle time after the engine 1 has been activated. According to the operation sequence shown in FIG. 6, the deterioration evaluating device 17 determines the value of the flag F/MCND set in the processing sequence shown in FIG. 4 in STEP11. If F/MCND=0, then it means that the apparatus is in a state not suitable for evaluating the deteriorated state of the HC adsorbent 7 or the present process of evaluating the deteriorated state of the HC adsorbent 7 has already been finished. Therefore, the deterioration evaluating device 17 puts the processing sequence shown in FIG. 6 to an end.

If F/MCND=1, then the deterioration evaluating device 17 increments the value of the timer TM, which has been initialized to "0" in the processing sequence shown in FIG. 4 when the engine 1 starts to operate, for measuring the engine operation elapsed time, by a predetermined value ΔTM (fixed value) in STEP12, and then determines the value of a flag F/RST in STEP13. The flag F/RST is "1" when the detection of the changing timing at which the output voltage VRHUM of the humidity sensor 19 changes from the high level voltage to the tendency to decrease monotonously is finished, and "0" when the detection of the changing timing is not finished. Inasmuch as the value of the flag F/RST is initialized when the engine 1 starts to operate, F/RST=0 immediately after the engine 1 has started to operate. Because the value of the timer TM represents the engine operation elapsed time, the engine operation elapsed time will hereinafter be denoted by TM.

If F/RST=0 in STEP13, then the deterioration evaluating device 17 acquires the present data of the output voltage VRHUM of the humidity sensor 19 in STEP14, and compares the value of the relative humidity VHUMD and the preceding output parameter VRHUM/PRE with each other in STEP15. If VRHUM>VRHUM/PRE, then the deterioration evaluating device 17 updates the value of the maximum output parameter VRHUM/MAX with the present value of the output voltage VRHUM of the humidity sensor 19 in STEP16, and thereafter updates the value of the preceding output parameter VRHUM/PRE with the present value of the output voltage VRHUM in STEP17. If VRHUM≦VRHUM/PRE in STEP15, then the deterioration evaluating device 17 does not update the value of the maximum output parameter VRHUM/MAX, but updates the value of the preceding output parameter VRHUM/PRE in STEP17.

According to the processing in STEP15 through STEP17, after the engine 1 has started to operate, the maximum value of the output voltage VRHUM of the humidity sensor 19 (the minimum value of the relative humidity which is represented by the output voltage VRHUM) is sequentially detected.

Then, the deterioration evaluating device 17 compares the present value of the output voltage VRHUM of the humidity sensor 19 with the value (VRHUM/MAX−VRHUM/JUD) which is produced by subtracting a predetermined value VRHUM/JUD from the present value of the maximum output parameter VRHUM/MAX in STEP18. If VRHUM≧VRHUM/MAX−VRHUM/JUD, then it is judged that the timing of the present cycle time is not the changing timing at which the output voltage VRHUM of the humidity sensor 19 changes to the tendency to decrease monotonously (the timing at which the adsorption of moisture and HCs by the HC adsorbent 7 is saturated, hereinafter also referred to as "adsorption saturation timing"), and the present processing sequence shown in FIG. 6 is ended.

If VRHUM<VRHUM/MAX−VRHUM/JUD in STEP18, then the deterioration evaluating device 17 judges that the timing of the present cycle time is the adsorption saturation timing (the time t1 or t2 in FIG. 7), and compares the present engine operation elapsed time TM with the value of the parameter TM/SH (see FIG. 7) that is set depending on the resistance LBLR of the label resistive element 21 according to the processing sequence shown in FIG. 4 in STEP19. The parameter TM/SH is signified as an upper limit for the engine operation elapsed time TM at a timing that is appropriate as the adsorption saturation timing. Since the parameter TM/SH is set depending on the resistance of the label resistive element 21, it matches the individual characteristics of the humidity sensor 19.

If TM<TM/SH in STEP19, then the deterioration evaluating device 17 judges that the timing of the present cycle time is an appropriate adsorption saturation timing, and stores the present engine operation elapsed time TM as the value (basic value) of a deterioration evaluating parameter TMTRS/PM for evaluating the deteriorated state of the HC adsorbent 7 in STEP20. Since the detection of the adsorption saturation timing is properly finished in this case, the deterioration evaluating device 17 sets the value of the flag F/RST to "1" in STEP21, and puts the present processing sequence shown in FIG. 6 to an end. In this case, therefore, F/RST=1 in STEP13 from the next cycle time, and the processing from STEP23, to be described later on, is performed.

If TM≧TM/SH in STEP19, then since the adsorption saturation timing is excessively later than and inappropriate for the individual characteristics of the humidity sensor 19, the deterioration evaluating device 17 sets the value of the flag F/MCND to "0" in STEP22, and puts the present processing sequence shown in FIG. 6 to an end. In this case, therefore, F/MCND=0 in STEP11 from the next cycle time, and the present processing sequence shown in FIG. 6 is immediately put to an end. The state in which TM≧TM/SH in STEP19 is basically a state in which it is highly possible for the humidity sensor 19 to be suffering a failure, and usually TM<TM/SH in this state. Therefore, the parameter TM/SH is not necessarily required to be set for each individual unit of the humidity sensor 19, but may be set to a predetermined fixed value in view of variations of individual units of the humidity sensor 19.

According to the processing sequence described above, the time (the time t1 with respect to the curve a or the time t2 with respect to the curve b in FIG. 7) at which the output voltage VRHUM of the humidity sensor 19 has decreased the predetermined value VRHUM/JUD from the finally acquired maximum value VRHUM/MAX after the engine 1 has started to operate is detected as the adsorption saturation timing (the changing timing at which the output voltage VRHUM changes to the tendency to decrease monotonously), and the engine operation elapsed time TM (which corresponds to the integrated amount of moisture supplied to the HC adsorbent until the adsorption saturation timing) at the adsorption saturation timing is obtained as the basic value of the deterioration evaluating parameter TMTRS/PM. If the parameter TM/SH (see FIG. 7) is provided which determines the upper limit for the engine operation elapsed time TM at the adsorption saturation timing, and the parameter TM/SH is set depending on the resistance of the label resistive element 21 corresponding to the characteristics of individual units of the humidity sensor 19, an inappropriate deterioration evaluating parameter TMTRS/PM is prevented from being obtained while compensating for characteristic variations among individual units of the humidity sensor 19.

After the deterioration evaluating parameter TMTRS/PM has thus been obtained, since F/RST=1 in STEP13, the deterioration evaluating device 17 compares the present engine operation elapsed time TM with the parameter TMVR/TSH which has been set depending on the resistance of the label resistive element 21 in the processing sequence shown in FIG. 4 (depending on the characteristics of the individual unit of the humidity sensor 19) in STEP23. Referring to FIG. 7, the parameter TMVR/TSH is signified as a reference value of the engine operation elapsed time TM until the output voltage VRHUM of the humidity sensor 19 reaches a value (a substantially constant value) corresponding to the inherent humidity of the exhaust gas after the adsorption of moisture and HCs by the HC adsorbent 7 has been saturated when the humidity sensor 19 is brand-new. Since the parameter TMVR/TSH has been set depending on the resistance of the label resistive element 21, it matches the characteristics of the individual unit of the humidity sensor 19.

Figure 9:
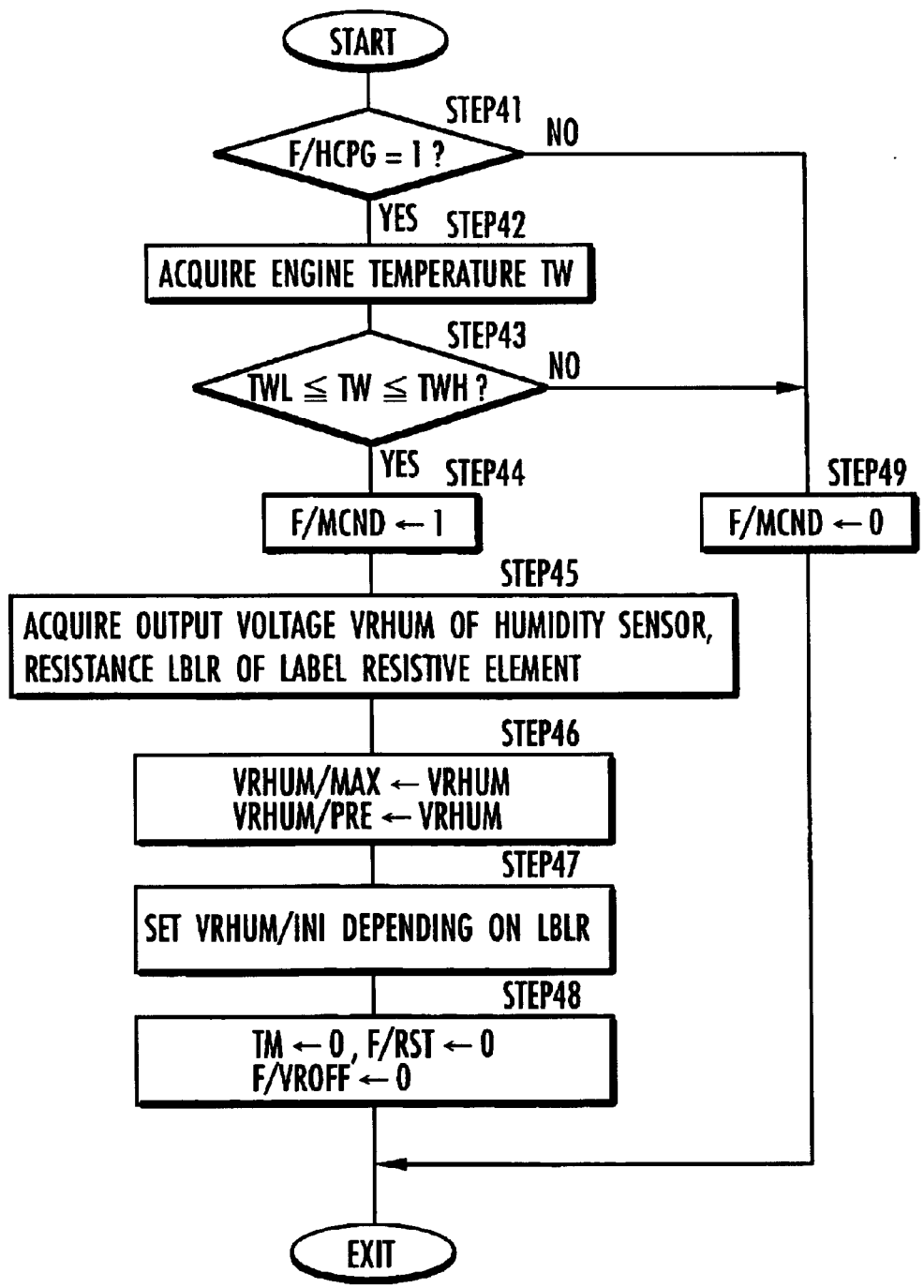
FIGS. 9 through 12 are flowcharts of an operation sequence of the apparatus according to the second embodiment of the present invention.

If TM<TMVR/TSH in STEP23, then the deterioration evaluating device 17 puts the processing sequence shown in FIG. 9 in the present cycle time to an end. Therefore, until TM≧TMVR/TSH, i.e., until the engine operation elapsed time TM reaches the time represented by the value of the parameter TMVR/TSH, the decision in STEP23 is made in each cycle time of the processing of the deterioration evaluating device 17. If TM≧TMVR/TSH, then the deterioration evaluating device 17 acquires the detected data of the present output voltage VRHUM of the humidity sensor 19, i.e., the data of the output voltage VRHUM at the time the engine operation elapsed time TM reaches the time represented by the value of the parameter TMVR/TSH, in STEP24. Thereafter, the deterioration evaluating device 17 determines a value (=VRHUM−VRHUM/INI) which is produced by subtracting the value of the parameter VRHUM/INI set depending on the resistance of the label resistive element 21 (depending on the characteristics of the individual unit of the humidity sensor 19) in the processing sequence shown in FIG. 4, from the acquired present value of the output voltage VRHUM, as a characteristic change parameter VRHUMCH representative of a characteristic change of the humidity sensor 19 in STEP25. The data of the output voltage VRHUM of the humidity sensor 19 acquired in STEP24 corresponds to characteristic change detecting output data according to the present invention.

Referring to FIG. 7, the predetermined value VRHUM/INI is signified as a reference value of the output voltage VRHUM at the time the output voltage VRHUM of the humidity sensor 19 reaches a value (a substantially constant value) corresponding to the inherent humidity of the exhaust gas when the humidity sensor 19 is brand-new. Since the parameter VRHUM/INI has been set depending on the resistance of the label resistive element 21, it matches the characteristics of the individual unit of the humidity sensor 19. Therefore, when the humidity sensor 19 is brand-new (the curve a in FIG. 7), the characteristic change parameter VRHUMCH is "0" irrespective of the individual unit of the humidity sensor 19. If the humidity sensor 19 is deteriorated and its characteristics are changed (the curve b in FIG. 7), VRHUMCH>0 as shown in FIG. 7.

Figure 8:
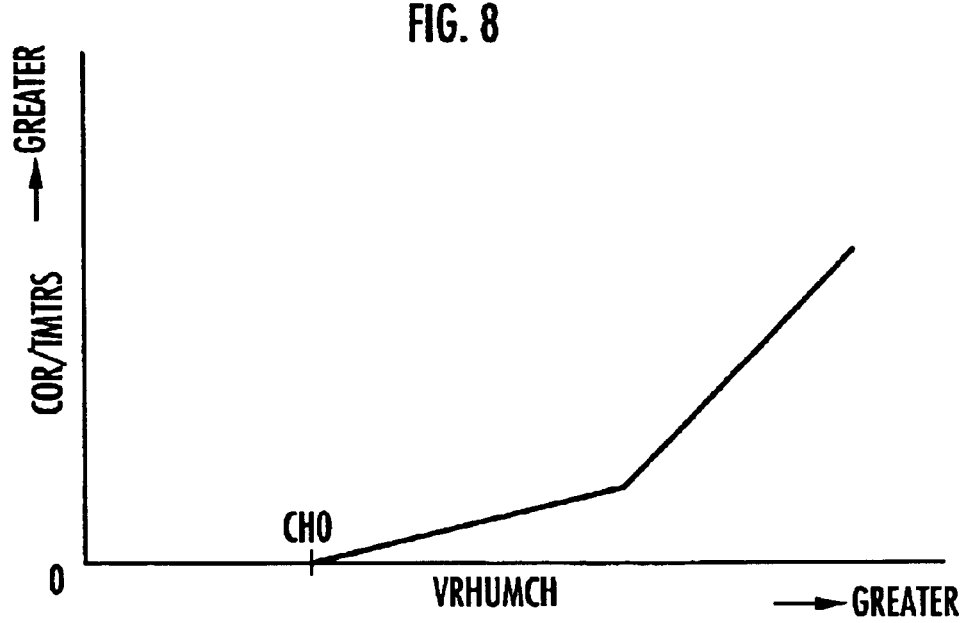

After having determined the characteristic change parameter VRHUMCH as described above, the deterioration evaluating device 17 determines a corrective quantity COR/TMTRS for correcting the value of the deterioration evaluating parameter TMTRS/PM from the characteristic change parameter VRHUMCH based on a predetermined data table shown in FIG. 8 in STEP26.

The corrective quantity COR/TMTRS corrects the deterioration evaluating parameter TMTRS/PM by being subtracted from the deterioration evaluating parameter TMTRS/PM. The value of the characteristic change parameter VRHUMCH is substantially "0" if the humidity sensor 19 is brand-new or nearly brand-new. However, if the humidity sensor 19 is deteriorated to a certain extent, then the value of the characteristic change parameter VRHUMCH increases as the humidity sensor 19 is more deteriorated. As described above, when the humidity sensor 19 is deteriorated, the timing (the changing timing) at which the output voltage VRHUM of the humidity sensor 19 starts to decrease monotonously due to the saturation of the adsorption of moisture by the HC adsorbent 7 becomes later than if the humidity sensor 19 is normal (if the humidity sensor 19 is brand-new). Therefore, the adsorption saturation timing detected in STEP18 becomes later. Consequently, the data table shown in FIG. 8 is determined such that the corrective quantity COR/TMTRS is COR/TMTRS=0 if the value of the characteristic change parameter VRHUMCH is of a sufficiently small value (VRHUMCH≦CH0 in FIG. 8). The data table shown in FIG. 8 is also determined such that if the value of the characteristic change parameter VRHUMCH is large to a certain extent (VRHUMCH>CH0 in FIG. 8), the corrective quantity COR/TMTRS is of a larger value as the characteristic change parameter VRHUMCH is larger. The corrective quantity COR/TMTRS basically serves to correct the value of the deterioration evaluating parameter TMTRS/PM which is obtained when the humidity sensor 19 suffers a characteristic change due to its deterioration (the curve b in FIG. 7), into the deterioration evaluating parameter TMTRS/PM which is obtained when the humidity sensor 19 brand-new (the curve a in FIG. 7).

After having determined the corrective quantity COR/TMTRS, the deterioration evaluating device 17 subtracts the corrective quantity COR/TMTRS from the value of the deterioration evaluating parameter TMTRS/PM obtained in STEP20, thus correcting the deterioration evaluating parameter TMTRS/PM in STEP27. Since the deterioration evaluating parameter TMTRS/PM thus determined has been corrected by the corrective quantity COR/TMTRS depending on the characteristic change parameter VRHUMCH, it has been compensated for the characteristic change of the humidity sensor 19 due to its deterioration. Furthermore, in this case, because the output voltage VRHUM of the humidity sensor 19 corresponding to the characteristic change parameter VRHUMCH is the output voltage VRHUM at the time when the time represented by the parameter TMVR/TSH set to cause the engine operation elapsed time TM to match the characteristics of the individual unit of the humidity sensor 19 has elapsed, the output voltage VRHUM has also been compensated for the characteristic variation of the individual unit of the humidity sensor 19. The characteristic change parameter VRHUMCH is produced by subtracting the parameter VRHUM/INI as the reference value of the output voltage VRHUM of the individual unit of the humidity sensor 19 from the output voltage VRHUM of the humidity sensor 19 which corresponds to the characteristic change parameter VRHUMCH. Therefore, the deterioration evaluating parameter TMTRS/PM obtained in STEP27 depends on the deteriorated state of the HC adsorbent 7 irrespective of the characteristic change of the humidity sensor 19 due to its deterioration and the characteristic variation of the individual unit of the humidity sensor 19. Since the corrective quantity COR/TMTRS is set to "0" when the characteristic change parameter VRHUMCH is smaller than the predetermined value CH0 (see FIG. 8), the deterioration evaluating parameter TMTRS/PM is not virtually corrected (is prohibited from being corrected) when VRHUMCH<CH0 (the characteristic change detected by the humidity sensor 19 is sufficiently small).

Then, the deterioration evaluating device 17 compares the deterioration evaluating parameter TMTRS/PM corrected as described above with the deterioration evaluating threshold TRSTMDT that has been set depending on the initial engine temperature TW of the engine 1 in the processing sequence shown in FIG. 4 in STEP28. If TMTRS/PM>TRSTMDT, then the deterioration evaluating device 17 judges that the HC adsorbent 7 is in the non-deteriorated state, and sets the value of a flag F/TRSDT to "0" in STEP29. Then, the deterioration evaluating device 17 resets the value of the flag F/MCND to "0" in step S32, and thereafter puts the processing sequence shown in FIG. 6 to an end. The flag F/TRSDT set in STEP29 is a flag which is "0" when the HC adsorbent 7 is in the non-deteriorated state and "1" when the HC adsorbent 7 is in the deterioration-in-progress state.

If TMTRS/PM≦TRSTMDT in STEP28, then the deterioration evaluating device 17 judges that the HC adsorbent 7 is in the deterioration-in-progress state, and sets the value of the flag F/TRSDT to "1" in STEP30. Then, the deterioration evaluating device 17 controls the deterioration indicator 18 to indicate that the HC adsorbent 7 is in the deterioration-in-progress state in STEP31. Thereafter, the deterioration evaluating device 17 resets the value of the flag F/MCND to "0" in STEP32, and thereafter puts the processing sequence shown in FIG. 6 to an end.

In the present embodiment described above, inasmuch as the deteriorated state of the HC adsorbent 7 is evaluated based on the deterioration evaluating parameter TMTRS/PM which has been determined to compensate for a characteristic change of the humidity sensor 19 due to its deterioration and a characteristic variation of the individual unit of the humidity sensor 19, the deteriorated state of the HC adsorbent 7 can be evaluated appropriately irrespective of the characteristic change of the humidity sensor 19 due to its deterioration and the characteristic variation of the individual unit of the humidity sensor 19. Since the characteristic change of the humidity sensor 19 due to its deterioration and the characteristic variation of the individual unit of the humidity sensor 19 can be compensated for, the requirements for the steadiness of the characteristics of individual units of the humidity sensor 19 and the uniformity of the characteristics of each of the individual units of the humidity sensor 19 are lessened. Therefore, the costs needed to develop and manufacture the humidity sensor 19 can be reduced.

In the embodiment described above, the deteriorated state of the HC adsorbent 7 is evaluated. However, the present invention is also applicable to the monitoring of the adsorption of HCs or moisture by the HC adsorbent 7 to determine, e.g., whether the adsorption of moisture and HCs by the HC adsorbent 7 has been saturated or not.

In the above embodiment, the deterioration evaluating parameter TMTRS/PM is corrected depending on the characteristic change parameter VRHUMCH. However, the deterioration evaluating threshold TRSTMDT, rather than the deterioration evaluating parameter TMTRS/PM, may be corrected. In such a case, the deterioration evaluating threshold TRSTMDT may be corrected by adding the corrective quantity COR/TMTRS to the deterioration evaluating threshold TRSTMDT, and the corrected deterioration evaluating threshold TRSTMDT may be compared with the deterioration evaluating parameter TMTRS/PM (which is obtained in STEP20 shown in FIG. 6).

In the above embodiment, if the value of the characteristic change parameter VRHUMCH becomes greater than a suitable upper limit value (if VRHUMCH becomes excessively large), then the humidity sensor 19 may possibly be excessively deteriorated or may possibly suffer a failure. In this case, the substantial evaluation of the deteriorated state of the HC adsorbent 7 (the processing from STEP26 shown in FIG. 6) may not be performed.

In the above embodiment, the engine operation elapsed time TM is used as data representative of the integrated amount of moisture given to the HC adsorbent 7 after the engine 1 has started to operate. However, the integrated value of the amount of fuel supplied from the start of operation of the engine 1 (which may be a command value generated by the ECU 16), or the integrated value of a detected or estimated value of the amount of intake air from the start of operation of the engine 1 may be used as data representative of the integrated amount of moisture. In this case, the engine 1 may not be idling after it has started to operate.

A second embodiment of the present invention will be described below with reference to FIGS. 1 through 3 and FIGS. 9 through 14. The present embodiment differs from the first embodiment only as to a portion of the apparatus arrangement and the processing sequence of the deterioration evaluating device. Therefore, those parts of the second embodiment which are identical to those of the first embodiment are denoted by reference characters that are identical to those of the first embodiment, and will not be described in detail below.

According to the present embodiment, as shown in FIG. 1, the apparatus has, in addition to the structural details of the first embodiment, an air-fuel ratio sensor 23 mounted on the first exhaust pipe 5a upstream of the catalytic converter 6 for detecting the air-fuel ratio of the air-fuel mixture which has been combusted by the engine 1, and an atmospheric temperature sensor 24 for detecting the temperature of the atmosphere as the temperature outside of the engine 1 and its exhaust system (the exhaust pipe 5, etc.). The other structural details of the apparatus are identical to those of the first embodiment.

According to the present embodiment, the deterioration evaluating device 17 performs a flowchart shown in FIG. 9 when the engine 1 starts to operate. The processing sequence shown in FIG. 9 is different from the processing sequence shown in FIG. 4 only as to the processing in STEP47, STEP48. The processing in STEP41 through STEP46 and STEP49 is identical to the processing in STEP1 through STEP6 and STEP10 shown in FIG. 4.

The processing that is different from the first embodiment will be described below. In STEP47 (which corresponds to STEP8 in FIG. 4), the deterioration evaluating device 17 sets the value of the parameter VRHUM/INI (see FIG. 7) for compensating for the effect of characteristic variations of individual units of the humidity sensor 19 in a process, to be described later on, for evaluating the deterioration of the HC adsorbent 7, from the detected data of the resistance LBLR of the label resistive element 21 which has been acquired in STEP45. The significance of VRHUM/INI and the manner in which it is set are identical to those of the first embodiment. The parameters TM/SH, TMVR/TSH described in the first embodiment are not set in the present embodiment. As described later on, according to the present embodiment, the parameter TM/SH is set to a predetermined fixed value. In the present embodiment, a parameter TMVR/TSH2 (see FIG. 7) set to a predetermined fixed value is used instead of the parameter TMVR/TSH.

In STEP48 (which corresponds to STEP9 shown in FIG. 4) following STEP47, the deterioration evaluating device 17 initializes, to "0", the value of the timer TM (count-up timer) which measures a period of time that has elapsed from the start of operation of the engine 1, and also initializes the flag F/RST (the flag indicative of whether the detection of the timing at which the output voltage VRHUM of the humidity sensor 19 changes to the tendency to decrease monotonously is finished or not) to "0".

According to the present embodiment, the deterioration evaluating device 17 additionally initializes the value of a flag F/VROFF, to be described later on, to According to the present embodiment, the processing corresponding to STEP7 shown in FIG. 4 according to the first embodiment (the setting of the deterioration evaluating threshold TRSTMDT) is not performed. This is because the parameter used to evaluate the deteriorated state of the HC adsorbent 7 in the present embodiment differs from the parameter used in the first embodiment.

In the processing sequence shown in FIG. 9, as with the first embodiment, in addition to determining the conditions in STEP1 and STEP3, the deterioration evaluating device 17 may determine whether soaking has been completed or not for setting the value of the flag F/MCND, and may set the value of the flag F/MCND to "0" if soaking has not been completed.

Figure 10:
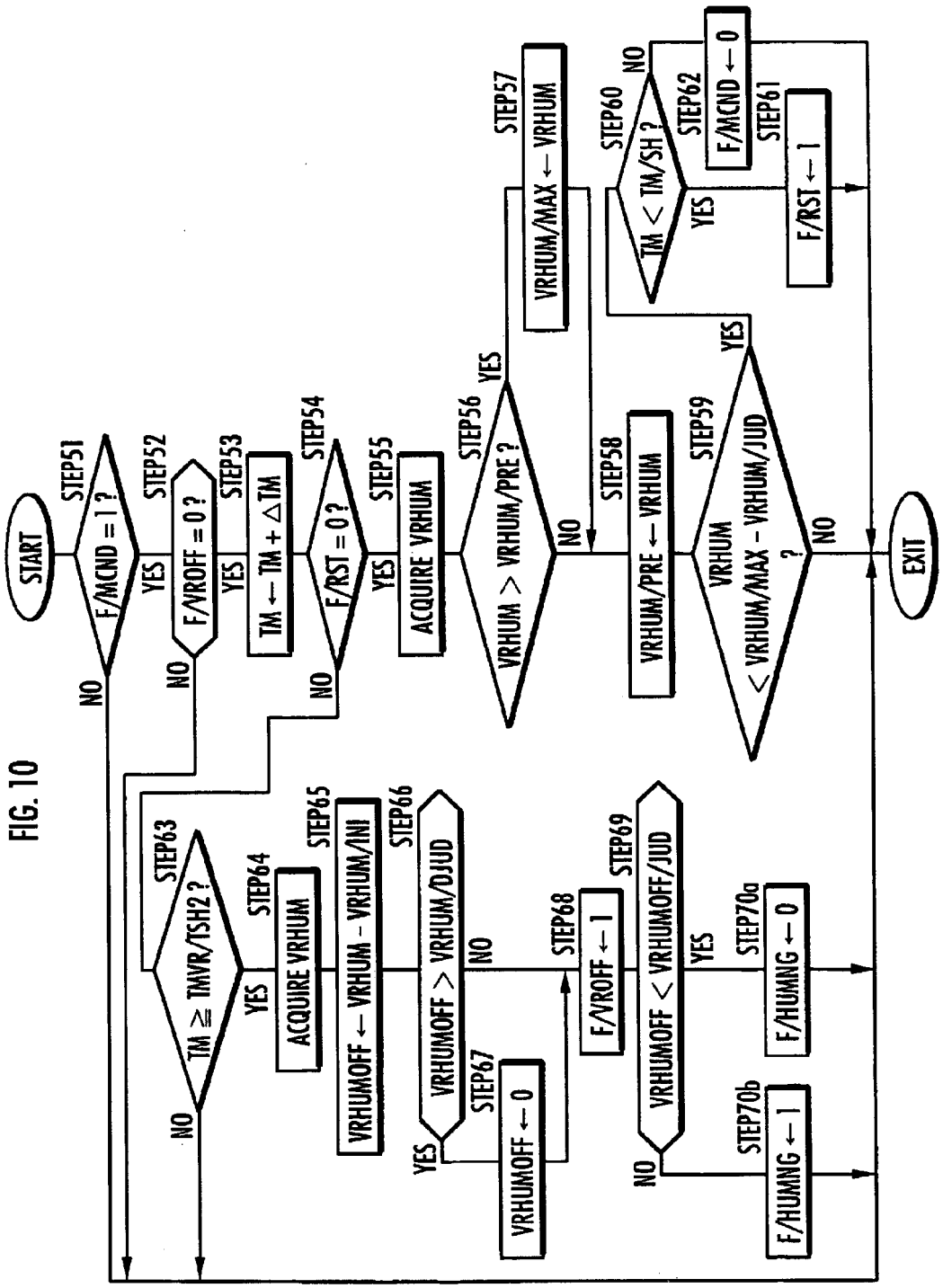

After having performed the processing sequence shown in FIG. 9 when the engine 1 starts to operate, the deterioration evaluating device 17 performs a processing sequence shown in a flowchart of FIG. 10 in a predetermined cycle time while the engine 1 is in operation. The processing sequence shown in FIG. 10 is basically a process of grasping a characteristic change of the humidity sensor 19 based on the transitional characteristics of the output voltage VRHUM of the humidity sensor 19 after the engine 1 has started to operate, as described above with reference to FIG. 7, and has many processing details common to the processing sequence shown in FIG. 6 according to the first embodiment. The processing sequence shown in FIG. 10 according to the present embodiment is performed regardless of whether the engine 1 is idling or not.

More specifically, the deterioration evaluating device 17 determines the value of the flag F/MCND set in the processing sequence shown in FIG. 9 in STEP51 as with the first embodiment. If F/MCND=0, then since it is not appropriate in detecting a characteristic change of the humidity sensor 19, the deterioration evaluating device 17 puts the processing sequence shown in FIG. 10 to an end.

If F/MCND=1 in STEP51, then the deterioration evaluating device 17 determines the value of a flag F/VROFF in STEP52. The flag F/VROFF is "1" if the data of a characteristic change parameter VRHUMOFF, to be described later on, has been acquired, and "0" if the data of the characteristic change parameter VRHUMOFF has not been acquired. When the engine 1 has started to operate, the characteristic change parameter VRHUMOFF has been initialized to "0" in STEP48 shown in FIG. 9. The processing sequence shown in FIG. 10 is basically a process of acquiring the data of the characteristic change parameter VRHUMOFF. If VRHUMOFF=1 in STEP52, then the processing sequence shown in FIG. 10 is put to an end.

If F/VROFF=0 in STEP52, then the deterioration evaluating device 17 performs the same processing as the processing in STEP12 through STEP22 according to the first embodiment in STEP53 through STEP62. Specifically, the deterioration evaluating device 17 sequentially determines the maximum output parameter VRHUM/MAX (see FIG. 7) as the maximum value of the output voltage VRHUM of the humidity sensor 19 in STEP53 through STEP58 after the engine 1 has started to operate. This processing is exactly the same as with the first embodiment.

If the engine operation elapsed time TM when the output voltage VRHUM of the humidity sensor 19 becomes VRHUM<VRHUM/MAX−VRHUM/JUD (YES in STEP59, the time t1 or t2 in FIG. 7) falls in the time of the parameter TM/SH after the engine 1 has started to operate (YES in STEP60), then the value of the flag F/RST is set to "1" in STEP61. If the engine operation elapsed time TM exceeds the time of the parameter TM/SH (NO in STEP60), then the value of the flag F/RST is set to "0" in STEP62. In the present embodiment, the value of the parameter TM/SH is basically set such that the output voltage VRHUM of the humidity sensor 19 becomes VRHUM<VRHUM/MAX−VRHUM/JUD within the time of the parameter TM/SH irrespective of characteristic variations of individual units of the humidity sensor 19.

Since the processing sequence shown in FIG. 10 according to the present embodiment is performed regardless of whether the engine 1 is idling or not, the engine operation elapsed time TM does not necessarily correspond to the integrated amount of moisture supplied to the HC adsorbent 7. According to the present embodiment, since the parameter for evaluating the deteriorated state of the HC adsorbent 7 is different from the parameter in the first embodiment, the value of the engine operation elapsed time TM when the output voltage VRHUM of the humidity sensor 19 becomes VRHUM<VRHUM/MAX−VRHUM/JUD within the time of the parameter TM/SH is not stored. That is, the processing which corresponding to STEP20 shown in FIG. 6 is not performed in the present embodiment. The processing in STEP53 through STEP62 according to the present embodiment differs from the processing in STEP12 through STEP22 shown in FIG. 6 according to the first embodiment only as to this point.

If the value of the flag F/RST is set in STEP61, then F/RST=1 in the decision processing in STEP54. At this time, the deterioration evaluating device 17 compares the engine operation elapsed time TM with a predetermined value TMVR/TSH2 in STEP63. The predetermined value TMVR/TSH2 corresponds to the parameter TMVR/TSH in the first embodiment, and is a predetermined fixed value according to the present embodiment. More specifically, as shown in FIG. 7, the predetermined value TMVR/TSH2 is determined by way of experimentation or the like such that when the engine operation elapsed time TM reaches the predetermined value TMVR/TSH2, the humidity of the exhaust gas detected by the humidity sensor 19 is a steady humidity (a substantially constant humidity inherent in the exhaust gas as described above) after the adsorption of moisture by the HC adsorbent 7 is saturated. According to the present embodiment, therefore, the predetermined value TMVR/TSH2 is set to a value which is sufficiently larger than the parameter TMVR/TSH used in the first embodiment.

Then, the deterioration evaluating device 17 acquires the detected data of the present output voltage VRHUM of the humidity sensor 19, i.e., the data of the output voltage VRHUM at the time the engine operation elapsed time TM reaches the time represented by the value of the predetermined parameter TMVR/TSH2, in STEP64. Thereafter, the deterioration evaluating device 17 determines a value (=VRHUM−VRHUM/INI) which is produced by subtracting the value of the parameter VRHUM/INI set depending on the resistance of the label resistive element 21 (depending on the characteristics of the individual unit of the humidity sensor 19) in the processing sequence shown in FIG. 4, from the acquired output voltage VRHUM, as a characteristic change parameter VRHUMOFF representative of a characteristic change of the humidity sensor 19 in STEP65. The characteristic change parameter VRHUMOFF thus determined is signified as an offset voltage produced by the deterioration of the humidity sensor 19, as shown in FIG. 7. As described above in the first embodiment, the parameter VRHUM/INI is set depending on the resistance of the label resistive element 21 (STEP47 in FIG. 9), and matches the characteristics of the individual unit of the humidity sensor 19. Therefore, when the humidity sensor 19 is brand-new, VRHUMOFF=0 (see the curve a in FIG. 7) irrespective of characteristic variations of individual units of the humidity sensor 19. As the humidity sensor 19 is progressively deteriorated, the value of VRHUMOFF becomes larger (see the curve b in FIG. 7) in a pattern that is substantially constant regardless of characteristic variations of individual units of the humidity sensor 19. That is, the characteristic change parameter VRHUMOFF represents the degree to which the humidity sensor 19 is deteriorated regardless of characteristic variations of individual units of the humidity sensor 19.

After having determined the characteristic change parameter VRHUMOFF, the deterioration evaluating device 17 compares the value of the characteristic change parameter VRHUMOFF with a predetermined value VRHUM/DJUD in STEP66. The predetermined value VRHUM/DJUD is a positive value close to "0". If VRHUMOFF≦VRHUM/DJUD, i.e., if the characteristic change parameter VRHUMOFF is sufficiently small (if the deterioration of the humidity sensor 17 has not essentially been in progress), the deterioration evaluating device 17 forcibly sets the value of VRHUMOFF to "0" in STEP67. This is not to correct the value of a deterioration evaluating parameter according to the present embodiment if the deterioration of the humidity sensor 19 is sufficiently small. If VRHUMOFF>VRHUM/DJUD, then the value of VRHUMOFF is maintained as it is.

Then, the deterioration evaluating device 17 sets the value of the flag F/VROFF indicative of whether the data of the characteristic change parameter VRHUMOFF has been acquired or not, to "1" in STEP68, and thereafter compares the value of the characteristic change parameter VRHUMOFF with a predetermined value VRHUMOFF/JUD in STEP69. The predetermined value VRHUMOFF/JUD is signified as an upper limit for the characteristic change parameter VRHUMOFF capable of appropriately evaluating the deteriorated state of the HC adsorbent 7 using the output voltage VRHUM of the humidity sensor 19 as described later on. If VRHUMOFF≧VRHUMOFF/JUD, then the deterioration evaluating device 17 sets the value of a flag F/HUMNG to "0" in STEP70*a*, and puts the processing sequence shown in FIG. 10 to an end. If VRHUMOFF<VRHUMOFF/JUD, then the deterioration evaluating device 17 sets the value of the flag F/HUMNG to "1" in STEP70*b*, and puts the processing sequence shown in FIG. 10 to an end. The flag F/HUMNG is "1" if the humidity sensor 19 is excessively deteriorated and is in a state incapable of appropriately evaluating the deteriorated state of the HC adsorbent 7, and "0" if the humidity sensor 19 is not excessively deteriorated and is not in a state incapable of appropriately evaluating the deteriorated state of the HC adsorbent 7.

The value of the characteristic change parameter VRHUMOFF and the values of the flag F/VROFF and the value of the flag F/FUMNG are stored in a nonvolatile memory such as an EEPROM or the like (not shown) or a memory that is energized at all times by a battery or the like (not shown) when the engine 1 is not in operation, so that those values will not be lost while the engine 1 is not in operation.

Figure 11:
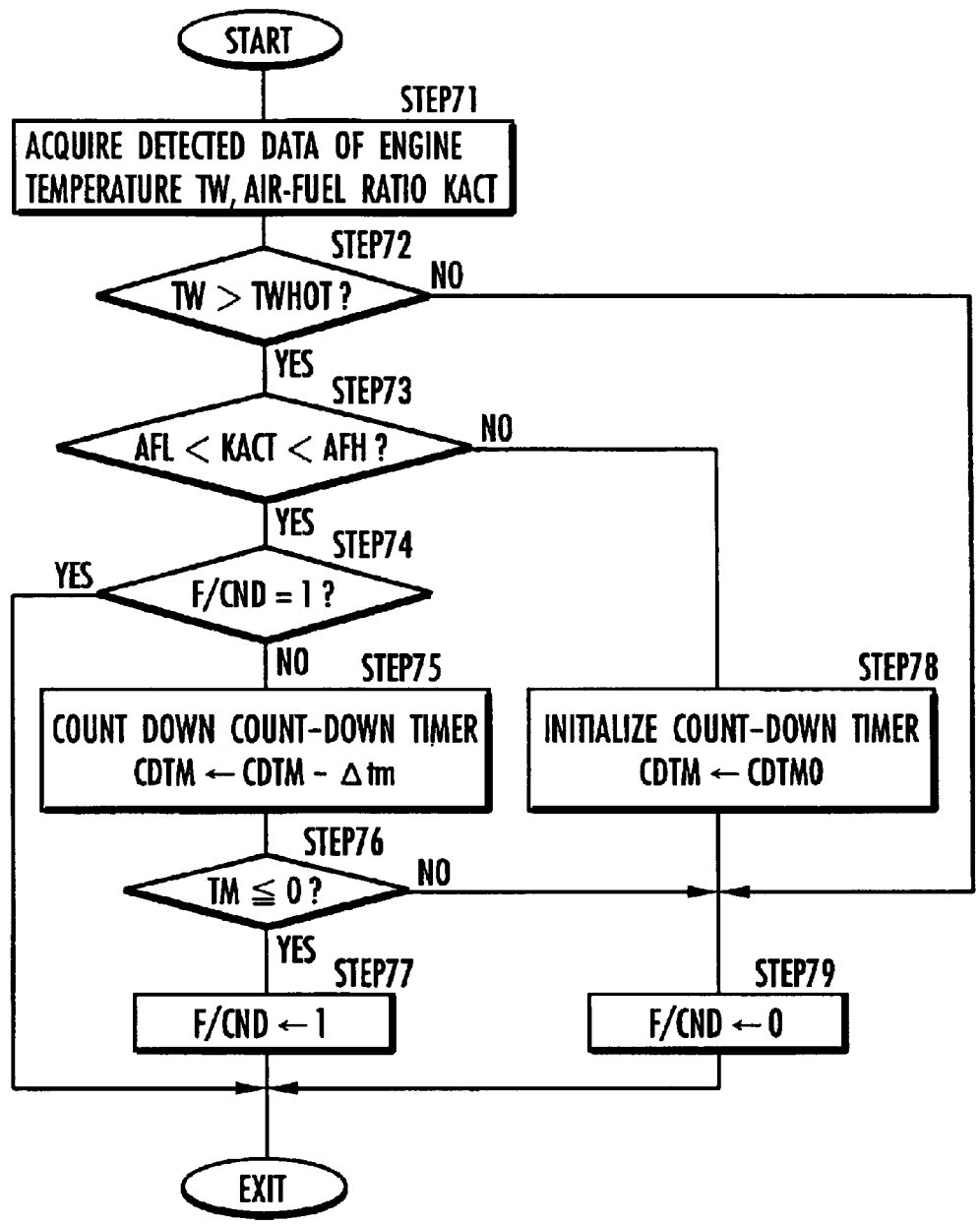

While the engine 1 is in operation, the deterioration evaluating device 17 performs a processing sequence according to a flowchart shown in FIG. 11 in a predetermined cycle time in addition to the processing sequence shown in FIG. 10. According to the processing sequence shown in FIG. 11, the deterioration evaluating device 17 acquires present detected value data of the engine temperature TW of the engine 1 from the ECU 16 and detected value data of the air-fuel ratio KACT of the air-fuel mixture which has been combusted by the engine 1 (hereinafter referred to as "air-fuel ratio KACT of the engine 1") based on the present output of the air-fuel sensor 23 shown in FIG. 1 in STEP71.

Then, the deterioration evaluating device 17 determines whether the detected value (present value) of the engine temperature TW of the engine 1 is higher than a predetermined value TWHOT or not in STEP 72 for thereby determining whether the engine 1 has been warmed up sufficiently or not. The predetermined value TWHOT is set to 85° C., for example. When the engine temperature TW is higher than the predetermined value TWHOT (TW>TWHOT), the catalytic converter 6 has basically been warmed and activated sufficiently, and the HC adsorbent 7 of the exhaust gas purifier 8 has been warmed to a temperature capable of releasing the adsorbed HCs.

If TW≦TWHOT in STEP 72, then since given conditions for appropriately evaluating a deteriorated state of the HC adsorbent 7, i.e., conditions regarding the engine temperature TW and the air-fuel ratio KACT during operation of the engine 1, have not been satisfied, the deterioration evaluating device 17 sets a flag F/CND to "0" in STEP79, and then puts the processing sequence in FIG. 11 in the present control cycle to an end. The flag F/CND is a flag used when the deterioration evaluating device 17 executes a process of evaluating a deteriorated state of the HC adsorbent 7 while the engine 1 is being shut off, as described later on. The flag F/CND has an initial value of "0" at the time the engine 1 starts to operate.

If TW>TWHOT in STEP 72, then the deterioration evaluating device 17 determines whether the detected value (present value) of the air-fuel ratio KACT of the engine 1 falls in a predetermined range, i.e., a range of AFL<KACT<AFH, in the vicinity of the stoichiometric air-fuel ratio or not in STEP 73. The lower-limit value AFL of the range represents an air-fuel ratio slightly leaner than the stoichiometric air-fuel ratio, and the upper-limit value AFH of the range represents an air-fuel ratio slightly richer than the stoichiometric air-fuel ratio.

If the detected value of the air-fuel ratio KACT of the engine 1 falls outside of the predetermined range, i.e., if KACT≦AFL or KACT≧AFH, in STEP 73, then the deterioration evaluating device 17 initializes the count value CDTM of a count-down timer for measuring a period of time in which the air-fuel ratio KACT is continuously kept in the above predetermined range, to a given initial value CDTM0 in STEP 78. Then, the deterioration evaluating device 17 sets the flag F/CND to "0" in STEP79, after which the processing sequence shown in FIG. 11 in the present control cycle is ended.

If AFL<KACT<AFH in STEP 73, then the deterioration evaluating device 17 judges the value (present value) of the flag F/CND in STEP74. If F/CND=1, then the deterioration evaluating device 17 puts the processing sequence shown in FIG. 11 in the present control cycle to an end. If F/CND=0, then the deterioration evaluating device 17 counts down the count value CDTM of the count-down timer by a given value Δtm in STEP75. The deterioration evaluating device 17 determines in STEP76 whether or not the count value CDTM is "0" or smaller, i.e., whether the state where AFL<KACT<AFH or the state where the air-fuel ratio KACT of the engine 1 is close to the stoichiometric air-fuel ratio has continued for at least a given period of time corresponding to the initial value CDTM0 of the count value CDTM of the count-down timer or not.

If CDTM>0, then the deterioration evaluating device 17 sets the flag F/CND to "0" in STEP79, after which the processing sequence in the present control cycle is ended. If CDTM≦0, then since the conditions for appropriately evaluating a deteriorated state of the HC adsorbent 7, i.e., the conditions regarding the engine temperature TW and the air-fuel ratio KACT during operation of the engine 1, have been satisfied, the deterioration evaluating device 17 sets the flag F/CND to "1" in STEP77. Thereafter, the processing sequence in the present control cycle is ended.

According to the processing sequence shown in FIG. 11 which has been described above, if the engine temperature TW of the engine 1 is higher than the predetermined value TWHOT and the air-fuel ratio KACT of the engine 1 has continuously been kept close to the stoichiometric air-fuel ratio for at least the period of time corresponding to the initial value CDTM0 of the count-down timer, then the flag F/CND is set to "1". If the engine temperature TW of the engine 1 is lower than the predetermined value TWHOT or the air-fuel ratio KACT falls out of a given range close to the stoichiometric air-fuel ratio due to a temporary disturbance or a fuel-cutoff operation of the engine 1, or if the air-fuel ratio KACT has not continuously been kept close to the stoichiometric air-fuel ratio for the above period of time although the air-fuel ratio KACT is in the range close to the stoichiometric air-fuel ratio, then the flag F/CND is set to "0".

The processing sequence according to the flowchart shown in FIG. 11 is carried out only while the engine 1 is in operation. The value of the flag F/CND is determined while the engine 1 is being shut off. To prevent the value of the flag F/CND from being lost while the engine 1 is being shut off, the deterioration evaluating device 17 stores the value of the flag F/CND in a nonvolatile memory such as an EEPROM or the like (not shown) or a memory that is energized at all times by a battery or the like (not shown). Therefore, while the engine 1 is being shut off, the flag F/CND is set to "1" only if the engine temperature TW of the engine 1 is higher than the predetermined value TWHOT and the air-fuel ratio KACT of the engine 1 has continuously been kept close to the stoichiometric air-fuel ratio for at least the period of time corresponding to the initial value CDTM0 of the count-down timer immediately before the engine 1 is shut off.

Figure 12:
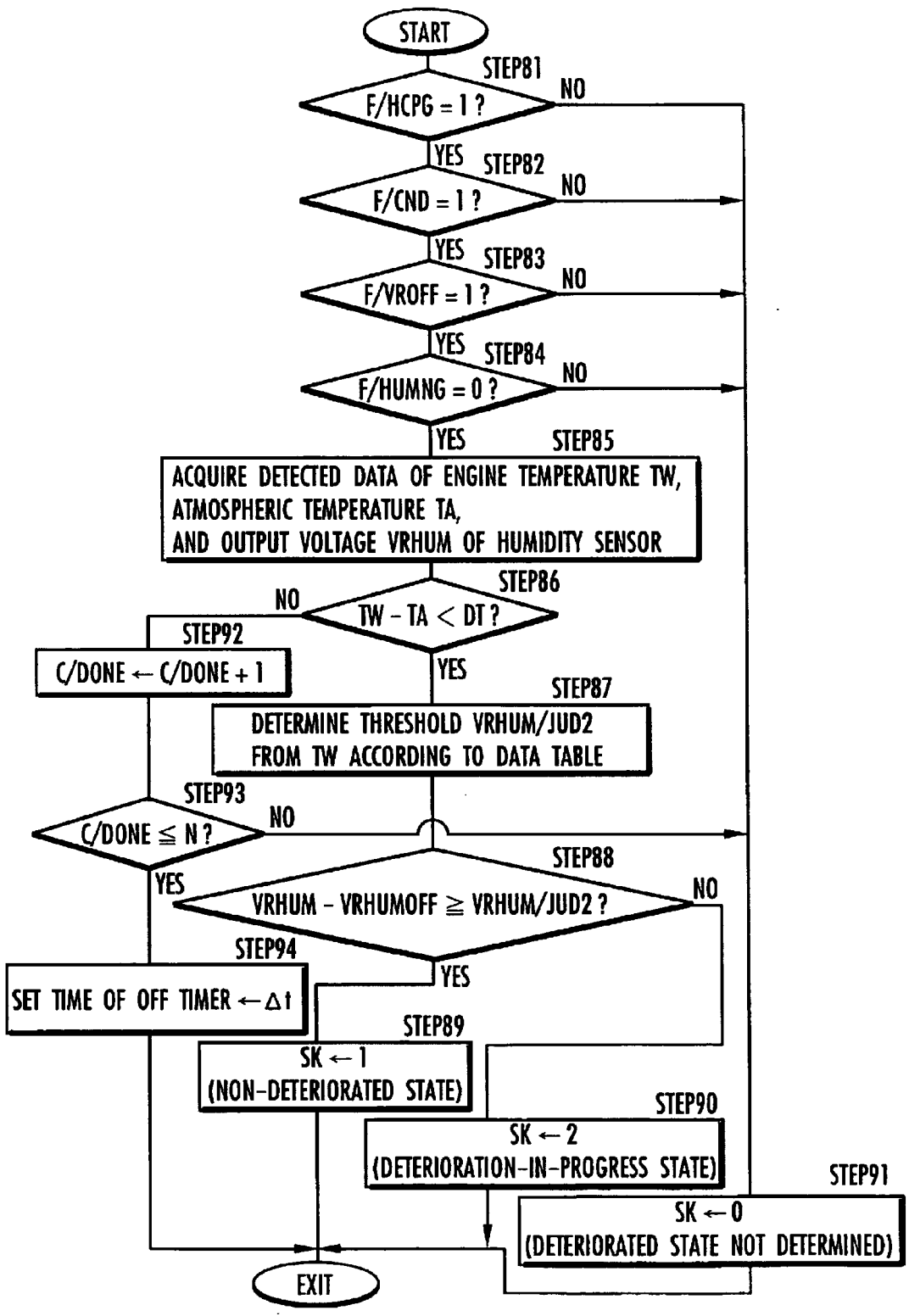

The deterioration evaluating device 17 which performs the processing sequence according to the flowcharts shown in FIGS. 10 and 11 while the engine 1 is in operation performs a processing sequence according to a flowchart shown in FIG. 12 to evaluate a deteriorated state of the HC adsorbent 7 at a given timing while the engine 1 is not in operation. Prior to describing the processing sequence according to the flowchart shown in FIG. 12 (hereinafter referred to as "deterioration evaluating process"), time-dependent changes of the output voltage VRHUM of the humidity sensor 19 (which is signified as the detected value of the relative humidity near the HC adsorbent 7) and time-dependent changes of the engine temperature TW of the engine 1 during shutdown of the engine 1, and a basic concept of a process of evaluating a deteriorated state of the HC adsorbent 7 according to the present embodiment will first be described below with reference to FIG. 13.

Figure 13:
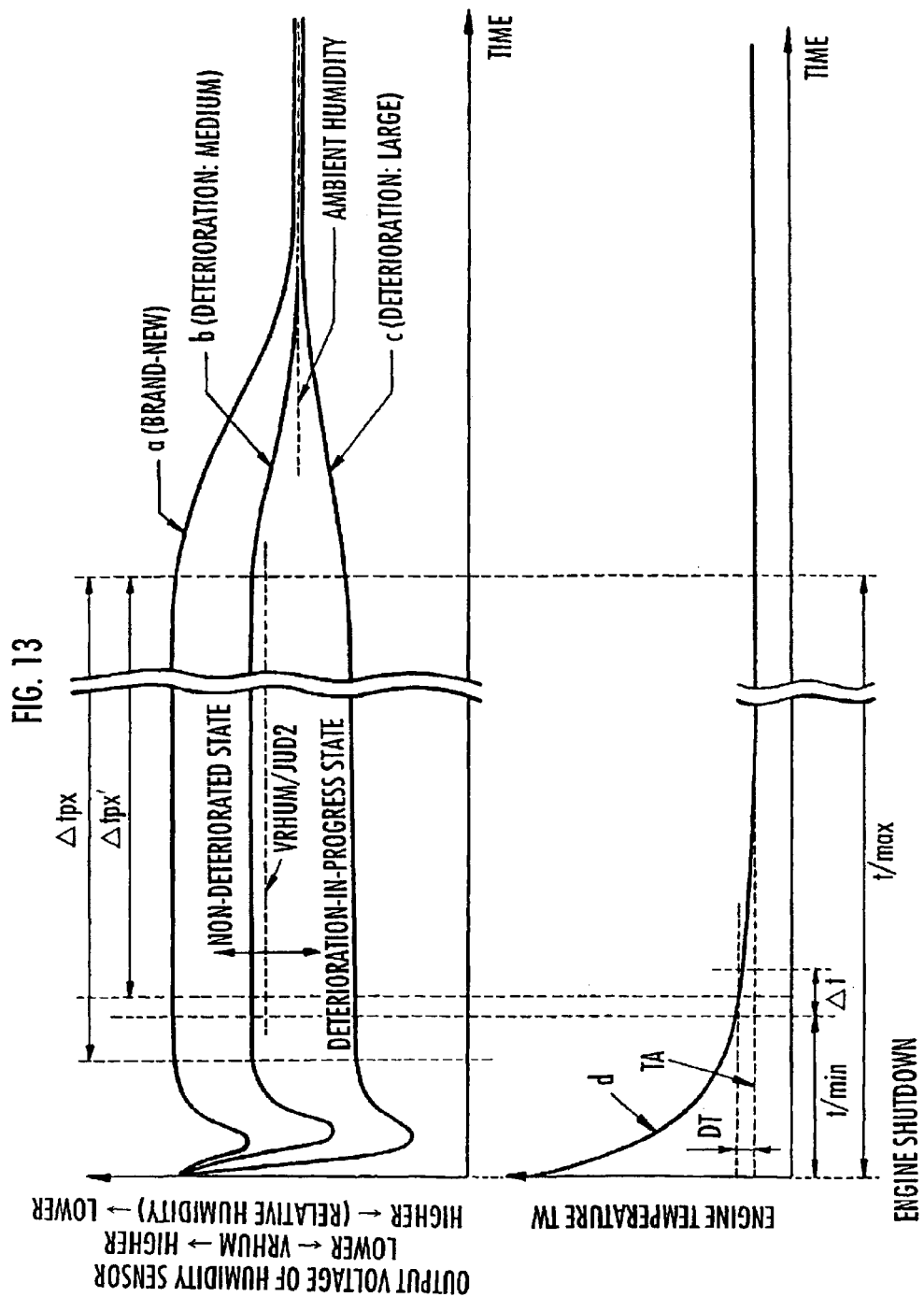
FIGS. 13 and 14 are graphs illustrative of a processing sequence of the flowchart of FIG. 12.

FIG. 13 shows, in an upper section thereof, curves a, b, c representing time-depending changes of the detected value of the relative humidity VHUM from the humidity sensor 19 after the engine 1 is shut off, the curves a, b, c corresponding respectively to a brand-new HC adsorbent 7, a mediumly deteriorated HC adsorbent 7, and a largely deteriorated HC adsorbent 7. FIG. 13 also shows, in a lower section thereof, a curve d representing time-depending changes of the detected value of the engine temperature TW after the engine 1 is shut off.

The relative humidity VHUM near the HC adsorbent 7 temporarily increases immediately after the engine 1 is shut off because the saturated water vapor pressure is lowered due to a reduction in the temperature of the exhaust gas purifier 8, etc. Therefore, the output voltage VRHUM of the humidity sensor 19 according to the present embodiment, which has a negative humidity coefficient as shown in FIG. 2, temporarily decreases immediately after the engine 1 is shut off, as indicated by the curves a, b, c in the upper section of FIG. 13. When the temperature of the HC adsorbent 7 of the exhaust gas purifier 8 drops to a value for adsorbing moisture as well as HCs in the exhaust gas, since the HC adsorbent 7 starts to adsorbs moisture in the exhaust gas present around the HC adsorbent 7, the relative humidity VHUM near the HC adsorbent 7 changes from the tendency to increase to a tendency to decrease. As a result, as indicated by the curves a, b, c in the upper section of FIG. 13, the output voltage VRHUM of the humidity sensor 19 takes a minimum value after it has been temporarily reduced as described above, and then increases. The above increase and decrease of the output voltage VRHUM of the humidity sensor 19 do not occur instantaneously, but generally take a time ranging from several tens seconds to several hours.

When the HC adsorbent 7 continuously adsorbs moisture until it is saturated, the relative humidity near the HC adsorbent 7 and hence the output voltage VRHUM of the humidity sensor 19 have minimum time-dependent changes and become substantially constant for a relatively long period (a period $\Delta tpx$ in FIG. 4). As the HC adsorbent 7 is deteriorated to a larger extent (i.e., as its ability to absorb HCs and moisture is lowered to a larger extent), the maximum amount of moisture which can be adsorbed by the HC adsorbent 7 is smaller. The level of the relative humidity as it is substantially constant near the HC adsorbent 7 is higher as the HC adsorbent 7 is deteriorated to a larger extent and lower as the HC adsorbent 7 is deteriorated to a smaller extent. Therefore, the output voltage VRHUM of the humidity sensor 19 at the time the relative humidity near the HC adsorbent 7 is substantially constant is smaller as the HC adsorbent 7 is deteriorated to a larger extent and larger as the HC adsorbent 7 is deteriorated to a smaller extent, as indicated by the curves a, b, c in FIG. 13.

The output voltage VRHUM of the humidity sensor 19 is affected by the deteriorated state thereof. If there is developed an offset voltage corresponding to the characteristic change parameter VRHUMOFF due to its deterioration, the level of the output voltage VRHUM increases by the offset voltage.

When the period of time that has elapsed after the engine 1 is shut off, i.e., the period of time that has elapsed during shutdown of the engine 1, becomes sufficiently long (e.g., in the order of several tens of hours), because a gas exchange between the interior of the exhaust pipe 5 and the bypass exhaust passage 12 and the atmosphere gradually progresses, the relative humidity near the HC adsorbent 7 and hence the output voltage VRHUM of the humidity sensor 19 finally converge to a value corresponding to the atmospheric humidity (ambient humidity) outside of the exhaust pipe 5 and the bypass exhaust passage 12, as indicated by right portions of the curves a, b, c in FIG. 13.

The timing when the period $\Delta tpx$ (hereinafter referred to as "steady humidity period $\Delta tpx$") in which the relative humidity near the HC adsorbent 7 (and hence the output voltage VRHUM of the humidity sensor 19) is actually substantially constant starts after the engine 1 is shut off depends on the temperature of the exhaust system (the exhaust gas purifier 8, etc.), the atmospheric temperature TA, the volume of the HC adsorbent, etc. at the time the engine 1 is shut off. With the system according to the present embodiment, the steady humidity period $\Delta tpx$ starts when about two through four hours have elapsed after the engine 1 is shut off. The steady humidity period $\Delta tpx$ ends depending on the structure of the exhaust system from the exhaust gas purifier 8 to the downstream end of the exhaust pipe 5. According to the present embodiment, a catalytic converter and a muffler (silencer) or the like, which are not shown, are provided downstream of the exhaust gas purifier 8, and the steady humidity period $\Delta tpx$ ends when about 24 through 72 hours, representing a period t/max in FIG. 13, have elapsed after the engine 1 is shut off.

As can be seen from the curve d in the lower section of FIG. 13, the engine temperature TW of the engine 1 gradually drops after the engine 1 is shut off, and is finally converged to the atmospheric temperature TA detected by the atmospheric temperature sensor 24. The temperature of the exhaust system of the engine 1, e.g., the temperature of the exhaust gas purifier 8, also basically drops according to the tendency of the engine temperature TW, and is finally converged to the atmospheric temperature TA. When the engine temperature TW and the temperature of the exhaust system of the engine 1, e.g., the exhaust gas purifier 8, etc., drop to a temperature equivalent to the atmospheric temperature TA, since the saturated water vapor pressure present in the exhaust system becomes substantially constant, the relative humidity near the HC adsorbent 7 and hence the output voltage VRHUM of the humidity sensor 19 basically become substantially constant.

As described above, the output voltage VRHUM of the humidity sensor 19 during the steady humidity period $\Delta tpx$ is substantially constant and the level of the substantially constant output voltage VRHUM depends on the deteriorated state of the HC adsorbent 7. According to the present embodiment, therefore, the output voltage VRHUM of the humidity sensor 19 in the steady humidity period $\Delta tpx$ while the engine 1 is being shut off is used to evaluate whether the deteriorated state of the HC adsorbent 7 is the non-deteriorated state or the deterioration-in-progress state. In the present embodiment, after a given period of time t/min (see FIG. 13) has elapsed from the shutdown of the engine 1, the output voltage VRHUM of the humidity sensor 19 at the time the engine temperature TW is substantially converged to the atmospheric temperature TA is used to evaluate the deteriorated state of the HC adsorbent 7. Stated otherwise, it is assumed that the period of time in which the relative humidity near the HC adsorbent 7 is substantially constant begins from the time when the predetermined period of time t/min has elapsed and the engine temperature TW is substantially converged to the atmospheric temperature TA, and the deteriorated state of the HC adsorbent 7 is evaluated using the output voltage VRHUM of the humidity sensor 19 at the beginning of that period of time. The predetermined period of time t/min is basically determined such that the time when the period of time that has elapsed after the engine 1 is shut off reaches the predetermined period of time t/min is present in the steady humidity period $\Delta tpx$, and is set to two hours, for example, according to the present embodiment.

On the basis of the foregoing description, the deterioration evaluating process which is carried out by the deterioration evaluating device 17 during shutdown of the engine 1 will be described below with reference to FIG. 12.

The apparatus according to the present invention has a timer (not shown, hereafter referred to as "off timer") for measuring a period of time that elapses from the shutdown of the engine 1 and activating the ECU 16 and the deterioration evaluating device 17 (with electric energy supplied from the non-illustrated battery) when the measured period of time has reached a preset period of time. The deterioration evaluating device 17 executes the deterioration evaluating process shown in FIG. 12 only when the ECU 16 and the deterioration evaluating device 17 are activated by the off timer while the engine 1 is being shut off. The off timer is set to the predetermined period of time t/min (see FIG. 13)

when the engine 1 is shut off. Therefore, the deterioration evaluating process according to the flowchart shown in FIG. 12 is executed for the first time when the predetermined period of time t/min (two hours in the present embodiment) has elapsed after the shutdown of the engine 1 while the engine 1 is being shut off.

Specifically, the deterioration evaluating process is carried out as follows: As shown in FIG. 12, the deterioration evaluating device 17 determines whether the release of the HCs adsorbed by the HC adsorbent 7 during the preceding operation of the engine 1 is completed or not based on the value of a flag F/HCPG in STEP81. The flag F/HCPG is "1" if the release of the HCs adsorbed by the HC adsorbent 7 is completed and "0" if the release of the HCs adsorbed by the HC adsorbent 7 is not completed. The flag F/HCPG is set as described above with respect to STEP1 shown in FIG. 4 according to the first embodiment.

If F/HCPG=0 in STEP81, since the release of the HCs and the moisture adsorbed by the HC adsorbent 7 during the preceding operation of the engine 1 is not completed (the HC adsorbent 7 has already adsorbed the moisture when the engine 1 is shut off), the deterioration evaluating device 17 sets the value of an evaluation result parameter SK representing an evaluation result of the deteriorated state of the HC adsorbent 7 to "0" in STEP91. Thereafter, the deterioration evaluating device 17 puts the deterioration evaluating process to an end. When the evaluation result parameter SK is "0", it indicates that the evaluation of the deteriorated state of the HC adsorbent 7 is not determined. When the evaluation result parameter SK is "1", it indicates that the HC adsorbent 7 is in the non-deteriorated state. When the evaluation result parameter SK is "2", it indicates that the HC adsorbent 7 is in the deterioration-in-progress state.

If F/HCPG=1 in STEP81, i.e., if the release of the HCs and the moisture adsorbed by the HC adsorbent 7 during the preceding operation of the engine 1 is completed, the deterioration evaluating device 17 determines the value of the flag F/CND set according to the processing sequence in FIG. 11 in the preceding operation of the engine 1 in STEP82. If F/CND=0, i.e., if the engine temperature TW is lower than the predetermined value TWHOT immediately before the engine 1 is shut off or if the state in which the air-fuel ratio KACT immediately before the internal combustion engine 1 is shut off is kept close to the stoichiometric air-fuel ratio has not continued for the predetermined period of time, then the deterioration evaluating device 17 regards these conditions as inappropriate for finalizing the evaluation of the deteriorated state of the HC adsorbent 7, and sets the evaluation result parameter SK to "0" in STEP91. Thereafter, the deterioration evaluating device 17 puts the deterioration evaluating process to an end.

If F/CND=1 in STEP82, i.e., if the engine temperature TW is higher than the predetermined value TWHOT immediately before the engine 1 is shut off and if the state in which the air-fuel ratio KACT immediately before the engine 1 is shut off is kept close to the stoichiometric air-fuel ratio has continued for at least the predetermined period of time, then the deterioration evaluating device 17 successively determines the values of the flags F/VROFF, F/HUMNG that are set according to the processing sequence shown in FIG. 10 in STEP83 and STEP84. If F/VROFF=0, then since the deterioration evaluating device 17 has not properly acquired the data of the characteristic change parameter VRHUMOFF, the deterioration evaluating device 17 sets the value of the evaluation result parameter SK to "0" in STEP91. Thereafter, the deterioration evaluating device 17 puts the deterioration evaluating process to an end. Even if F/VROFF=1, if F/HUMNG=1, then since the value of the characteristic change parameter VRHUMOFF is excessively large (the humidity sensor 19 is excessively deteriorated), the deterioration evaluating device 17 judges that it is difficult to properly evaluate the deteriorated state of the HC adsorbent 7, and sets the value of the evaluation result parameter SK to "0" in STEP91. Thereafter, the deterioration evaluating device 17 puts the deterioration evaluating process to an end (the evaluation of the deteriorated state of the HC adsorbent 7 is prohibited).

If F/VROFF=1 and F/HUMNG=0 (YES in STEP84), then the deterioration evaluating device 17 acquires detected value data of the present engine temperature TW of the engine 1 from the ECU 16, acquires detected value data of the present atmospheric temperature TA (the temperature outside of the exhaust system including the exhaust gas purifier 8, etc.) from the atmospheric temperature sensor 24, and detected data of the present output voltage VRHUM of the humidity sensor 21 in STEP85.

Then, the deterioration evaluating device 17 determines whether the difference (TW−TA) between the present engine temperature TW and the atmospheric temperature TA is smaller than a predetermined value DT or not in STEP86. The predetermined value DT is a sufficiently small positive value. If TW−TA<DT, then it means that the engine temperature TW has dropped to a temperature (substantially constant) substantially equal to the atmospheric temperature TA and the temperature near the HC adsorbent 7 has dropped to a temperature (substantially constant) substantially equal to the atmospheric temperature TA. In STEP86, the deterioration evaluating device 17 uses the engine temperature TW in order to recognize the temperature near the HC adsorbent 7. However, if the temperature near the HC adsorbent 7 is directly detected by a temperature sensor, then the deterioration evaluating device 19 may use the thus detected temperature near the HC adsorbent 7 instead of the engine temperature TW.

Figure 14:
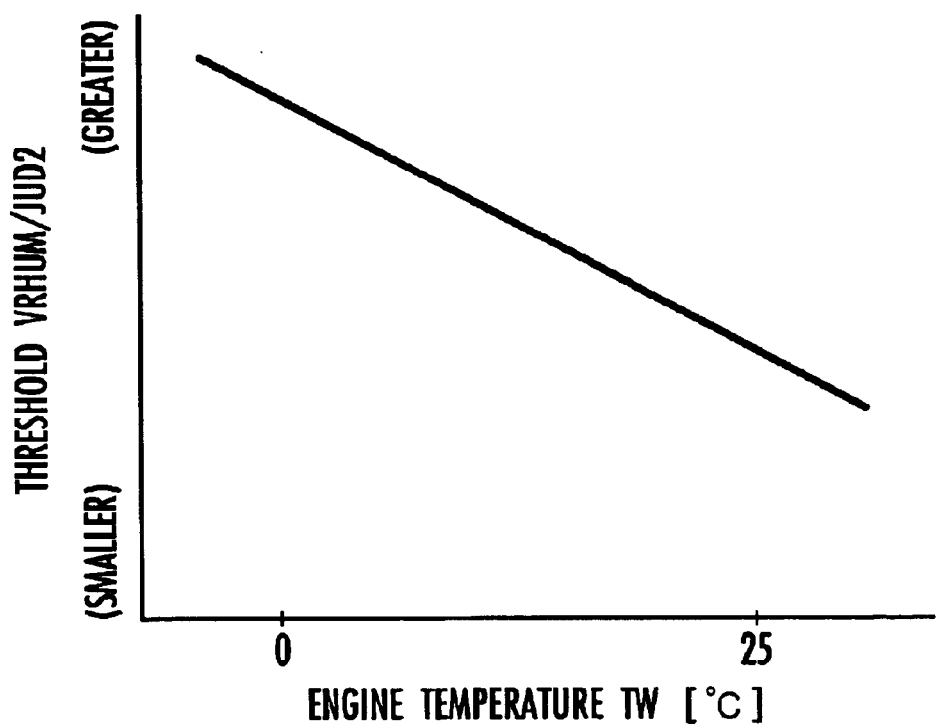

If TW−TA<DT in STEP86, i.e., if the engine temperature TW (and the temperature near the HC adsorbent 7) is substantially converged to the atmospheric temperature and is substantially constant, the output voltage VRHUM of the humidity sensor 19 (the relative humidity near the HC adsorbent 7) is substantially constant for certain. The deterioration evaluating device 17 now determines a predetermined threshold VRHUM/JUD2 for evaluating the deteriorated state of the HC adsorbent 7 from a predetermined data table shown in FIG. 14 in STEP87. The threshold VRHUM/JUD2 is a threshold to be compared with a value that is produced by subtracting an offset voltage of the value of the characteristic change parameter VRHUMOFF from the output voltage VRHUM of the humidity sensor 19 (acquired in STEP85). As shown in FIG. 14, the threshold VRHUM/JUD2 is set depending on the engine temperature TW such that it is smaller as the engine temperature TW (which represents the temperature of the HC adsorbent 7) is lower. The threshold VRHUM/JUD2 is set depending on the engine temperature TW (the temperature of the HC adsorbent 7) because the HC adsorbent 7 adsorbs more moisture as its temperature is lower.

Then, the deterioration evaluating device 17 compares a value (=VRHUM−VRHUMOFF) that is produced by subtracting the value of the characteristic change parameter VRHUMOFF obtained in the processing sequence shown in FIG. 11 during the preceding operation of the engine 1 from the present output voltage VRHUM (the deterioration evaluating parameter) of the humidity sensor 19 acquired in STEP85, i.e., a value that is produced by correcting the output voltage VRHUM as the deterioration evaluating parameter depending on the characteristic change parameter VRHUMOFF, with the threshold VRHUM/JUD2 determined in STEP87 in STEP88. If VRHUM−VRHUMOFF≧VRHUM/JUD2, then the deterioration evaluating device 17 judges that the HC adsorbent 7 is in the non-deteriorated state (corresponding to the curves a, b shown in FIG. 13), and sets the evaluation result parameter SK to "1" in STEP89. Thereafter, the deterioration evaluating device 17 puts the deterioration evaluating process to an end. If VRHUM−VRHUMOFF<VRHUM/JUD2, then the deterioration evaluating device 17 judges that the HC adsorbent 7 is in the deterioration-in-progress state (corresponding to the curve c shown in FIG. 13), and sets the evaluation result parameter SK to "2" in STEP90. Thereafter, the deterioration evaluating device 17 puts the deterioration evaluating process to an end.

When the evaluation result parameter SK is set in STEP89 through STEP91, and the deterioration evaluating process shown in FIG. 12 is ended, the deterioration evaluating device 17 and the ECU 16 are turned off until the operation of the engine 1 is resumed. The value of the evaluation result parameter SK is stored in the non-volatile memory such as an EEPROM or the like during the shutdown of the engine 1.

According to the deterioration evaluating process described above, when the predetermined period of time t/min has elapsed after the engine 1 is shut off, if the engine temperature TW (and the temperature near the HC adsorbent 7) drops to a temperature substantially equal to the atmospheric temperature TA (except if F/HCPG=0 or F/CND=0 or F/VROFF=0 or F/HUMNG=1), the deteriorated state of the HC adsorbent 7 is evaluated.

In the above description, it is assumed that the engine temperature TW drops to a temperature substantially equal to the atmospheric temperature TA when the predetermined period of time t/min has elapsed after the engine 1 is shut off. However, since the manner in which the engine temperature TW drops after the engine 1 is shut off is affected by the engine temperature TW and the atmospheric temperature TA at the time the engine 1 is shut off, the engine temperature TW may not necessarily be lowered to a temperature substantially equal to the atmospheric temperature TA when the predetermined period of time t/min has elapsed, i.e., when the deterioration evaluating process shown in FIG. 12 is executed for the first time after the engine 1 is shut off, but it is possible that TW−TA≧DT in STEP86 shown in FIG. 12, e.g., as indicated by the curve d shown in FIG. 13. In such a case, the deterioration evaluating device 17 increments the value of a count parameter C/DONE representing the number of times that the deterioration evaluating process shown in FIG. 12 is executed, by "1" in STEP92, and then compares the value of the count parameter C/DONE with a predetermined upper limit value N in STEP93. If C/DONE<N in STEP93, then the deterioration evaluating device 17 sets the set time of the offset timer to a predetermined time Δt (see FIG. 13) in STEP94. Thereafter, the deterioration evaluating device 17 puts the deterioration evaluating process shown in FIG. 12 to an end. At this time, the deterioration evaluating device 17 and the ECU 16 are turned off. Therefore, after elapse of the predetermined time Δt, the off timer is actuated to activate the deterioration evaluating device 17 and the ECU 16, and the deterioration evaluating device 17 executes the deterioration evaluating process shown in FIG. 12. In the present embodiment, the predetermined time Δt is set to a time, e.g., 30 minutes, shorter than the predetermined period of time t/min (two hours in the present embodiment) which determines the time for initially executing the deterioration evaluating process shown in FIG. 12. However, the predetermined time Δt may be the same as or longer than the predetermined period of time t/min. When the internal engine 1 is shut off, the count parameter C/DONE is initialized to "0". While the engine 1 is being shut off, the count parameter C/DONE is stored in the nonvolatile memory such as an EEPROM or the like.

If C/DONE>N in STEP93, i.e., if the engine temperature TW is not converged to the atmospheric temperature TA when the deterioration evaluating process shown in FIG. 12 is carried out as many times as the upper limit value N, then the deterioration evaluating device 17 regards this condition as inappropriate for finalizing the evaluation of the deteriorated state of the HC adsorbent 7, and sets the evaluation result parameter SK to "0" in STEP91. Thereafter, the deterioration evaluating device 17 puts the deterioration evaluating process to an end. The upper limit value N is set such that the period of time that elapses from the shutdown of the engine 1 to the time when the deterioration evaluating process is carried out in an Nth cycle terminates short of the time when the steady humidity period Δtpx is finished, i.e., is equal to or shorter than the period t/max in FIG. 13.

When the operation of the engine 1 is resumed after the deteriorated state of the HC adsorbent 7 is evaluated during the shutdown of the engine 1, the deterioration evaluating device 17 operates the deterioration indicator 20 depending on the value of the evaluation result parameter SK. Specifically, if the value of the evaluation result parameter SK is "2", i.e., if the deteriorated state of the HC adsorbent 7 is the deterioration-in-progress state, then the deterioration indicator 20 indicates the deterioration-in-progress state.

According to the above process, when the predetermined period of time t/min has elapsed after the engine 1 is shut off, if the engine temperature TW (and the temperature near the HC adsorbent 7) does not drop to a temperature substantially equal to the atmospheric temperature TA, then the deterioration evaluating process shown in FIG. 12 is subsequently carried out in each predetermined time Δt until the engine temperature TW drops to a temperature substantially equal to the atmospheric temperature TA.

According to the present embodiment, therefore, subsequently to the time when the predetermined period of time t/min has elapsed after the engine 1 is shut off, when the engine temperature TW drops to a temperature substantially equal to the atmospheric temperature TA, the deteriorated state of the HC adsorbent 7 is actually evaluated, and the evaluation result parameter SK is set. Inasmuch as the time t/max until the steady humidity period Δtpx in which the output voltage VRHUM of the humidity sensor 19 is substantially constant is finished after the engine 1 is shut off is relatively long (sufficiently longer than the predetermined period of time t/min), there is basically no situation where the engine temperature TW does not drop to a temperature substantially equal to the atmospheric temperature TA before the steady humidity period Δtpx expires. Therefore, the deterioration evaluating process shown in FIG. 12 is reliable in evaluating the deteriorated state of the HC adsorbent 7 using the detected value of the output voltage VRHUM of the humidity sensor 19 within the steady humidity period Δtpx as a deterioration evaluating parameter. Since the output voltage VRHUM of the humidity sensor 19 used to evaluate the deteriorated state of the HC adsorbent 7 is detected while it is being substantially constant steadily, the detected value of the output voltage VRHUM can be obtained with accuracy. The deteriorated state of the HC adsorbent 7 is finally judged by comparing the value which is produced by subtracting the characteristic change parameter VRHUMOFF corresponding to an offset voltage caused by the deterioration of the humidity sensor 19 from the output voltage VRHUM of the humidity sensor 19, with the threshold VRHUM/JUD2. As a result, the evaluation of the deteriorated state of the HC adsorbent 7 can be performed highly reliably and accurately regardless of a characteristic change due to the deterioration of the humidity sensor 19 and characteristic variations of individual units of the humidity sensor 19.

The humidity sensor 19 may be able to detect the relative humidity near the HC adsorbent 7 while the relative humidity is being substantially constant. Therefore, the humidity sensor 19 is not required to be highly responsive, but may comprise a relatively inexpensive sensor.

In the present embodiment, if the value of the flag F/HCPG is "1", i.e., if it is recognized that the release of the HC and the moisture adsorbed by the HC adsorbent 7 during the preceding operation of the engine 1 is completed, then the deteriorated state of the HC adsorbent 7 is essentially evaluated. Stated otherwise, the deteriorated state of the HC adsorbent 7 is evaluated while the HC adsorbent 7 has adsorbed a maximum amount of moisture which it can adsorb in the deteriorated state after the engine 1 is shut off. In the present embodiment, furthermore, if the value of the flag F/CND is "1", i.e., if the engine 1 is sufficiently warmed up and the air-fuel mixture is stably combusted immediately before the engine 1 is shut off, and also if the air-fuel ratio KACT of the engine 1 has been kept close to the stoichiometric air-fuel ratio for the predetermined period of time, then the deteriorated state of the HC adsorbent 7 is essentially evaluated. Stated otherwise, if the exhaust gas present around the HC adsorbent 7 contains a sufficient amount of moisture and variations in the contained amount of moisture are small immediately after the engine 1 is shut off, then the deteriorated state of the HC adsorbent 7 is evaluated based on the output voltage VRHUM of the humidity sensor 19 within the steady humidity period Δtpx. As a consequence, the deteriorated state of the HC adsorbent 7 is evaluated accurately and appropriately.

In the present embodiment, if the value of the characteristic change parameter VRHUMOFF is excessively large, then the value of the flag F/HUMNG is set to "1". In this case, the deteriorated state of the HC adsorbent 7 is not essentially evaluated. Therefore, the reliability of the evaluation of the deteriorated state of the HC adsorbent 7 is maintained.

In the present embodiment, the humidity sensor 19 is disposed downstream of the HC adsorbent 7. However, the humidity sensor 19 may be disposed upstream of the HC adsorbent 7 insofar as the humidity sensor 19 is disposed near the HC adsorbent 7. In this case, the process (the process shown in FIG. 10) for acquiring the data of the characteristic change parameter VRHUMOFF will be described supplementarily. Generally, the humidity upstream of the HC adsorbent 7 changes from a relatively low humidity value quickly to a substantially constant high humidity value (substantially 100%) corresponding to the inherent humidity of the exhaust gas after the engine 1 has started to operate. That is, after the engine 1 has started to operate, the time required for the output voltage VRHUM of the humidity sensor 19 to reach a substantially constant low level is shorter than with the curves a, b shown in FIG. 7. Therefore, if the humidity sensor 19 is disposed upstream of the HC adsorbent 7, the predetermined value TMVR/TSH2 relative to the engine operation elapsed time TM used in STEP63 in FIG. 10 may be smaller than the value in the second embodiment.

In the second embodiment, the processing in STEP53 through STEP62 shown in FIG. 10 is performed in order to confirm that the output voltage VRHUM of the humidity sensor 19 has shifted from a high level to a low level (to confirm the falling of the output voltage VRHUM) after the engine 1 has started to operate. According to the second embodiment, the deteriorated state of the HC adsorbent 7 is evaluated using the output voltage VRHUM of the humidity sensor 19 while the engine 1 is not in operation. Therefore, if the predetermined value TMVR/TSH2 relative to the engine operation elapsed time TM used in STEP63 in FIG. 10 is set to a relatively large value, then the processing in STEP53 through STEP62 shown in FIG. 10 may be dispensed with.

Furthermore, VRHUMOFF used in STEP88 shown in FIG. 12 according to the second embodiment may be replaced with the characteristic change parameter VRHUMCH that is determined in STEP25 shown in FIG. 6 according to the first embodiment. In this case, however, the threshold VRHUM/JUD2 used in STEP88 shown in FIG. 12 is different from that in the second embodiment, and is basically smaller than the value determined from the data table shown in FIG. 14.

A third embodiment of the present invention will be described below with reference to FIGS. 2, 3, and 5 and FIGS. 15 through 20. The present embodiment differs from the first embodiment only as to a portion of the apparatus arrangement and the processing sequence of the deterioration evaluating device. Therefore, those parts or functions of the third embodiment which are identical to those of the first embodiment are denoted by reference characters and figures that are identical to those of the first embodiment, and will not be described in detail below.

Figure 15:
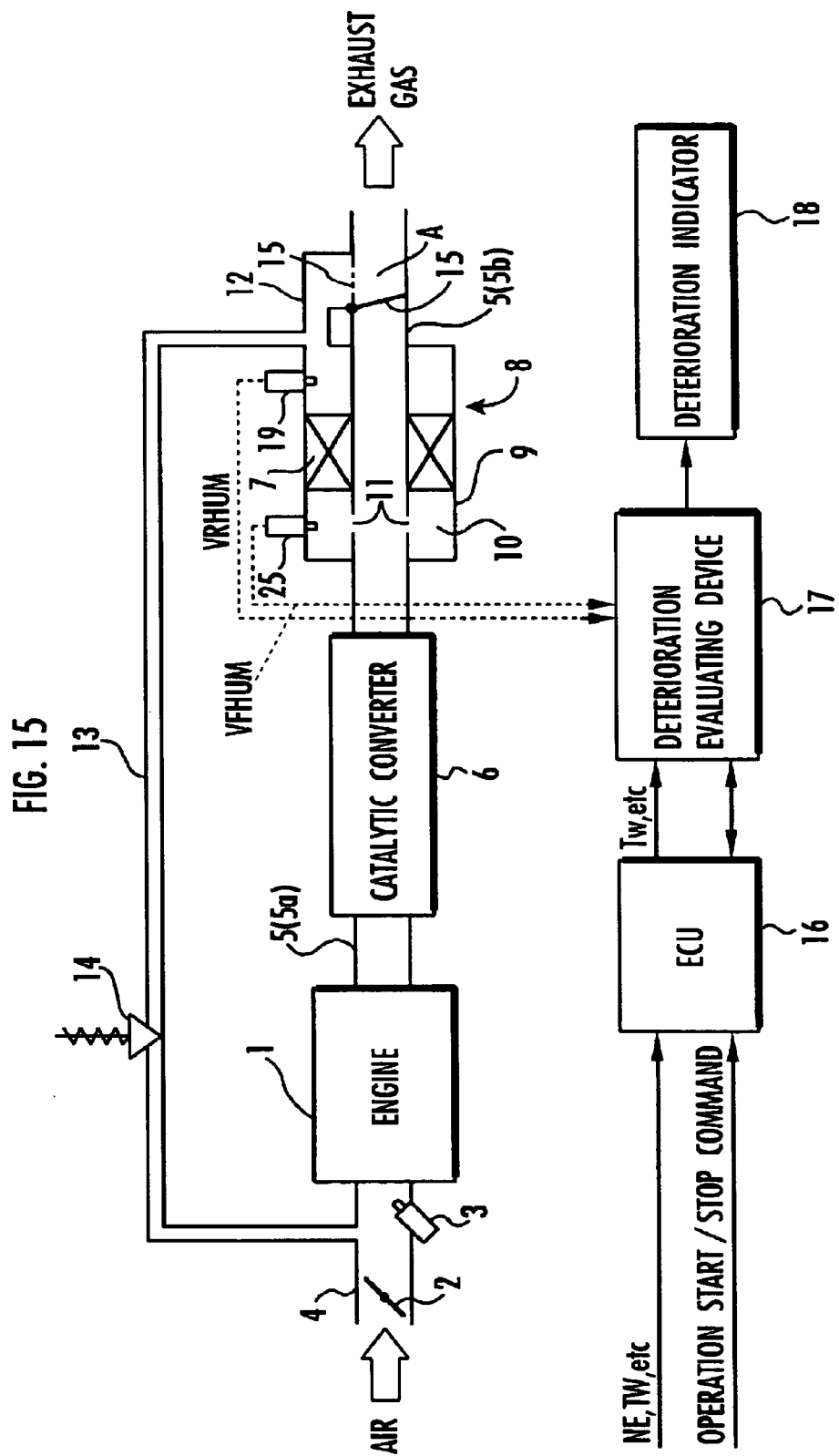
FIG. 15 is a block diagram of an overall system arrangement of an apparatus according to a third embodiment of the present invention.

According to the present embodiment, as shown in FIG. 15, the apparatus has, in addition to the humidity sensor 19 downstream of the HC adsorbent 7 of the exhaust gas purifier 8, a humidity sensor 25 upstream of the HC adsorbent 7 near the HC adsorbent 7. An output voltage VFHUM of the humidity sensor 25 (an output voltage depending on the relative humidity upstream of the HC adsorbent 7) is given, together with the output voltage VRHUM of the humidity sensor 19, to the deterioration evaluating device 17. The upstream humidity sensor 25 is of the same type as the downstream humidity sensor 19, and has the same output characteristics (negative characteristics with respect to the relative humidity) as the humidity sensor 19. In FIG. 2, the respective output voltages VRHUM, VFHUM of the humidity sensors 19, 25 are shown as having the same characteristics with respect to the relative humidity. However, the output characteristics of the humidity sensors 19, 25 do not need to be fully identical to each other.

As shown in FIG. 3, the upstream humidity sensor 25 provided in the present embodiment is electrically connected to the deterioration evaluating device 17 by two connectors 20a, 20b, as with the downstream humidity sensor 19. The connector 20a closer to the upstream humidity sensor 25 has a label resistive element 21 having a resistance depending on the characteristics actually measured for each individual unit of the humidity sensor 25. With the upstream humidity sensor 25 connected to the deterioration evaluating device 17, the deterioration evaluating device 17 detects a resistance of the label resistive element 21 relative to the inherent characteristics of the upstream humidity sensor 25 through the resistance detecting circuit 22, and sets the value of a parameter (to be described in detail later on) for compensating for the effect of characteristic variations of individual units of the upstream humidity sensor 25 based on the detected resistance. The other structural details of the apparatus are identical to those of the first embodiment. According to the present embodiment, the deterioration evaluating device 17 functions as an upstream changing timing detecting means, a downstream changing timing detecting means, an integrated moisture quantity data generating means, a characteristic change detecting means, and a characteristic change compensating means.

Operation of the apparatus according to the present embodiment for evaluating the deteriorated state of the HC adsorbent 7 will be described below.

Figure 16:
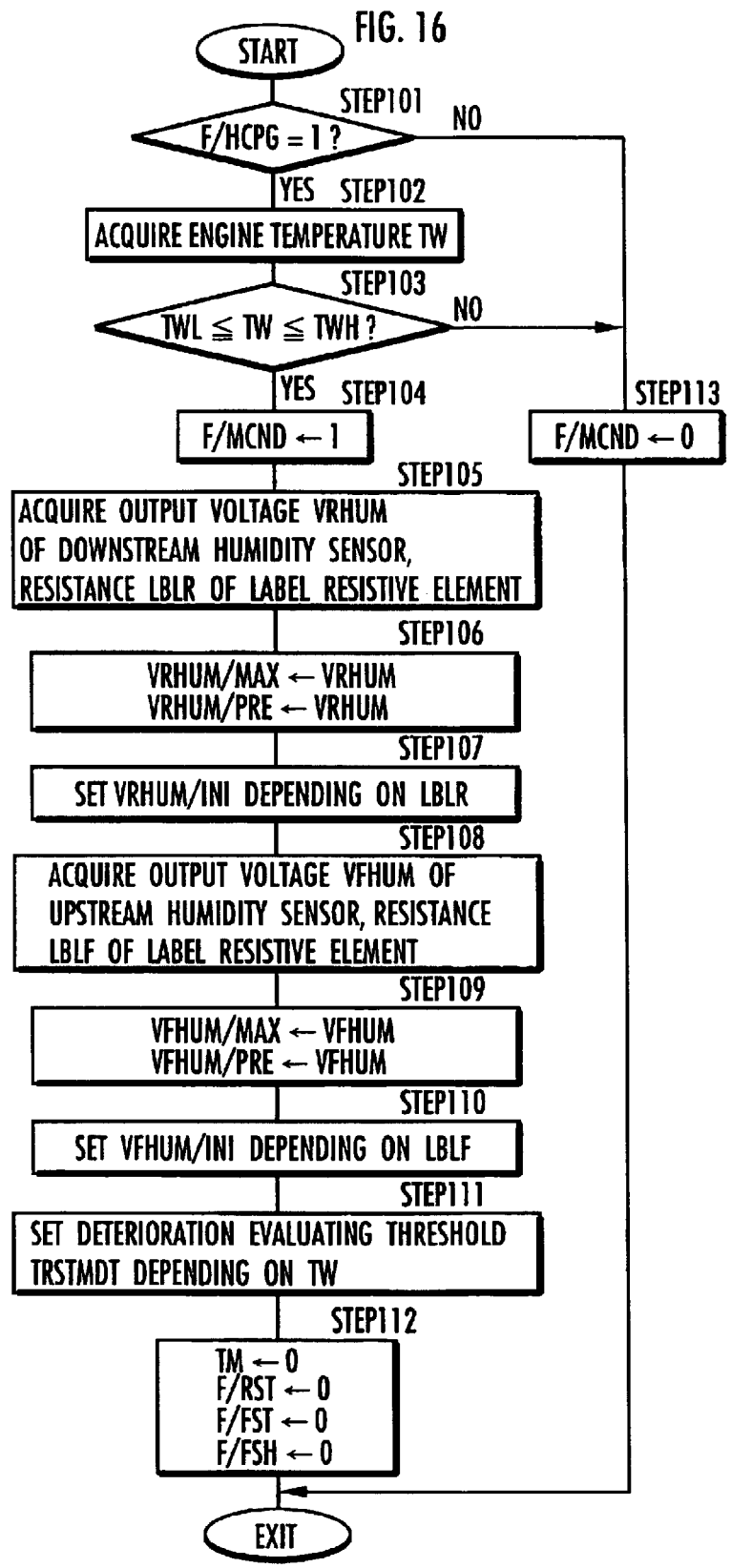
FIGS. 16 through 18 are flowcharts of an operation sequence of the apparatus according to the third embodiment of the present invention.

According to the present embodiment, the deterioration evaluating device 17 performs a processing sequence according to a flowchart shown in FIG. 16 when the engine 1 starts to operate. In this processing sequence, the processing in STEP101 through STEP106 and the processing in STEP113 are identical to the processing in STEP1 through STEP6 and the processing in STEP10 shown in FIG. 4 according to the first embodiment. Therefore, these processing details will not be described below. As described above with respect to the first embodiment, for setting the value of the flag F/MCND, in addition to determining the conditions in STEP101 and STEP103, the deterioration evaluating device 17 may determine whether soaking has been completed or not, and the deterioration evaluating device 17 may set to the value of the flag F/MCND to "0" if soaking is not completed.

In step S107 following STEP106, the deterioration evaluating device 17 sets the value of the parameter VRHUM/INI for compensating for the effect of variations of the characteristics of individual units of the downstream humidity sensor 19 in the process, to described later on, for evaluating the deteriorated state of the HC adsorbent 7, from the detected data of the resistance LBLR of the label resistive element 21 of the downstream humidity sensor 19 which has been acquired in STEP105, based on a predetermined data table or the like. The parameter VRHUM/INI has been described above with respect to the first embodiment. Specifically, the parameter VRHUM/INI serves as a reference value for the output voltage VRHUM of the downstream humidity sensor 19 if the relative humidity detected by the downstream humidity sensor 19 becomes a substantially constant high relative humidity (about 100%) after the engine 1 has started to operate, if the downstream humidity sensor 19 is brand-new. According to the present embodiment, as with the second embodiment, the value of the parameter VRHUM is used as representing the characteristics of individual units of the downstream humidity sensor 19.

Then, the deterioration evaluating device 17 performs a processing sequence, which is the same as the processing in STEP105 through STEP107 with respect to the downstream humidity sensor 19, with respect to the upstream humidity sensor 25, in STEP108 through STEP110. Specifically, in STEP108, the deterioration evaluating device 17 acquires the output voltage VFHUM of the upstream humidity sensor 25, and also acquires data of the resistance LBLF of the label resistive element 21 relative to the upstream humidity sensor 25 through the resistance detecting circuit 22. In STEP109, the deterioration evaluating device 17 sets the present value of the output voltage VFHUM of the upstream humidity sensor 25 acquired in STEP108 as the initial value of a parameter VFHUM/MAX representative of the latest value of a maximum value of the output voltage VFHUM of the upstream humidity sensor 25 and the initial value of a preceding output parameter VFHUM/PRE representative of a preceding value of the output voltage VFHUM (a preceding value in each cycle time of the processing sequence performed by the deterioration evaluating device 17. In STEP110, the deterioration evaluating device 17 sets the value of the parameter VRHUM/INI for compensating for the effect of variations of the characteristics of individual units of the upstream humidity sensor 25 in the process, to described later on, for evaluating the deteriorated state of the HC adsorbent 7, from the detected data of the resistance LBLF of the label resistive element 21 of the upstream humidity sensor 25 which has been acquired in STEP108, based on a predetermined data table or the like. The parameter VFHUM/INI relative to the upstream humidity sensor 25 serves as a reference value for the output voltage VFHUM of the upstream humidity sensor 25 if the relative humidity detected by the upstream humidity sensor 25 becomes a substantially constant high relative humidity (about 100%) after the engine 1 has started to operate, when the upstream humidity sensor 25 is brand-new. According to the present embodiment, since the upstream humidity sensor 25 is of the same type as the downstream humidity sensor 19, the value of the parameter VFHUM/INI relative to the upstream humidity sensor 25 is generally similar to the value of the parameter VRHUM/INI relative to the downstream humidity sensor 19, though they slightly differ from each other depending on individual units of the humidity sensors.

Then, the deterioration evaluating device 17 determines a deterioration evaluating threshold TRSTMDT with which to determine whether the HC adsorbent 7 is in the deterioration-in-progress state or the non-deteriorated state from the detected data of the engine temperature TW (the initial engine temperature) of the engine 1 acquired in STEP102 according to a predetermined data table as indicated by the broken-line curve in FIG. 5 in STEP111. As described in detail later on, according to the present embodiment, the period of time that has elapsed from the start of operation of the engine 1 is not used as a deterioration evaluating parameter unlike the first embodiment, but the period of time that has elapsed from a predetermining timing after the engine 1 has started to operate is used as a deterioration evaluating parameter. Therefore, the deterioration evaluating threshold TRSTMDT according to the present embodiment which is indicated by the broken-line curve in FIG. 5 is of a value slightly smaller than the deterioration evaluating threshold according to the first embodiment (which is indicated by the solid-line curve in FIG. 5).

Then, the deterioration evaluating device 17 initializes, to "0", the value of a timer TM (count-up timer) which measures a period of time that has elapsed from the start of the operation of the engine 1, and also initializes flags F/RST, F/FST, F/FSH to be described later on, to "0" in STEP112. Thereafter, the processing sequence shown in FIG. 16 is ended.

Figure 17:
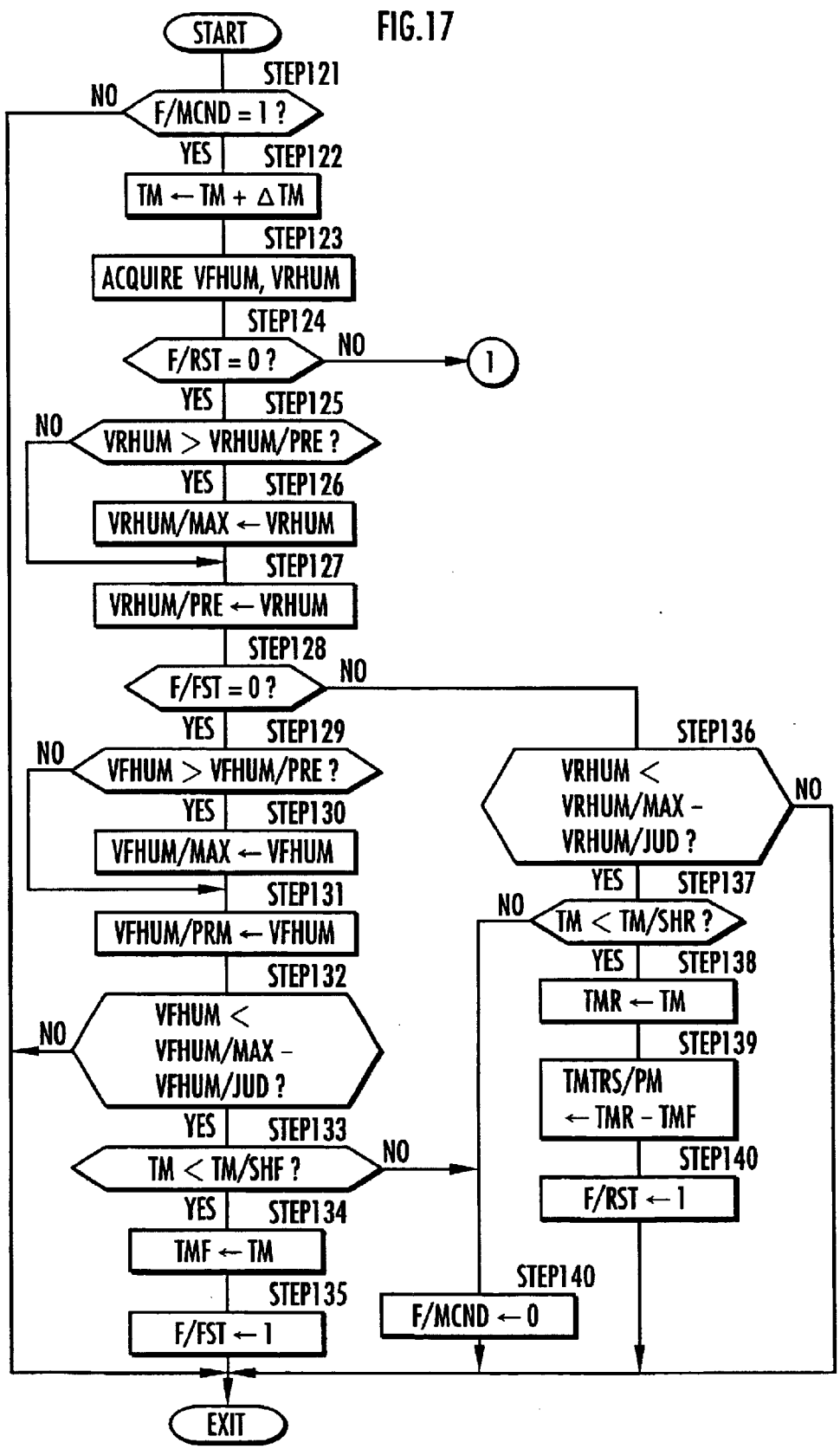
Figure 18:
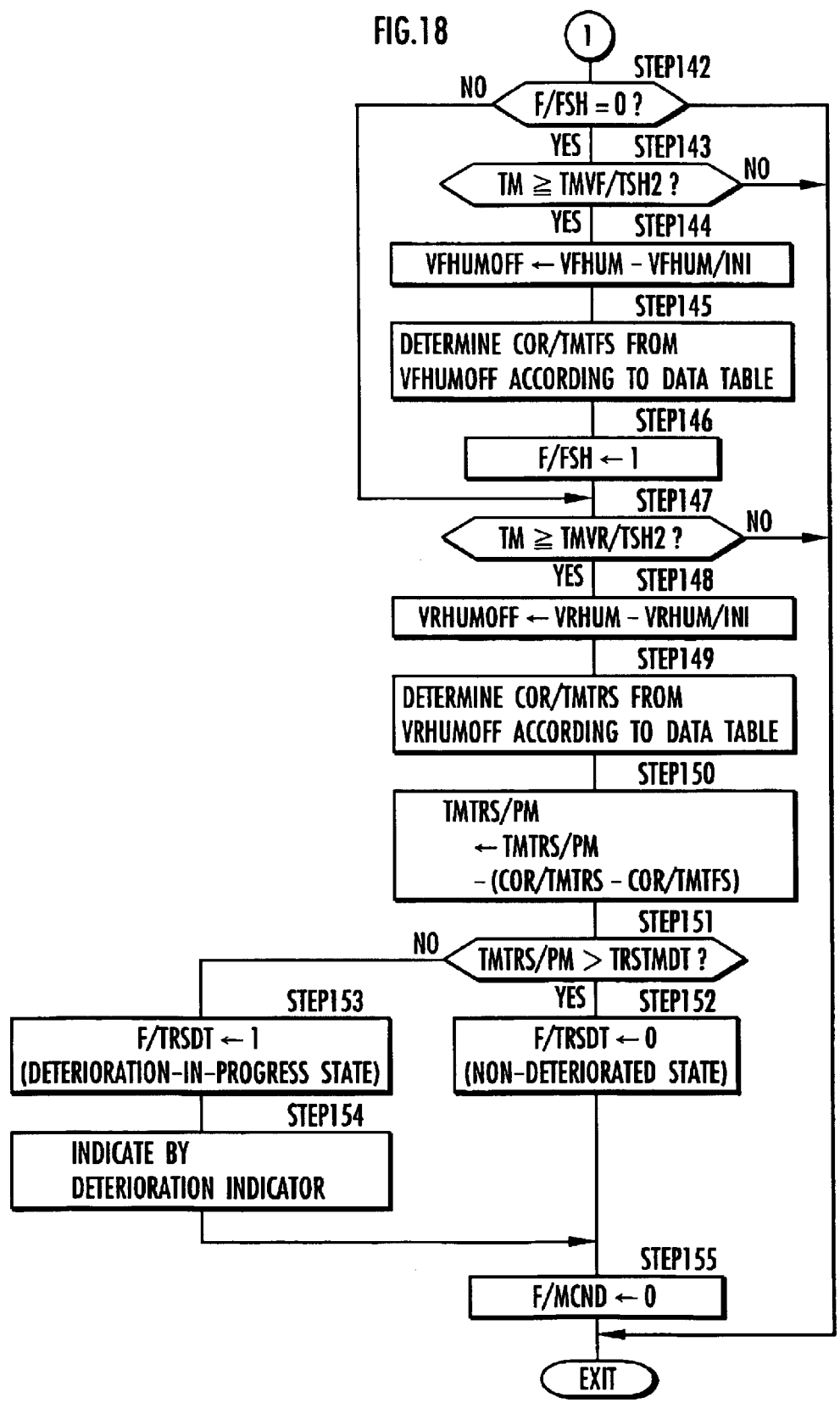

After having carried out the processing sequence shown in FIG. 16 when the engine 1 starts to operate, the deterioration evaluating device 17 carries out a processing sequence shown in FIGS. 17 and 18 in a given cycle time to evaluate the deteriorated state of the HC adsorbent 7 while the engine 1 is idling immediately after the engine 1 has started to operate.

Prior to specifically describing the processing sequence shown in FIGS. 17 and 18, a basic concept of a process of evaluating the deteriorated state of the HC adsorbent 7 according to the present embodiment will first be described below with reference to FIG. 19.

When the engine 1 starts operating, it emits an exhaust gas that is supplied through the exhaust system downstream of the engine 1 to the HC adsorbent 7, as described with respect to the first embodiment. At this time, the relative humidity detected by the downstream humidity sensor 19 changes as described with respect to the first embodiment. Specifically, immediately after the engine 1 has started to operate, the relative humidity detected by the downstream humidity sensor 19 is of a low level as indicated by the solid-line curve a or the broken-line curve b in FIG. 19. When the adsorption of moisture in the exhaust gas by the HC adsorbent 7 is saturated, the relative humidity changes to a tendency to increase monotonously from the low humidity level to a high humidity level. The curves a, b in FIG. 19 are identical to the curves a, b in FIG. 7 according to the first embodiment.

Figure 19:
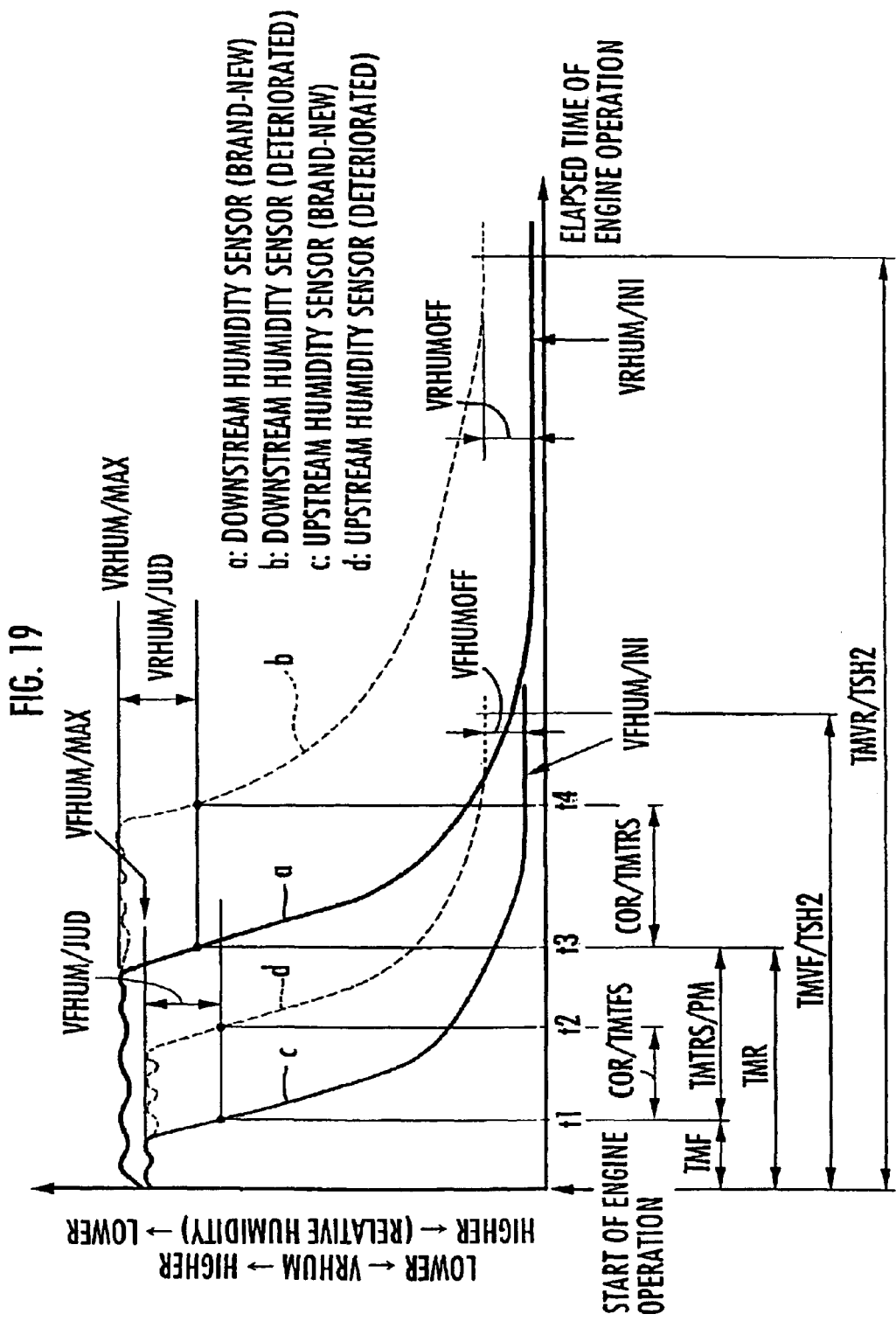
FIGS. 19 and 20 are graphs illustrative of a processing sequence of the flowchart of FIGS. 17 and 18.
Figure 20:
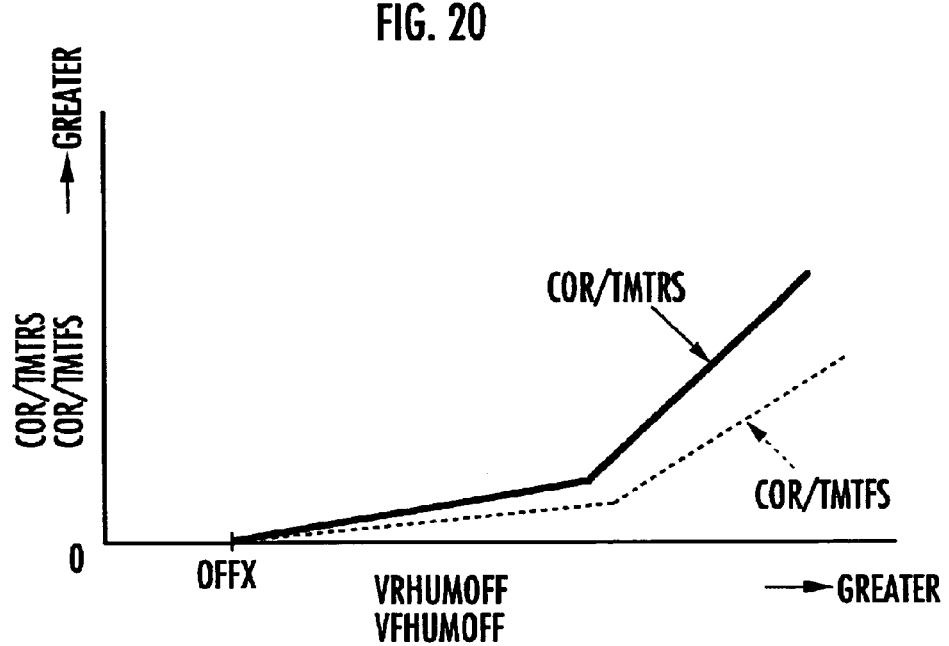

On the other hand, the relative humidity upstream of the HC adsorbent 7 which is detected by the upstream humidity sensor 25 does not change instantaneously to a high humidity level due to the highly humid exhaust gas from the start of operation of the engine 1, but changes from a low humidity level to a high humidity level with a certain delay from the start of operation of the engine 1 (see the curve c or d in FIG. 19). This is because it takes a slight period of time for the exhaust gas from the engine 1 to reach a location upstream of the HC adsorbent 7 (the location of the upstream humidity sensor 25), the relative humidity around the HC adsorbent 7 has been relatively low as the HC adsorbent 7 has adsorbed moisture during the shutdown of the engine 1, and the catalytic converter 6 upstream of the exhaust gas purifier 8 has adsorbed humidity. Therefore, the output voltage VFHUM of the upstream humidity sensor 25 changes to a tendency to decrease monotonously from a high humidity level to a low humidity level with a certain delay from the start of operation of the engine 1 as indicated by the solid-line curve c or the broken-line curve d in FIG. 19, for example. The curve c in FIG. 9 corresponds to data that is plotted when the upstream humidity sensor 25 is brand-new, and the curve d in FIG. 19 corresponds to data that is plotted when the upstream humidity sensor 25 is deteriorated to a certain degree.

A changing timing (a time t1 or t2 in FIG. 19) at which the output voltage VFHUM of the upstream humidity sensor 25 changes to a tendency to decrease monotonously from a high level to a low level is delayed as the deterioration of the upstream humidity sensor 25 progresses, as with the changing timing relative to the output voltage VRHUM of the downstream humidity sensor 19 as described with respect to the first embodiment.

A chanting timing at which the relative humidity detected by the upstream humidity sensor 25 changes to a tendency to increase monotonously from a low humidity level to a high humidity level, or a changing timing at which the output voltage VFHUM of the upstream humidity sensor 25 changes to a tendency to decrease monotonously from a high level to a low level may suffer variations due to the moisture adsorption by the catalytic converter 6 even if the deterioration of the upstream humidity sensor 25 is constant. For example, the changing timing at the time t1 in FIG. 19 may suffer variations even when the upstream humidity sensor 25 is brand-new.

If the changing timing of the relative humidity upstream of the HC adsorbent 7 which is detected by the upstream humidity sensor 25 is made earlier, then the timing at which the HC adsorbent 7 starts to be supplied with an exhaust gas containing much moisture (the timing at which the HC adsorbent 7 starts to adsorb moisture) is also made earlier. Therefore, the saturation of the adsorption of moisture by the HC adsorbent 7 is also made earlier, and hence the changing timing of the relative humidity downstream of the HC adsorbent 7 or the output voltage VRHUM of the downstream humidity sensor 19 is also made earlier. Conversely, if the changing timing of the relative humidity upstream of the HC adsorbent 7 is made later, then the changing timing of the relative humidity downstream of the HC adsorbent 7 or the output voltage VRHUM of the downstream humidity sensor 19 is also made later.

If the changing timing of the relative humidity upstream of the HC adsorbent 7 suffers variations as described above, then it is desirable to grasp the integrated amount of moisture supplied by the exhaust gas to the HC adsorbent 7 from the changing timing of the relative humidity upstream of the HC adsorbent 7 to the changing timing of the relative humidity downstream of the HC adsorbent 7 for grasping the total amount of moisture adsorbed by the HC adsorbent 7 after the engine 1 has started to operate. According to the present embodiment, not only the changing timing of the output voltage VRHUM of the downstream humidity sensor 19 (hereinafter referred to as "downstream changing timing"), but also the changing timing of the output voltage VFHUM of the upstream humidity sensor 25 (hereinafter referred to as "upstream changing timing") are detected, and integrated moisture quantity data representative of the integrated amount of moisture that is supplied to the HC adsorbent from the upstream changing timing to the downstream changing timing is determined as a deterioration evaluating parameter for evaluating the deteriorated state of the HC adsorbent 7. In the present embodiment, the process of obtaining a deterioration evaluating parameter is performed while the engine 1 is idling after the engine 1 has started to operate, as with the first embodiment, and the engine operation elapsed time from the upstream changing timing to the downstream changing timing is obtained as integrated moisture quantity data that serves as a deterioration evaluating parameter. More specifically, as shown in FIG. 19, it is assumed that the engine operation elapsed time from the start of operation of the engine 1 to the upstream changing timing (the time t1 relative to the curve c in FIG. 19 which corresponds to the data plotted when the upstream humidity sensor 25 is brand-new) is represented by TMF, and the engine operation elapsed time from the start of operation of the engine 1 to the downstream changing timing (the time t3 relative to the curve a in FIG. 19 which corresponds to the data plotted when the downstream humidity sensor 19 is brand-new) is represented by TMR (which is the deterioration evaluating parameter in the first embodiment), and TMR−TMF is used as a deterioration evaluating parameter TMTRS/PM. In the present embodiment, as with the first embodiment, the effect of the deterioration of the humidity sensors 19, 25, and the effect of characteristic variations of individual units of the humidity sensors 19, 25 are compensated for. In addition, the downstream changing timing signifies the adsorption saturation timing at which the adsorption of moisture by the HC adsorbent 7 is saturated, as with the first embodiment. The upstream changing timing signifies the timing at which the HC adsorbent 7 starts to essentially adsorb moisture.

Based on the concept described above, the processing sequence according to the flowchart shown in FIGS. 17 and 18 will be described below. The deterioration evaluating device 17 carries out the processing sequence shown in FIGS. 17 and 18 in a given cycle time after the engine 1 has been activated. According to the processing sequence shown in FIGS. 17 and 18, the deterioration evaluating device 17 determines the value of the flag F/MCND set in the processing sequence shown in FIG. 16 when the engine 1 starts to operate in STEP121. If F/MCND=0, then it means that the apparatus is in a state not suitable for evaluating the deteriorated state of the HC adsorbent 7 or the present process of evaluating the deteriorated state of the HC adsorbent 7 has already been finished. Therefore, the deterioration evaluating device 17 puts the processing sequence shown in FIGS. 17 and 18 to an end.

If F/MCND=1, then the deterioration evaluating device 17 increments the value of the engine operation elapsed time TM by a predetermined value ΔTM (fixed value) in STEP122, and then acquires the present detected data of the output voltage VFHUM of the upstream humidity sensor 25 and the present detected data of the output voltage VRHUM of the downstream humidity sensor 19 in STEP123. Then, the deterioration evaluating device 17 determines the value of the flag F/RST which is initialized by the processing sequence shown in FIG. 16 when the engine 1 starts to operate, in STEP124. The flag F/RST has the same meaning as the flag F/RST used in the first embodiment, i.e., the flag F/RST is "1" when the downstream changing timing relative to the downstream humidity sensor 19 is detected, and "0" when the downstream changing timing is not detected.

If F/RST=0 in STEP124, then the deterioration evaluating device 17 performs the same processing as in STEP15 through STEP17 shown in FIG. 6 according to the first embodiment in STEP125 through STEP127 to update the maximum output parameter VRHUM/MAX relative to the downstream humidity sensor 19 and update the value of the preceding output parameter VRHUM/PRE. In this manner, after the engine 1 has started to operate, the maximum value of the output voltage VRHUM of the downstream humidity sensor 19 is sequentially detected.

Then, the deterioration evaluating device 17 determines the value of a flag F/FST which is initialized by the processing sequence shown in FIG. 16 when the engine 1 starts to operate, in STEP128. The flag F/FST is "1" when the upstream changing timing relative to the upstream humidity sensor 25 is detected, and "0" when the upstream changing timing is not detected. If F/FST=0 in STEP128, then the deterioration evaluating device 17 performs the same processing as in STEP125 through STEP127 with respect to the upstream humidity sensor 25 in STEP129 through STEP131. Specifically, if the present value of the output voltage VFHUM of the upstream humidity sensor 25 (which is acquired in STEP123) is greater than the maximum output parameter VFHUM/MAX relative to the upstream humidity sensor 25 (YES in STEP129), then the deterioration evaluating device 17 updates the value of the maximum output parameter VFHUM/MAX with the present value of the output voltage VFHUM in STEP130. Regardless of the result of the decision in STEP129, the deterioration evaluating device 17 updates the preceding output parameter VFHUM/PRE relative to the upstream humidity sensor 25 with the present value of the output voltage VFHUM in STEP131. According to the processing in STEP129 through STEP131, the maximum value of the output voltage VFHUM of the upstream humidity sensor 25 is sequentially detected after the engine 1 has started to operate.

Then, the deterioration evaluating device 17 compares the present value of the output voltage VFHUM of the upstream humidity sensor 25 with the value (VFHUM/MAX−VFHUM/JUD) which is produced by subtracting a predetermined value VFHUM/JUD (see FIG. 19) from the present value of the maximum output parameter VFHUM/MAX in STEP132. If VFHUM≧VFHUM/MAX−VFHUM/JUD, then the deterioration evaluating device 17 judges that the timing of the present cycle time is not the changing timing at which the output voltage VFHUM of the upstream humidity sensor 25 changes to the tendency to decrease monotonously (the timing at which the adsorption of moisture and HCs by the HC adsorbent 7 is essentially started), and puts the present processing sequence shown in FIGS. 17 and 18 to an end. The predetermined value VFHUM/JUD may be the same as the predetermined value VRHUM/JUD (described above with respect to the first embodiment) for detecting the downstream changing timing relative to the downstream humidity sensor 19. However, in view of actual transitional characteristics of the relative humidity upstream and downstream of the HC adsorbent 7, the predetermined values VFHUM/JUD, VRHUM/JUD may be different from each other.

If VFHUM<VFHUM/MAX−VFHUM/JUD in STEP132, then the deterioration evaluating device 17 judges that the timing of the present cycle time is the upstream changing timing (the time t1 or t2 in FIG. 19), and compares the present engine operation elapsed time TM with a predetermined value TM/SHF (fixed value) in STEP133. The predetermined value TM/SHF is signified as an upper limit value for the engine operation elapsed time TM at the normal upstream changing timing. Specifically, if the engine operation elapsed time TM at the upstream changing timing detected in STEP132 is in excess of TM/SHF, then the upstream humidity sensor 25 may possibly be suffering a failure. The predetermined value TM/SHF may be set for each individual unit of the upstream humidity sensor 25, as with the parameter TM/SH used in STEP19 shown in FIG. 6 according to the first embodiment.

If TM<TM/SHF in STEP133 (in a normal case), then the deterioration evaluating device 17 judges that the timing of the present cycle time is the normal upstream changing timing relative to the upstream humidity sensor 25, and stores the present engine operation elapsed time TM as the value of the upstream changing detecting parameter TMF (as the value of the deterioration evaluating parameter TMTRS/PM for evaluating the deteriorated state of the HC adsorbent 7) in STEP134. The deterioration evaluating device 17 sets the value of the flag F/FST to "1" in STEP135, and puts the present processing sequence in FIGS. 17 and 18 to an end. In this case, F/FST=1 in STP128 from the next cycle time, and the processing from STEP136, to be described later on, is performed. The deterioration evaluating parameter TMTRS/PM is signified as representing the integrated amount of moisture in the exhaust gas that is generated by the engine 1 from the start of operation of the engine 1 until the upstream changing timing.

If TM≧TM/SHF in STEP133, then since the detected upstream changing timing is excessively late and inappropriate, the deterioration evaluating device 17 sets the flag F/MCND to "0" in STEP141, and puts the present processing sequence in FIGS. 17 and 18 to an end. In this case, F/MCND=0 in STP121 from the next cycle time, and the processing sequence shown in FIGS. 17 and 18 are immediately put to an end.

In the processing sequence shown in FIGS. 17 and 18 after the upstream detecting parameter TMF has been obtained, F/FST=1 in the decision processing in STEP128. In this case, the deterioration evaluating device 17 performs the same processing as in STEP18 through STEP22 shown in FIG. 6 according to the first embodiment in STEP136 through STEP141, and puts the processing sequence shown in FIGS. 17 and 18 in the present cycle time to an end. Specifically, the deterioration evaluating device 17 compares the present value of the output voltage VRHUM of the downstream humidity sensor 19 with the value (VRHUM/MAX−VRHUM/JUD) which is produced by subtracting a predetermined value VRHUM/JUD from the present value of the maximum output parameter VRHUM/MAX in STEP136. If VRHUM≧VRHUM/MAX−VRHUM/JUD, then the deterioration evaluating device 17 judges that the timing of the present cycle time is not the changing timing at which the output voltage VRHUM of the humidity sensor 19 changes to the tendency to decrease monotonously (the timing at which the adsorption of moisture by the HC adsorbent 7 is saturated"), and puts the present processing sequence shown in FIGS. 17 and 18 to an end. The predetermined value VRHUM/JUD may be the same as the predetermined value VRHUM/JUD used in the first embodiment.

If VRHUM<VRHUM/MAX−VRHUM/JUD in STEP136, then the deterioration evaluating device 17 judges that the timing of the present cycle time is the downstream changing timing (the time t3 or t4 in FIG. 19), and compares the present engine operation elapsed time TM with a predetermined value TM/SHR (fixed value) in STEP137. The predetermined value TM/SHR is signified as an upper limit value for the engine operation elapsed time TM at the normal downstream changing timing, as with the parameter TM/SH used in STEP19 shown in FIG. 6 according to the first embodiment. The predetermined value TM/SHR may be set for each individual unit of the downstream humidity sensor 19, as with the parameter TM/SH used in the first embodiment.

If TM<TM/SHR in STEP137, then the deterioration evaluating device 17 judges that the timing of the present cycle time is the normal downstream changing timing, and stores the present engine operation elapsed time TM as the value of the downstream changing detecting parameter TMR in STEP138. Then, the deterioration evaluating device 17 determines a value (TMR−TMF) that is produced by subtracting the value of the upstream changing detecting parameter TMF obtained in STEP134 from the value of the downstream changing detecting parameter TMR, temporarily as a deterioration evaluating parameter TMTRS/PM in STEP139. Thereafter, the deterioration evaluating device 17 sets the value of the flag F/RST to "1" in STEP140, and puts the present processing sequence in FIGS. 17 and 18 to an end. The downstream changing detecting parameter TMR is signified as representing the integrated amount of moisture in the exhaust gas that is generated by the engine 1 from the start of operation of the engine 1 until the downstream changing timing. When either one of the upstream humidity sensor 25 and the downstream humidity sensor 19 is brand-new, the deterioration evaluating parameter TMTRS/PM determined in STEP139 corresponds to the total amount of moisture that has actually been adsorbed by the HC adsorbent 7 after the engine 1 has started to operate presently.

If TM≧TM/SHR in STEP137, then since the detected downstream changing timing is excessively late and inappropriate, the deterioration evaluating device 17 sets the flag F/MCND to "0" in STEP141, and puts the present processing sequence in FIGS. 17 and 18 to an end.

In the processing sequence shown in FIGS. 17 and 18 after the value of the downstream changing detecting parameter has been obtained, F/RST=1 in the decision processing in STEP124. In this case, the deterioration evaluating device 17 performs the processing from STEP141 shown in FIG. 18. First, the deterioration evaluating device 17 determines the value of a flag F/FSH which is initialized to "0" by the processing sequence shown in FIG. 16 when the engine 1 starts to operate, in STEP142. The flag F/FSH is "1" when a characteristic change parameter VFHUMOFF, to be described later on, relative to the upstream humidity sensor 25, and a corrective quantity COR/TMTFS depending thereon have been determined, and "0" when such a characteristic change parameter VFHUMOFF and a corrective quantity COR/TMTFS have not been determined.

If F/FSH=1 in the decision processing in STEP142, then control goes to the processing from STEP147 to be described later on. If F/FSH=0, then the deterioration evaluating device 17 compares the present engine operation elapsed time TM with a predetermined value TMVF/TSH2 (see FIG. 19) in STEP143. The predetermined value TMVF/TSH2 is a threshold for determining whether the relative humidity detected by the upstream humidity sensor 25 has reached a substantially constant high relative humidity level (about 100%) after the upstream changing timing or not. The value of TMVF/TSH2 is experimentally determined in advance such that if TM≧TMVF/TSH2, then the relative humidity detected by the upstream humidity sensor 25 reaches a substantially constant high relative humidity level regardless of characteristic changes and characteristic variations of individual units of the upstream humidity sensor 25.

If TM>TMVF/TSH2 in STEP143, then the deterioration evaluating device 17 determines a value (=VFHUM−VFHUM/INI) which is produced by subtracting the value of the parameter VFHUM/INI set depending on the characteristics of the individual unit of the upstream humidity sensor 25 in STEP110 shown in FIG. 16 when the engine 1 starts to operate, from the present value of the output voltage VFHUM of the upstream humidity sensor 25, as a characteristic change parameter VFHUMOFF representative of a characteristic change due to the deterioration of the upstream humidity sensor 25 in STEP144. As shown in FIG. 19, the characteristic change parameter VFHUMOFF is signified as an offset voltage produced by the deterioration of the upstream humidity sensor 25, as with the characteristic change parameter VRHUMOFF of the downstream humidity sensor 19 according to the second embodiment. If the upstream humidity sensor 25 is brand-new, then VFHUMOFF=0 regardless of characteristic variations of individual units of the upstream humidity sensor 25. As the upstream humidity sensor 25 is progressively deteriorated, the value of VFHUMOFF becomes larger. Therefore, the characteristic change parameter VFHUMOFF represents the degree to which the humidity sensor 25 is deteriorated regardless of characteristic variations of individual units of the humidity sensor 25.

After having determined the characteristic change parameter VFHUMOFF relative to the upstream humidity sensor 25, the deterioration evaluating device 17 determines a corrective quantity COR/TMTFS for correcting the deterioration evaluating parameter TMTRS/PM determined in STEP139 from the value of the characteristic change parameter VFHUMOFF in STEP145. The corrective quantity COR/TMTFS is determined from the value of the characteristic change parameter VFHUMOFF based on a data table represented by the broken-line curve shown in FIG. 20, for example. The corrective quantity COR/TMTFS corrects the deterioration evaluating parameter TMTRS/PM in order to compensate for the effect of a characteristic change due to the deterioration of the upstream humidity sensor 25. According to the data table shown in FIG. 20, the corrective quantity COR/TMTFS is determined such that when the value of the characteristic change parameter VFHUMOFF is sufficiently small (when VFHUMOFF≦OFFX in FIG. 20), i.e., when the upstream humidity sensor 25 is brand-new or nearly brand-new, COR/TMTFS=0, and when the value of the characteristic change parameter VFHUMOFF becomes large to a certain extent (VFHUMOFF>OFFX in FIG. 20), COR/TMTFS has a larger value as the characteristic change parameter VFHUMOFF is larger. As shown in FIG. 19, the corrective quantity COR/TMTFS is signified as correcting the value of the upstream changing detecting parameter TMF obtained when a characteristic change is being caused by the deterioration of the upstream humidity sensor 25 (the curve d in FIG. 19) into the value of the upstream changing detecting parameter TMF obtained when the upstream humidity sensor 25 is brand-new (the curve c in FIG. 19).

Having thus determined the corrective quantity COR/TMTFS relative to the upstream humidity sensor 25, the deterioration evaluating device 17 sets the value of the flag F/FSH to "1" in STEP146, and thereafter performs the processing from STEP147. In subsequent cycle times after the value of the flag F/FSH has been set to "1" in STEP146, since the answer to STEP142 is NO, the processing from STEP147 is immediately performed after the decision processing in STEP142.

In STEP147, the deterioration evaluating device 17 compares the engine operation elapsed time TM with a predetermined value TMVR/TSH2 (see FIG. 19). The predetermined value TMVR/TSH2 is the same as the predetermined value TMVR/TSH2 used in relation to the downstream humidity sensor 19 according to the second embodiment. The value of TMVR/TSH2 is experimentally determined such that if $TM \geq TMVR/TSH2$, then the output voltage VRHUM of the downstream humidity sensor 19 reliably reaches a substantially constant low voltage level after the downstream changing timing regardless of the deteriorated state and characteristic variations of the downstream humidity sensor 19.

If $TM \geq TMVR/TSH2$ in STEP147, then the deterioration evaluating device 17 determines a value (=VRHUM−VRHUM/INI) which is produced by subtracting the value of the parameter VRHUM/INI set depending on the characteristics of the individual unit of the downstream humidity sensor 19 in STEP107 shown in FIG. 16 when the engine 1 starts to operate, from the present value of the output voltage VRHUM of the downstream humidity sensor 19, as a characteristic change parameter VRHUMOFF representative of a characteristic change due to the deterioration of the downstream humidity sensor 19 in STEP148. The characteristic change parameter VRHUMOFF is the same as the characteristic change parameter VRHUMOFF of the downstream humidity sensor 19 according to the second embodiment, and becomes larger as the deterioration of the downstream humidity sensor 19 progresses.

Then, the deterioration evaluating device 17 determines a corrective quantity COR/TMTRS for correcting the deterioration evaluating parameter TMTRS/PM from the value of the characteristic change parameter VRHUMOFF in STEP149. The corrective quantity COR/TMTRS is determined from the value of the characteristic change parameter VRHUMOFF based on a data table represented by the solid-line curve shown in FIG. 20, for example. The corrective quantity COR/TMTRS corrects the deterioration evaluating parameter TMTRS/PM in order to compensate for the effect of a characteristic change due to the deterioration of the downstream humidity sensor 19. According to the data table shown in FIG. 20, as with the corrective quantity COR/TMTFS relative to the upstream humidity sensor 25, the corrective quantity COR/TMTRS relative to the downstream humidity sensor 19 is determined such that when the value of the characteristic change parameter VRHUMOFF is sufficiently small (when $VRHUMOFF \leq OFFX$ in FIG. 20), i.e., when the downstream humidity sensor 19 is brand-new or nearly brand-new, COR/TMTRS=0, and when the value of the characteristic change parameter VRHUMOFF becomes large to a certain extent (VRHUMOFF>OFFX in FIG. 20), COR/TMTRS has a larger value as the characteristic change parameter VRHUMOFF is larger. As shown in FIG. 19, the corrective quantity COR/TMTRS is signified as correcting the value of the downstream changing detecting parameter TMR obtained when a characteristic change is being caused by the deterioration of the downstream humidity sensor 19 (the curve b in FIG. 19) into the value of the downstream changing detecting parameter TMR obtained when the downstream humidity sensor 19 is brand-new (the curve a in FIG. 19).

Then, the deterioration evaluating device 17 subtracts the difference (COR/TMTRS−COR/TMTFS) between the corrective quantities COR/TMTFS, COR/TMTRS determined respectively in STEP145, STEP149 from the deterioration evaluating parameter TMTRS/PM determined in STEP139, thus correcting the deterioration evaluating parameter TMTRS/PM in STEP150.

The correction in STEP150 is equivalent to subtracting a value (=TMF−COR/TMTFS, see FIG. 19) that is produced by subtracting the corrective quantity COR/TMTFS from the upstream changing detecting parameter TMF, from a value (=TMR−COR/TMTRS, see FIG. 19) that is produced by subtracting the corrective quantity COR/TMTRS from the downstream changing detecting parameter TMF obtained in STEP138 shown in FIG. 17. Therefore, the deterioration evaluating parameter TMTRS/PM thus obtained by being corrected in STEP150 depends on the ability of the HC adsorbent 7 to adsorb moisture, irrespective of characteristic changes due to the deterioration of the upstream and downstream humidity sensors 25, 19, characteristic variations of individual units of the humidity sensors 25, 19, and also variations in the changing timing of the actual relative humidity at the location of the upstream humidity sensor 25. According to the present embodiment, as can be seen from FIG. 20, the corrective quantities COR/TMTRS, COR/TMTFS relative to the humidity sensors 19, 25 are "0" when either one of the characteristic change parameters VRHUMOFF, VFHUMOFF is smaller than the predetermined value OFFX (when either one of detected characteristic changes of the humidity sensors 19, 25 is sufficiently small). Therefore, when VRHUMOFF<OFFX and VFHUMOFF<OFFX, the deterioration evaluating parameter TMTRS/PM is not virtually corrected (is prohibited from being corrected).

Then, the deterioration evaluating device 17 performs the same processing as the processing in STEP28 through STEP32 shown in FIG. 6 according to the first embodiment in STEP151 through STEP155, finally evaluating the deteriorated state of the HC adsorbent 7. Specifically, the deterioration evaluating device 17 compares the deterioration evaluating parameter TMTRS/PM corrected in STEP150 with the deterioration evaluating threshold TRSTMDT set in STEP111 shown in FIG. 16 when the engine 1 starts to operate in STEP151, to determine whether the HC adsorbent 7 is in the non-deteriorated state in STEP152 or in the deterioration-in-progress state in STEP153. If the HC adsorbent 7 is in the deterioration-in-progress state, then the deterioration evaluating device 17 operates the deterioration indicator 18 to indicate the deterioration-in-progress state in STEP154. Then, the deterioration evaluating device 17 resets the value of the flag F/MCND to "0" in STEP155, and puts the processing sequence shown in FIGS. 17 and 18 to an end in the present operation of the engine 1. According to the present embodiment, inasmuch as the start point for calculating the deterioration evaluating parameter TMTRS/PM is the upstream changing timing that is slightly later than the start of operation of the engine 1, the deterioration evaluating threshold TRSTMDT is of a value slightly smaller than with the first embodiment (the solid-line curve in FIG. 5) as indicated by the broken-line curve in FIG. 5.

According to the present embodiment, as described above, the deteriorated state of the HC adsorbent 7 can be evaluated with accuracy while compensating for the effect of characteristic changes due to the deterioration of the upstream and downstream humidity sensors 25, 19, characteristic variations of individual units of the humidity sensors 25, 19, and variations in the changing timing of the actual relative humidity at the location of the upstream humidity sensor 25.

In the present embodiment, VFHUMOFF, VRHUMOFF are used as characteristic change parameters relative to the upstream humidity sensor 25 and the downstream humidity sensor 19. However, characteristic change parameters which are the same as the characteristic change parameters in the first embodiment may be used. In such a case, the characteristic change parameter that is used relative to the downstream humidity sensor 19 is identical to the characteristic change parameter VRHUMCH (see FIG. 7) in the first embodiment. The characteristic change parameter that is used relative to the upstream humidity sensor 25 may be the difference between the output voltage VFHUM of the upstream humidity sensor 25 at the time when a predetermined period of time for the individual unit of the upstream humidity sensor 25 (which corresponds to the parameter TMVR/TSH relative to the downstream humidity sensor 19) has elapsed from the start of operation of the engine 1, and the parameter VFHUM/INI which serves as a reference value for the output voltage VFHUM of the upstream humidity sensor 25.

In the present embodiment, the deterioration evaluating parameter TMTRS/PM is corrected. However, the deterioration evaluating threshold TRSTMDT, rather than the deterioration evaluating parameter TMTRS/PM, may be corrected. In such a case, the deterioration evaluating threshold TRSTMDT may be corrected by adding the difference (COR/TMTRS−COR/TMTFS) between the corrective quantities COR/TMTRS, COR/TMTFS to the deterioration evaluating threshold TRSTMDT, and the corrected deterioration evaluating threshold TRSTMDT may be compared with the deterioration evaluating parameter TMTRS/PM (which is obtained in STEP139 shown in FIG. 17).

In the present embodiment, if either one of the values of the characteristic change parameters VRHU-MOFF, VFHU-MOFF becomes greater than a suitable upper limit value (if it becomes excessively large), then the humidity sensors 19, 25 may possibly suffer a failure. In this case, the substantial evaluation of the deteriorated state of the HC adsorbent 7 (the processing from STEP150 shown in FIG. 18) may not be performed.

In the present embodiment, the period of time (TMR−TMF) that has elapsed from the time when the upstream changing timing is detected to the time when the downstream changing timing is detected is used as a basic value of the deterioration evaluating parameter TMTRS/PM. However, the integrated value of the amount of fuel supplied in the period of time from the time when the upstream changing timing is detected to the time when the downstream changing timing is detected (which may be a command value generated by the ECU 16), or the integrated value of a detected or estimated value of the amount of intake air of the engine 1 may be used as a basic value of the deterioration evaluating parameter TMTRS/PM. In this case, the engine 1 may not be idling after it has started to operate.

In the first through third embodiments, the present invention has been described as being applied to a system for evaluating the deteriorated state of the HC adsorbent 7 that is independently provided in the exhaust system of the engine 1. However, the present invention is also applicable to the evaluation of a state such as a deteriorated state of an HC adsorbent of a hydrocarbon adsorption catalyst which comprises a composite combination of an HC adsorbent and a catalyst such as a three-way catalyst. The hydrocarbon adsorption catalyst comprises a support of honeycomb structure whose surface is coated with zeolite as an HC adsorbent and which supports thereon a layer of precious metal such as platinum, palladium, rhodium, etc. as a constituent element of a three-way catalyst.

In the first through third embodiments, the exhaust gas purifier 8 housing the HC adsorbent 7 therein has a structure shown in FIG. 1 or FIG. 15, for example. The exhaust gas purifier 8 may also be of a structure shown in FIG. 21.

The exhaust gas purifier 8 has two divided flow passages 28, 29 branched from an upstream exhaust pipe 26, a substantially cylindrical housing 30 communicating with a downstream portion of the divided flow passage 28, and a bypass exhaust pipe 31 (exhaust passage) housed concentrically in the housing 30. The bypass exhaust pipe 31 is filled with a cylindrical HC adsorbent (hydrocarbon adsorbent) 32. The upstream exhaust pipe 26 is connected to a downstream end of the catalytic converter 6 shown in FIG. 1, for example.

A space 33 defined between the inner circumferential surface of the housing 30 and the outer circumferential surface of the bypass exhaust pipe 31 serves as a cylindrical exhaust passage 33 into which the exhaust gas is introduced from the divided flow passage 28. The bypass exhaust pipe 31 has an upstream end (left end in FIG. 21) joined to the downstream end of the divided flow passage 29 through an opening 30a defined in the upstream end of the housing 30. The upstream end of the bypass exhaust pipe 31 has an outer circumferential surface sealingly held in close contact with the inner circumferential surface of the opening 30a in the housing 30. The exhaust passage 33 in the housing 30 is not in communication with the divided flow passage 29 at the opening 30a.

An EGR passage 34 (exhaust gas recirculation passage) extends from the upstream end of the bypass exhaust pipe 31. The EGR passage 34 communicates with the bypass exhaust passage 31 through a communication hole 35 defined in the circumferential wall of the upstream end of the bypass exhaust pipe 31. The EGR passage 34 is also connected to the intake pipe of the engine downstream of the throttle valve as with the EGR passage 13 according to the first through third embodiments. The EGR passage 34 has an on/off valve (solenoid-operated valve) for opening and closing the EGR passage 34.

The bypass exhaust pipe 31 has a downstream end (right end in FIG. 21) joined to a downstream exhaust pipe 27 through an opening 30b defined in the downstream end of the housing 30. The downstream end of the bypass exhaust pipe 31 has an outer circumferential surface sealingly held in close contact with the inner circumferential surface of the opening 30b in the housing 30. The bypass exhaust passage 31 in the housing 30 is not in communication with the exhaust pipe 27 at the opening 30b. The downstream end of the bypass exhaust pipe 31 has a plurality of communication holes 36 defined in its circumferential wall and communicating with the exhaust passage 33 in the housing 30. The exhaust passage 33 communicates with the bypass exhaust pipe 31 through the communication holes 36. The exhaust pipe 27 is vented to the atmosphere through another catalytic converter, a muffler, or the like.

A directional control valve 37 is disposed in a region where the upstream exhaust pipe 26 is branched into the divided flow passages 28, 29 for selectively connecting the divided flow passages 28, 29 to the exhaust pipe 26. The directional control valve 37 is angularly movable about a pivot shaft 38 selectively into a solid-line position and an imaginary-line position by an actuator (not shown). When the directional control valve 37 is in the solid-line position, it disconnects the divided flow passage 29 from the exhaust pipe 26 and connects the divided flow passage 28 to the exhaust pipe 26. When the directional control valve 37 is in the imaginary-line position, it disconnects the divided flow passage 28 from the exhaust pipe 26 and connects the divided flow passage 29 to the exhaust pipe 26.

With the exhaust gas purifier 8 thus constructed, immediately after the engine 1 starts to operate, the directional control valve 37 is actuated to the imaginary-line position. The exhaust gas supplied from the engine 1 to the exhaust gas purifier 8 flows through the divided flow passage 29, the bypass exhaust pipe 31 (including the HC adsorbent 32 housed therein), and the exhaust pipe 27 into the atmosphere. At this time, HCs contained in the exhaust gas are adsorbed by the HC adsorbent 32 in the bypass exhaust pipe 31. When the directional control valve 37 is actuated to the solid-line position, the exhaust gas supplied from the engine 1 through the catalytic converter 6 (see FIG. 1) to the exhaust gas purifier 8 flows through the divided flow passage 28, the exhaust passage 33 in the housing 30, the communication holes 36, and the exhaust pipe 27 into the atmosphere.

Figure 21:
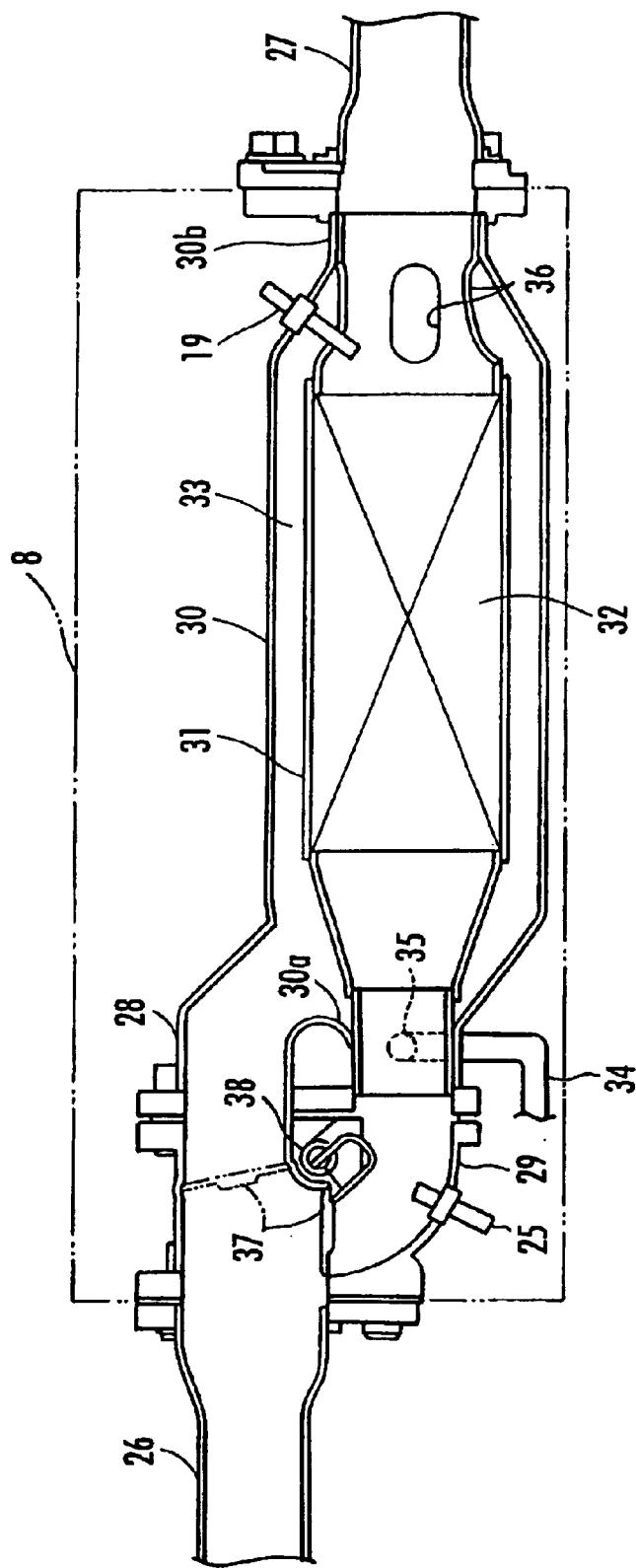
FIG. 21 is a view of another exhaust gas purifier having a hydrocarbon adsorbent.

For evaluating the deteriorated state of the HC adsorbent 32 of the exhaust gas purifier 8, a humidity sensor 19 is provided downstream of the HC adsorbent 32 near the HC adsorbent 32, as shown in FIG. 21. The deteriorated state of the HC adsorbent 32 can be evaluated by the deterioration evaluating device 17 which performs a processing sequence that is exactly the same as the processing sequence in the first embodiment or the second embodiment. Alternatively, in addition to the humidity sensor 19, a humidity sensor 25 is provided upstream of the HC adsorbent 32 near the HC adsorbent 32, as shown in FIG. 21. In this case, the deteriorated state of the HC adsorbent 32 can be evaluated by the deterioration evaluating device 17 which performs a processing sequence that is exactly the same as the processing sequence in the third embodiment.

INDUSTRIAL APPLICABILITY

As described above, the present invention is useful as an apparatus capable of appropriately monitoring, with an inexpensive arrangement, a state such as a deteriorated state of a hydrocarbon adsorbent provided in an exhaust system of an internal combustion engine that is used as a propulsive source or the like on automobiles, hybrid vehicles, and ships.

What is claimed is:

1. An apparatus for monitoring a state of a hydrocarbon adsorbent disposed in an exhaust passage of an internal combustion engine for adsorbing hydrocarbons in an exhaust gas emitted from the internal combustion engine, using output data of a humidity sensor disposed near the hydrocarbon adsorbent, characterized by:

characteristic change detecting means for detecting a characteristic change of the humidity sensor based on output data of the humidity sensor under a predetermined condition, and characteristic change compensating means for correcting a parameter to grasp the state of the hydrocarbon adsorbent using the output data of the humidity sensor, based on the characteristic change detected by said characteristic change detecting means.

2. An apparatus for monitoring the state of the hydrocarbon adsorbent according to claim 1, characterized by:

integrated moisture quantity data generating means for sequentially generating data of an integrated amount of moisture supplied to said hydrocarbon adsorbent by the exhaust gas emitted from the internal combustion engine after the internal combustion engine has started to operate, wherein said characteristic change detecting means detects the characteristic change of the humidity sensor based on a change due to the characteristic change of the humidity sensor, of changes of transitional characteristics of the output data of the humidity sensor with respect to the data generated by said integrated moisture quantity data generating means after the internal combustion engine has started to operate.

3. An apparatus for monitoring the state of the hydrocarbon adsorbent according to claim 2, characterized in that said characteristic change detecting means detects the characteristic change of the humidity sensor based on a change from a predetermined reference value of characteristic change detecting output data which comprises the output data of the humidity sensor at the time when the data generated by said integrated moisture quantity data generating means has reached a predetermined value after the internal combustion engine has started to operate.

4. An apparatus for monitoring the state of the hydrocarbon adsorbent according to claim 1, characterized in that said characteristic change detecting means detects the characteristic change of the humidity sensor based on a change due to the characteristic change of the humidity sensor, of changes of transitional characteristics of the output data of the humidity sensor with respect to a period of time that has elapsed after the internal combustion engine has started to operate.

5. An apparatus for monitoring the state of the hydrocarbon adsorbent according to claim 4, characterized in that said characteristic change detecting means detects the characteristic change of the humidity sensor based on a change from a predetermined reference value of characteristic change detecting output data which comprises the output data of the humidity sensor at the time when the period of time that has elapsed after the internal combustion engine has started to operate has reached a predetermined value.

6. An apparatus for monitoring the state of the hydrocarbon adsorbent according to claim 2 or 3, characterized in that the state of said hydrocarbon adsorbent to be monitored comprises a deteriorated state of said hydrocarbon adsorbent, and said humidity sensor is disposed downstream of said hydrocarbon adsorbent, wherein a changing timing at which a humidity represented by the output data of said humidity sensor changes to a tendency to increase monotonously from a low humidity level to a high humidity level after the internal combustion engine has started to operate is detected, and the data generated by said integrated moisture quantity data generating means at the detected changing timing is used as said parameter for grasping the deteriorated state of said hydrocarbon adsorbent.

7. An apparatus for monitoring the state of the hydrocarbon adsorbent according to any one of claims 1, 4 and 5, characterized in that the state of said hydrocarbon adsorbent to be monitored comprises a deteriorated state of said hydrocarbon adsorbent, and said humidity sensor is disposed downstream of said hydrocarbon adsorbent, further comprising:

integrated moisture quantity data generating means for sequentially generating data of an integrated amount of moisture supplied to said hydrocarbon adsorbent by the exhaust gas emitted from the internal combustion engine after the internal combustion engine has started to operate, and changing timing detecting means for detecting a changing timing at which a humidity represented by the output data of said humidity sensor changes to a tendency to increase monotonously from a low humidity level to a high humidity level after the internal combustion engine has started to operate, wherein the data generated by said integrated moisture quantity data generating means at the changing timing detected by said changing timing detecting means is used as said parameter for grasping the deteriorated state of said hydrocarbon adsorbent.

8. An apparatus for monitoring the state of the hydrocarbon adsorbent according to any one of claims 1 through 5, characterized in that the state of said hydrocarbon adsorbent to be monitored comprises a deteriorated state of said hydrocarbon adsorbent, and the output data of said humidity sensor before a humidity represented by the output data of said humidity sensor is converged to a humidity outside of said exhaust passage after said internal combustion engine has stopped operating is used as said parameter for grasping the deteriorated state of said hydrocarbon adsorbent.

9. An apparatus for monitoring the state of the hydrocarbon adsorbent according to claim 8, characterized in that the output data of said humidity sensor within a period of time in which the humidity represented by the output data of said humidity sensor is maintained at a substantially constant level after said internal combustion engine has stopped operating is used as said parameter for grasping the deteriorated state of said hydrocarbon adsorbent.

10. An apparatus for monitoring the state of the hydrocarbon adsorbent according to claim 8, characterized in that the deteriorated state of said hydrocarbon adsorbent is grasped based on said parameter after said internal combustion engine has stopped operating under a predetermined condition.

11. An apparatus for monitoring the state of the hydrocarbon adsorbent according to claim 1, characterized in that said characteristic change compensating means corrects said parameter when the characteristic change of said humidity sensor which is detected by said characteristic change detecting means exceeds a predetermined quantity.

12. An apparatus for monitoring the state of the hydrocarbon adsorbent according to claim 1, characterized in that the deteriorated state of said hydrocarbon adsorbent is prohibited from being grasped based on said parameter when the characteristic change of said humidity sensor which is detected by said characteristic change detecting means exceeds a predetermined upper limit quantity.

13. An apparatus for monitoring the state of the hydrocarbon adsorbent according to claim 1, characterized in that said humidity sensor has characteristic data holding means for holding, in advance, data of characteristics of an individual unit of said humidity sensor, and said characteristic change detecting means detects the characteristic change of the humidity sensor based on the output data of said humidity sensor and the data held by said characteristic data holding means.

14. An apparatus for monitoring the state of the hydrocarbon adsorbent according to claim 3, characterized in that said humidity sensor has characteristic data holding means for holding, in advance, data specifying said predetermined value relative to the data generated by said integrated moisture quantity data generating means, as the data of the characteristics of the individual unit of said humidity sensor, and said characteristic change detecting means acquires the characteristic change detecting output data of said humidity sensor using said predetermined value which is specified by the data held by said characteristic data holding means.

15. An apparatus for monitoring the state of the hydrocarbon adsorbent according to claim 3 or 5, characterized in that said humidity sensor has characteristic data holding means for holding, in advance, data specifying said reference value relative to said characteristic change detecting output data as the data of the characteristics of the individual unit of said humidity sensor, and said characteristic change detecting means acquires the characteristic change detecting output data of said humidity sensor using said reference value which is specified by the data held by said characteristic data holding means.

16. An apparatus for monitoring the state of the hydrocarbon adsorbent according to claim 13 or 14, characterized in that said characteristic data holding means comprises a resistive element having a resistance depending on the value of the data of the characteristics of the individual unit of said humidity sensor.

17. An apparatus for monitoring the state of the hydrocarbon adsorbent according to claim 15, characterized in that said characteristic data holding means comprises a resistive element having a resistance depending on the value of the data of the characteristics of the individual unit of said humidity sensor.

18. An apparatus for monitoring a state of a hydrocarbon adsorbent disposed in an exhaust passage of an internal combustion engine for adsorbing hydrocarbons in an exhaust gas emitted from the internal combustion engine, using output data of a plurality of humidity sensors disposed at different locations near the hydrocarbon adsorbent, characterized by:

characteristic change detecting means for detecting characteristic changes of the humidity sensors based on output data of the respective humidity sensors under a predetermined condition, and characteristic change compensating means for correcting a parameter to grasp the state of the hydrocarbon adsorbent using the output data of the humidity sensors, based on the characteristic changes of the humidity sensors detected by said characteristic change detecting means.

19. An apparatus for monitoring the state of the hydrocarbon adsorbent according to claim 18, characterized by:

integrated moisture quantity data generating means for sequentially generating data of an integrated amount of moisture supplied to said hydrocarbon adsorbent by the exhaust gas emitted from the internal combustion engine after the internal combustion engine has started to operate, wherein said characteristic change detecting means detects the characteristic changes of the humidity sensors based on a change due to the characteristic changes of the humidity sensors, of changes of transitional characteristics of the output data of the humidity sensors with respect to the data generated by said integrated moisture quantity data generating means after the internal combustion engine has started to operate.

20. An apparatus for monitoring the state of the hydrocarbon adsorbent according to claim 19, characterized in that said characteristic change detecting means detects the characteristic changes of the humidity sensors based on a change from a predetermined reference value of characteristic change detecting output data which comprises the output data of the humidity sensors at the time when the data generated by said integrated moisture quantity data generating means has reached predetermined values for the respective humidity sensors after the internal combustion engine has started to operate.

21. An apparatus for monitoring the state of the hydrocarbon adsorbent according to claim 18, characterized in that said characteristic change detecting means detects the characteristic changes of the humidity sensors based on a change due to the characteristic changes of the humidity sensors, of changes of transitional characteristics of the output data of the humidity sensors with respect to a period of time that has elapsed after the internal combustion engine has started to operate.

22. An apparatus for monitoring the state of the hydrocarbon adsorbent according to claim 21, characterized in that said characteristic change detecting means detects the characteristic changes of the humidity sensors based on a change from predetermined reference values of characteristic change detecting output data of the humidity sensors which comprises the output data of the humidity sensors at the time when the period of time that has elapsed after the internal combustion engine has started to operate has reached predetermined values for the respective humidity sensors.

23. An apparatus for monitoring the state of the hydrocarbon adsorbent according to claim 19 or 20, characterized in that the state of said hydrocarbon adsorbent to be monitored comprises a deteriorated state of said hydrocarbon adsorbent, and said humidity sensors comprise a downstream humidity sensor disposed downstream of said hydrocarbon adsorbent and an upstream humidity sensor disposed upstream of said hydrocarbon adsorbent, further comprising:

upstream changing timing detecting means for detecting a changing timing at which a humidity represented by the output data of said upstream humidity sensor changes to a tendency to increase monotonously from a low humidity level to a high humidity level after the internal combustion engine has started to operate, and downstream changing timing detecting means for detecting a changing timing at which a humidity represented by the output data of said downstream humidity sensor changes to a tendency to increase monotonously from a low humidity level to a high humidity level after the internal combustion engine has started to operate, wherein the difference between the data generated by said integrated moisture quantity data generating means at the changing timing detected by said upstream changing timing detecting means and the data generated by said integrated moisture quantity data generating means at the changing timing detected by said downstream changing timing detecting means is used as said parameter for grasping the deteriorated state of said hydrocarbon adsorbent.

24. An apparatus for monitoring the state of the hydrocarbon adsorbent according to any one of claims 18, 21, and 22, characterized in that the state of said hydrocarbon adsorbent to be monitored comprises a deteriorated state of said hydrocarbon adsorbent, and said humidity sensors comprise a downstream humidity sensor disposed downstream of said hydrocarbon adsorbent and an upstream humidity sensor disposed upstream of said hydrocarbon adsorbent, further comprising:

upstream changing timing detecting means for detecting a changing timing at which a humidity represented by the output data of said upstream humidity sensor changes to a tendency to increase monotonously from a low humidity level to a high humidity level after the internal combustion engine has started to operate, downstream changing timing detecting means for detecting a changing timing at which a humidity represented by the output data of said downstream humidity sensor changes to a tendency to increase monotonously from a low humidity level to a high humidity level after the internal combustion engine has started to operate, and integrated moisture quantity data generating means for generating data of an integrated amount of moisture supplied to said hydrocarbon adsorbent by the exhaust gas emitted from the internal combustion engine from the changing timing detected by said upstream changing timing detecting means to the changing timing detected by said downstream changing timing detecting means, wherein the data generated by said integrated moisture quantity data generating means is used as said parameter for grasping the deteriorated state of said hydrocarbon adsorbent.

25. An apparatus for monitoring the state of the hydrocarbon adsorbent according to claim 18, characterized in that said characteristic change compensating means corrects said parameter when either one of the characteristic changes of said humidity sensors which are detected by said characteristic change detecting means exceeds a predetermined quantity.

26. An apparatus for monitoring the state of the hydrocarbon adsorbent according to claim 18, characterized in that said characteristic change compensating means compares the characteristic changes of the respective humidity sensors detected by said characteristic change detecting means with a predetermined upper limit quantity, and prohibits the deteriorated state of said hydrocarbon adsorbent from being grasped based on said parameter when the characteristic change of at least one of said humidity sensors exceeds said upper limit quantity.

27. An apparatus for monitoring the state of the hydrocarbon adsorbent according to claim 18, characterized in that said humidity sensors have respective characteristic data holding means for holding, in advance, data of characteristics of individual units of said humidity sensors, and said characteristic change detecting means detects the characteristic changes of the humidity sensors based on the output data of said humidity sensors and the data held by said characteristic data holding means.

28. An apparatus for monitoring the state of the hydrocarbon adsorbent according to claim 20 or 22, characterized in that said humidity sensors have respective characteristic data holding means for holding, in advance, data specifying said reference values relative to said characteristic change detecting output data of the humidity sensors as the data of the characteristics of the individual units of said humidity sensors, and said characteristic change detecting means acquires the characteristic change detecting output data of said humidity sensors using said reference values of the respective humidity sensors which are specified by the data held by said characteristic data holding means.

29. An apparatus for monitoring the state of the hydrocarbon adsorbent according to claim 27, characterized in that said characteristic data holding means comprises resistive elements having resistances depending on the value of the data of the characteristics of the individual units of said humidity sensors.

30. An apparatus for monitoring the state of the hydrocarbon adsorbent according to claim 28, characterized in that said characteristic data holding means comprises resistive elements having resistances depending on the value of the data of the characteristics of the individual units of said humidity sensors.

31. A method of monitoring a state of a hydrocarbon adsorbent disposed in an exhaust passage of an internal combustion engine for adsorbing hydrocarbons in an exhaust gas emitted from the internal combustion engine, using output data of a humidity sensor disposed near the hydrocarbon adsorbent, comprising the steps of:

detecting a characteristic change of the humidity sensor based on output data of the humidity sensor under a predetermined condition; and correcting a parameter to grasp the state of the hydrocarbon adsorbent using the output data of the humidity sensor, based on the detected characteristic change.

32. A method of monitoring a state of a hydrocarbon adsorbent disposed in an exhaust passage of an internal combustion engine for adsorbing hydrocarbons in an exhaust gas emitted from the internal combustion engine, using output data of a plurality of humidity sensors disposed at different locations near the hydrocarbon adsorbent, comprising the steps of:

detecting characteristic changes of the humidity sensors based on output data of the respective humidity sensors under a predetermined condition; and correcting a parameter to grasp the state of the hydrocarbon adsorbent using the output data of the humidity sensors, based on the characteristic changes of the humidity sensors detected in said detecting step.

* * * * *